United States Patent
Abe et al.

(10) Patent No.: US 12,492,594 B2
(45) Date of Patent: Dec. 9, 2025

(54) GLASS PANEL UNIT, METHOD FOR MANUFACTURING GLASS PANEL UNIT, COMPOSITE GETTER MATERIAL, AND GETTER PASTE

(71) Applicant: Panasonic Intellectual Property Management Co., Ltd., Osaka (JP)

(72) Inventors: Hiroyuki Abe, Osaka (JP); Eiichi Uriu, Osaka (JP); Kazuya Hasegawa, Osaka (JP); Tasuku Ishibashi, Ishikawa (JP); Masataka Nonaka, Osaka (JP); Takeshi Shimizu, Osaka (JP); Haruhiko Ishikawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 556 days.

(21) Appl. No.: 17/618,533

(22) PCT Filed: Jun. 16, 2020

(86) PCT No.: PCT/JP2020/023638
§ 371 (c)(1),
(2) Date: Dec. 13, 2021

(87) PCT Pub. No.: WO2020/255974
PCT Pub. Date: Dec. 24, 2020

(65) Prior Publication Data
US 2022/0243527 A1    Aug. 4, 2022

(30) Foreign Application Priority Data

Jun. 17, 2019  (JP) .................................. 2019-112361
Dec. 16, 2019  (JP) .................................. 2019-226731
Apr. 15, 2020  (JP) .................................. 2020-073141

(51) Int. Cl.
*E06B 3/66*     (2006.01)
*B01D 53/04*    (2006.01)
(Continued)

(52) U.S. Cl.
CPC ............ *E06B 3/6612* (2013.01); *B01D 53/04* (2013.01); *B01J 20/06* (2013.01); *B01J 20/186* (2013.01);
(Continued)

(58) Field of Classification Search
CPC ........ E06B 3/66; E06B 3/6608; E06B 3/6612; E06B 3/6617; E06B 3/663–66371;
(Continued)

(56) References Cited

U.S. PATENT DOCUMENTS 9,196,446 B2   11/2015  Blanco-Garcia et al.
2008/0272333 A1*  11/2008  Blanco-Garcia ........ C01B 3/001
                                              257/E23.137
(Continued)

FOREIGN PATENT DOCUMENTS

CA       1174221 A      9/1984
CN      107933054 A     4/2018
(Continued)

OTHER PUBLICATIONS

Machine translation of KR 10-2014-0037451 A.*
(Continued)

*Primary Examiner* — Z. Jim Yang
(74) *Attorney, Agent, or Firm* — Renner, Otto, Boisselle & Sklar, LLP

(57) ABSTRACT

A method for manufacturing a glass panel unit includes a working step, an assembling step, a bonding step, and a gas exhausting step. The working step includes a getter material making step including obtaining a getter material containing a zeolite and a cerium compound. The assembling step
(Continued)

includes preparing an assembly. The bonding step includes melting a peripheral wall to hermetically bond a first glass pane and a second glass pane. The gas exhausting step includes exhausting a gas from an internal space through an exhaust port to turn the internal space into a vacuum space.

10 Claims, 21 Drawing Sheets

(51) Int. Cl.
  *B01J 20/06* (2006.01)
  *B01J 20/18* (2006.01)
  *C03C 27/06* (2006.01)
  *E06B 3/663* (2006.01)
  *E06B 3/673* (2006.01)
  *E06B 3/677* (2006.01)
(52) U.S. Cl.
  CPC .......... *C03C 27/06* (2013.01); *E06B 3/66342* (2013.01); *E06B 3/67326* (2013.01); *E06B 3/6775* (2013.01); *B01D 2253/108* (2013.01); *B01D 2253/1124* (2013.01)
(58) Field of Classification Search
  CPC ......... E06B 3/67; E06B 3/6715; Y02B 80/22; Y02A 30/249; H01J 7/183; B01J 20/06; B01J 20/165; B01J 20/18; Y10T 428/231
  See application file for complete search history.

(56) References Cited

U.S. PATENT DOCUMENTS

| | | | |
|---|---|---|---|
| 2009/0246556 A1* | 10/2009 | Senoo | B01J 20/18 206/557 |
| 2013/0149220 A1 | 6/2013 | Swallow et al. | |
| 2014/0037870 A1* | 2/2014 | Petrmichl | E06B 3/6612 417/51 |
| 2015/0321185 A1 | 11/2015 | Ueno et al. | |
| 2016/0001524 A1* | 1/2016 | Abe | E06B 3/6612 428/33 |
| 2016/0263564 A1 | 9/2016 | Morohoshi et al. | |
| 2017/0014750 A1* | 1/2017 | Yoshikawa | B01D 53/346 |
| 2017/0314844 A1 | 11/2017 | Tsuruga | |
| 2017/0368530 A1 | 12/2017 | Sato et al. | |
| 2018/0031304 A1* | 2/2018 | Kal | B32B 9/005 |
| 2018/0282210 A1* | 10/2018 | Ishibashi | E06B 3/6775 |
| 2018/0290435 A1 | 10/2018 | Abe | |
| 2019/0301754 A1 | 10/2019 | Aoshima et al. | |
| 2020/0016536 A1* | 1/2020 | Aoshima | B01D 53/025 |
| 2020/0131841 A1* | 4/2020 | Abe | E06B 3/6612 |
| 2020/0165863 A1 | 5/2020 | Onodera | |
| 2021/0009471 A1 | 1/2021 | Abe | |
| 2021/0245135 A1* | 8/2021 | Ruettinger | B01J 20/06 |
| 2021/0283546 A1* | 9/2021 | Hashida | B01J 20/041 |
| 2021/0367210 A1* | 11/2021 | Cheng | H10K 50/846 |

FOREIGN PATENT DOCUMENTS

| | | | | |
|---|---|---|---|---|
| EP | 0922485 A2 | 6/1999 | | |
| JP | S58-243 A | 1/1983 | | |
| JP | H05-96182 A | 4/1993 | | |
| JP | 2009-167041 A | 7/2009 | | |
| JP | 2014-525822 A | 10/2014 | | |
| JP | 2015-104682 A | 6/2015 | | |
| JP | 2017-198324 A | 11/2017 | | |
| JP | 2018203549 A * | 12/2018 | | |
| JP | 2019-147720 A | 9/2019 | | |
| JP | 2019/188424 A | 10/2019 | | |
| JP | 2020-081968 A | 6/2020 | | |
| KR | 20140037451 A * | 3/2014 | ......... | E06B 3/6612 |
| KR | 20180128665 A * | 12/2018 | ......... | E06B 3/6612 |
| WO | 2014/104051 A1 | 7/2014 | | |
| WO | 2014/136151 A1 | 9/2014 | | |
| WO | WO-2017056416 A1 * | 4/2017 | ......... | C03B 23/245 |
| WO | WO-2017057756 A1 * | 4/2017 | ............. | B01J 20/02 |
| WO | 2017/188571 A1 | 11/2017 | | |
| WO | 2017/199920 A1 | 11/2017 | | |
| WO | 2019/188424 A1 | 10/2019 | | |

OTHER PUBLICATIONS

Machine translation of KR 10-2018-0128665 A.*
Machine translation of JP 2018/203549 A.*
International Search Report for corresponding Application No. PCT/JP2020/023638, mailed Aug. 11, 2020.
Written Opinion for corresponding Application No. PCT/JP2020/023638, mailed Aug. 11, 2020.
Japanese Office Action dated Dec. 19, 2023 corresponding to Japanese Patent Application No. 2022-163346, with Machine Translation.
Extended European Search Report dated Jan. 3, 2023 corresponding to European Application No. 20825880.6.
Japanese Office Action dated Apr. 30, 2025 corresponding to Japanese Patent Application No. 2024-022640, with Machine Translation.
Japanese Office Action corresponding to counterpart Japanese patent application No. 2024-022640 dated Oct. 7, 2025, with English translation.

* cited by examiner

GLASS PANEL UNIT, METHOD FOR MANUFACTURING GLASS PANEL UNIT, COMPOSITE GETTER MATERIAL, AND GETTER PASTE

TECHNICAL FIELD

The present disclosure generally relates to a glass panel unit, a method for manufacturing the glass panel unit, a composite getter material, and a getter paste, and more particularly relates to a thermally insulating glass panel unit, a method for manufacturing the thermally insulating glass panel unit, a composite getter material, and a getter paste.

BACKGROUND ART

Patent Literature 1 discloses a method for manufacturing a glass panel unit. According to this method, a glass composite including a first substrate, a second substrate, a gas adsorbent, and a glass adhesive including glass powder and a binder is heated to remove the binder, and a resin is used as the binder.

Nevertheless, even if the binder is removed by heating as taught by Patent Literature 1, a gas derived from the binder or an organic solvent and/or a gas emitted from air bubbles included in the glass adhesive could remain in an evacuated space (vacuum space) which is created by exhausting gases from an internal space surrounded with the first substrate, the second substrate, and a melt of the glass adhesive. In addition, a gas could also be emitted from an organic contaminant adhered to the first substrate and the second substrate. Furthermore, the gas adsorbent might be unable to adsorb these gases sufficiently.

CITATION LIST

Patent Literature

Patent Literature 1: WO 2017/056416 A1

SUMMARY OF INVENTION

The problem to be overcome by the present disclosure is to provide a glass panel unit, a method for manufacturing the glass panel unit, a composite getter material, and a getter paste, all of which are configured or designed to reduce the chances of gases remaining in the vacuum space.

A glass panel unit according to an aspect of the present disclosure includes a first glass pane, a second glass pane, a frame member, a vacuum space, and a gas adsorbent. The second glass pane faces the first glass pane. The frame member hermetically bonds the first glass pane and the second glass pane. The vacuum space is surrounded with the first glass pane, the second glass pane, and the frame member. The gas adsorbent is disposed in the vacuum space. The gas adsorbent contains at least a particle of a zeolite and a particle of a cerium compound.

A composite getter material containing at least a particle of a zeolite and a particle of a cerium compound; content of the cerium compound being 50% by mass or less with respect to a mass of the composite getter material.

A getter paste according to still another aspect of the present disclosure is a mixture of the composite getter material described above and a solvent.

A method for manufacturing a glass panel unit according to yet another aspect of the present disclosure includes a working step, an assembling step, a bonding step, and a gas exhausting step. The working step includes a composite getter material making step. The composite getter material making step includes obtaining a composite getter material containing a particle of a zeolite and a particle of a cerium compound. The assembling step includes preparing an assembly. The assembly includes a first glass pane, a second glass pane, a peripheral wall having a frame shape, an internal space, a gas adsorbent, and an exhaust port. The second glass pane faces the first glass pane. The peripheral wall having the frame shape is provided between the first glass pane and the second glass pane. The internal space is surrounded with the first glass pane, the second glass pane, and the peripheral wall. The gas adsorbent is disposed in the internal space and contains the composite getter material. The exhaust port allows the internal space to communicate with an external environment. The bonding step includes melting the peripheral wall to hermetically bond the first glass pane and the second glass pane. The gas exhausting step includes exhausting a gas from the internal space through the exhaust port to turn the internal space into a vacuum space.

A method for manufacturing a glass panel unit according to yet another aspect of the present disclosure includes a working step, an assembling step, a bonding step, and a gas exhausting step. The working step includes a getter paste making step. The getter paste making step includes obtaining a first getter paste containing a particle of a zeolite and a second getter paste containing a particle of a cerium compound. The assembling step includes preparing an assembly. The assembly includes a first glass pane, a second glass pane, a peripheral wall having a frame shape, an internal space, a first gas adsorbent, a second gas adsorbent, and an exhaust port. The second glass pane faces the first glass pane. The peripheral wall having the frame shape is provided between the first glass pane and the second glass pane. The internal space is surrounded with the first glass pane, the second glass pane, and the peripheral wall. The first gas adsorbent is disposed in the internal space and made of the first getter paste. The second gas adsorbent is disposed in the internal space and made of the second getter paste. The exhaust port allows the internal space to communicate with an external environment. The bonding step includes melting the peripheral wall to hermetically bond the first glass pane and the second glass pane. The gas exhausting step includes exhausting a gas from the internal space through the exhaust port to turn the internal space into a vacuum space.

DESCRIPTION OF EMBODIMENTS

Figure 1A:
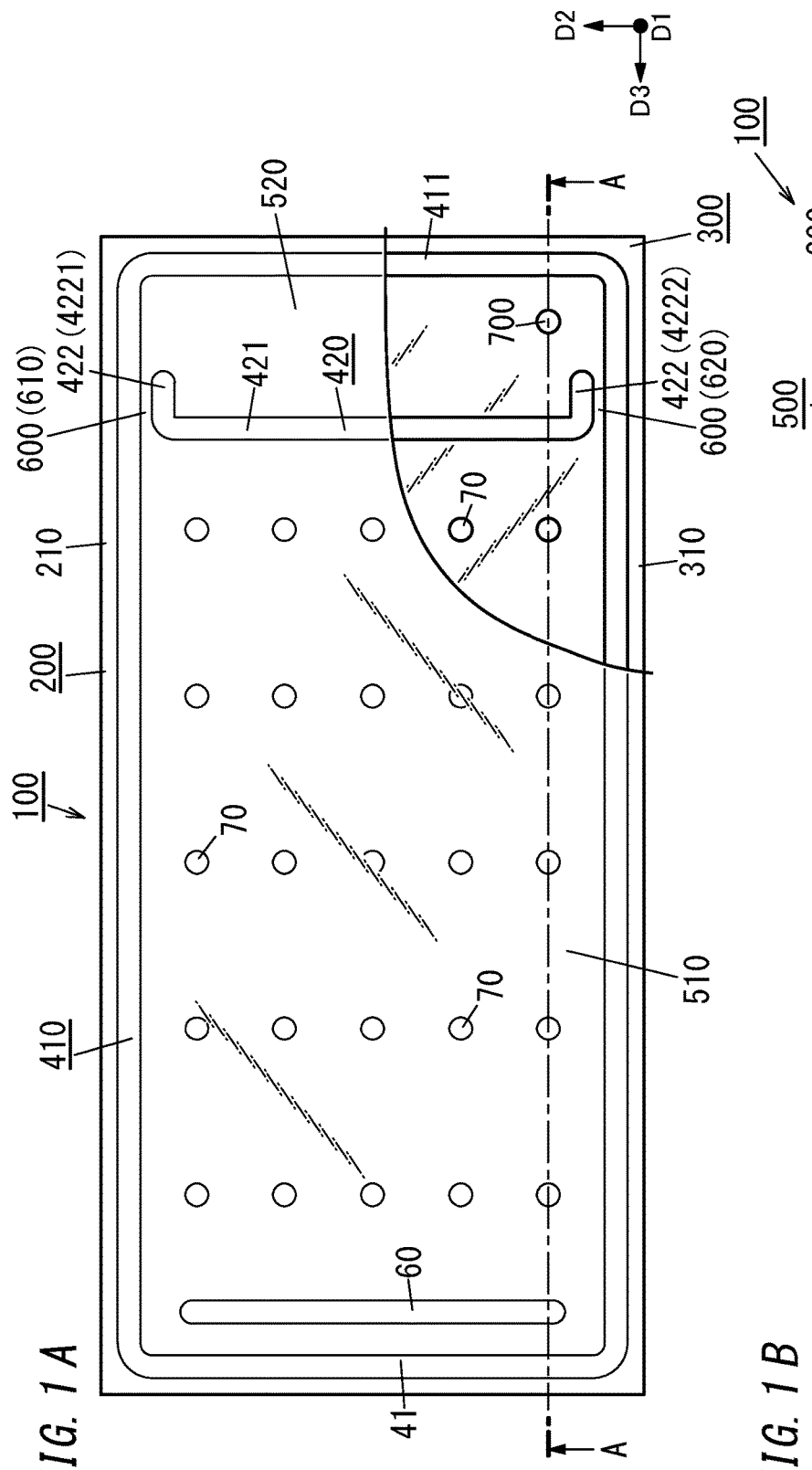
FIG. 1A is a plan view illustrating an assembly as an intermediate product of a glass panel unit according to a first embodiment.

First of all, it will be described how the present inventors acquired a general idea of the present disclosure.

A glass panel unit is provided with thermal insulation properties by creating a vacuum space between two glass panes. Nevertheless, such thermal insulation properties of the glass panel unit would decline, despite the presence of the vacuum space between the two glass panes, if any residual gas remains in the vacuum space. Thus, to reduce the quantity of such a residual gas remaining in the vacuum space, a gas adsorbent is provided in the vacuum space (see Patent Literature 1).

However, in many cases, the gas adsorbent contains only one type of component with gas adsorptivity (hereinafter referred to as a "gas adsorbing component"). If such a gas adsorbent is used, then the gas that has not been adsorbed into the gas adsorbing component may be left as a residual gas in the vacuum space.

Also, it has been taken for granted that it should be difficult to reduce the residual gas remaining in a low-pressure environment such as the vacuum space simply by combining two or more types of gas adsorbing components with each other. In other words, it has been believed that it should not be easy to select two or more types of gas adsorbing components suitable for adsorbing gases in the vacuum space.

Thus, the present inventors discovered, as a result of extensive research, that various gas components such as water vapor, carbon dioxide, oxygen, nitrogen, and methane were present in the vacuum space and the proportions of water vapor and carbon dioxide were particularly high among other things. Meanwhile, the present inventors also discovered that nitrogen and methane were difficult to be adsorbed into the gas adsorbent and tended to remain in the vacuum space even if the quantity of the gas adsorbent was increased. That is why it is essential to use a gas adsorbent with the ability to sufficiently adsorb those gases including nitrogen and methane gases. Nevertheless, nitrogen and methane are types of gases that are not easy to adsorb. Thus, it is difficult for a general gas adsorbent to sufficiently adsorb nitrogen and methane gases. It is even more difficult to sufficiently adsorb nitrogen and methane gases when the gas adsorbent is used in a vacuum space with a pressure of 10 Pa or less.

Also, generally speaking, to make a gas adsorbent such as a zeolite ready to adsorb a gas, the gas that has already been adsorbed into an adsorption site needs to be desorbed in advance. Nevertheless, a gas adsorbent with the ability to adsorb even gases that are usually difficult to adsorb such as nitrogen and methane gases should have powerful gas adsorptivity. This means that high activation energy is required to desorb the gases already adsorbed. That is to say, for example, if the gas adsorbent is left in the air, then gases other than nitrogen and methane gases have already been adsorbed thoroughly. Thus, a lot of energy is required to desorb these gases. This trend becomes even more significant when the gases need to be desorbed at a temperature equal to or lower than 350° C. Furthermore, even more powerful gas adsorptivity is required to keep a low equilibrium pressure (e.g., when the use of a gas adsorbent requires setting the total partial pressure of nitrogen and methane gases at 10 Pa or less) and this trend becomes even more significant.

Therefore, if the manufacturing process of a glass panel unit in which a vacuum space is created is performed at a lower temperature, for example, it becomes difficult to sufficiently desorb the gases from the gas adsorbent during the manufacturing process of the glass panel unit. As a result, a sufficiently large number of adsorption sites are not available in the gas adsorbent, and therefore, it becomes difficult to sufficiently adsorb nitrogen, methane, and other gases. That is to say, it has been difficult in principle to realize a state where a sufficient quantity of nitrogen or methane gas may be adsorbed by the gas adsorbent through a low temperature process to be performed at as low a temperature as 350° C. or lower.

The present inventors acquired the basic idea of the present disclosure that would overcome these problems.

In the following description, a particle of a zeolite will be hereinafter sometimes referred to as a "zeolite particle." Also, a particle of a cerium compound will be hereinafter sometimes referred to as a "cerium compound particle." The zeolite particle consists essentially of a zeolite but may include inevitably contained impurities as their components. Likewise, the cerium compound particle consists essentially of a cerium compound but may include inevitably contained impurities as their components.

First Embodiment

Next, an overview of a method for manufacturing a glass panel unit 10 according to a first embodiment will be described.

Figure 5:
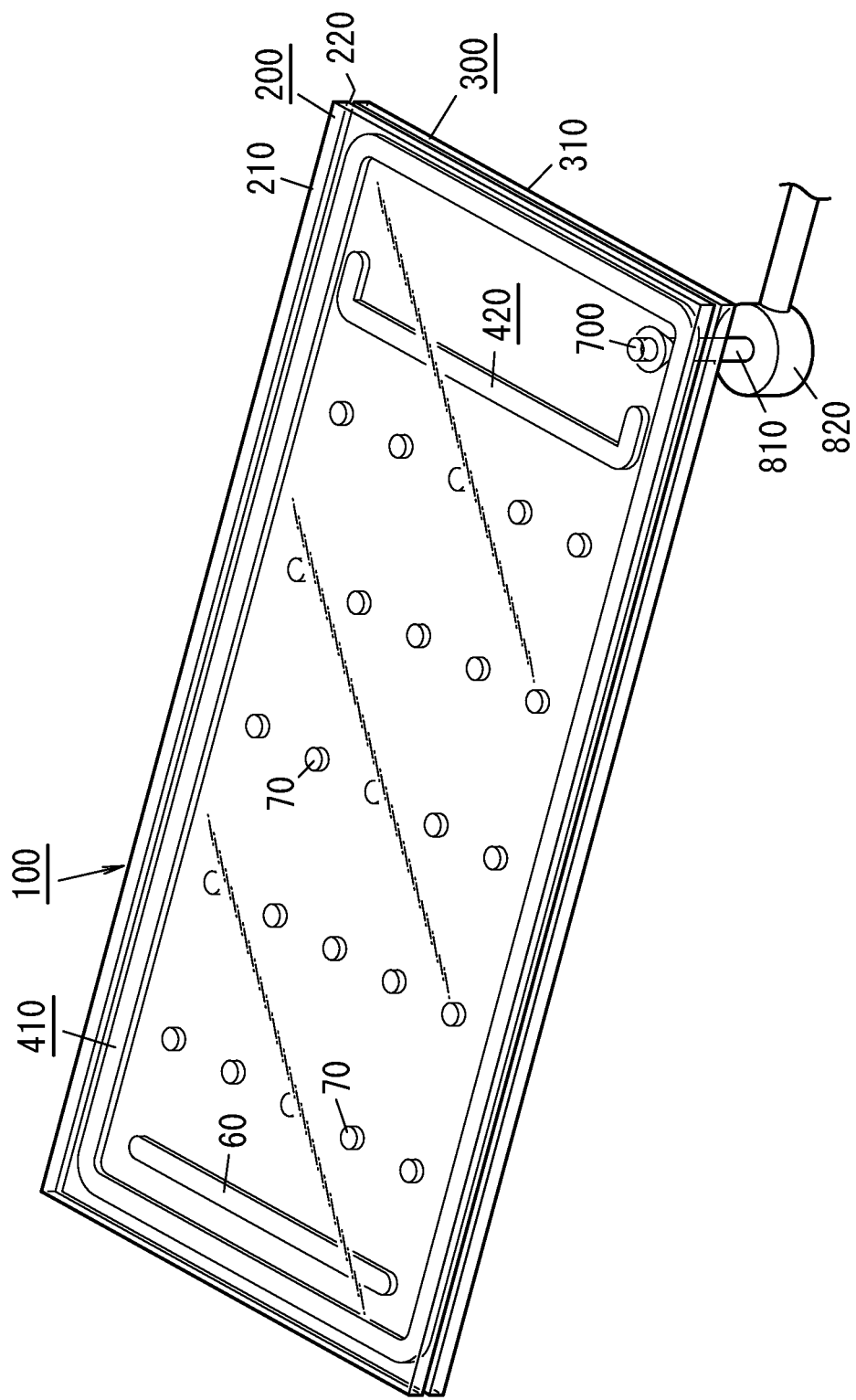
FIG. 5 illustrates still another step of the method for manufacturing the glass panel unit according to the first embodiment.
Figure 6:
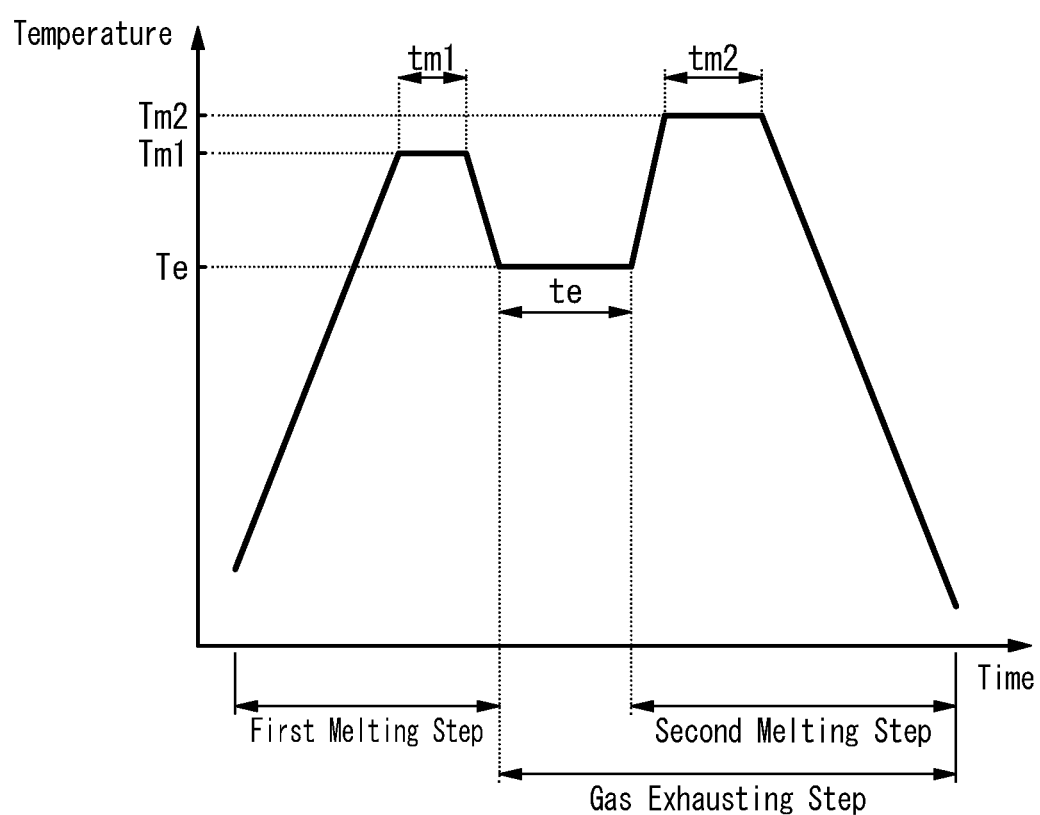
FIG. 6 shows how to perform respective steps of the method for manufacturing the glass panel unit according to the first embodiment.

A method for manufacturing a glass panel unit 10 includes a working step, an assembling step (see FIGS. 3-5), a bonding step (first melting step, see FIG. 6), and a gas exhausting step (see FIG. 6). The working step includes a composite getter material making step. The composite getter material making step includes obtaining a composite getter material containing at least a particle of a zeolite and a particle of a cerium compound. The assembling step includes preparing an assembly 100. The assembly 100 includes a first glass pane 200, a second glass pane 300, a peripheral wall 410 having a frame shape, an internal space 500, a gas adsorbent 60, and an exhaust port 700 (see FIGS. 1A and 1B). The second glass pane 300 faces the first glass pane 200. The peripheral wall 410 is provided between the first glass pane 200 and the second glass pane 300. The internal space 500 is surrounded with the first glass pane 200, the second glass pane 300, and the peripheral wall 410. The gas adsorbent 60 is disposed in the internal space 500 and contains the composite getter material. The exhaust port 700 allows the internal space 500 to communicate with an external environment. The bonding step includes melting the peripheral wall 410 to hermetically bond the first glass pane 200 and the second glass pane 300. The gas exhausting step includes exhausting a gas from the internal space 500 through the exhaust port 700 to turn the internal space 500 into a vacuum space 50.

According to this manufacturing method, the gas adsorbent 60 contains at least a particle of a zeolite (hereinafter referred to as a "zeolite particle") and a particle of a cerium compound (hereinafter referred to as a "cerium compound particle"), and therefore, adsorbs, in the vacuum space 50, gases such as $CO_2$ that the cerium compound particle adsorbs easily. This may prevent the adsorption sites of the zeolite from being filled with $CO_2$ and thereby ensure a sufficiently large number of adsorption sites to adsorb nitrogen and methane gases that only the zeolite can adsorb. This enables adsorbing a sufficient quantity of nitrogen and methane gases that are difficult to be adsorbed into only one of the zeolite or the cerium compound, thus reducing the chances of these gases remaining in the vacuum space 50. That is to say, this reduces the residual gases remaining in the vacuum space 50.

As used herein, the "getter material" refers to a material having the property to adsorb molecules, of which the size is smaller than a predetermined size. In this embodiment, the zeolite particle and a collection (powder) of the zeolite particles are getter materials. Likewise, a cerium compound particle and a collection (powder) of the cerium compound particles are also getter materials. The "composite getter material" herein refers to a getter material containing multiple types of getter materials. In this embodiment, the composite getter material includes both a zeolite particle and a cerium compound particle. Optionally, the composite getter material may also include a getter material other than the zeolite particle and the cerium compound particle.

Next, a method for manufacturing the glass panel unit 10 (hereinafter simply referred to as a "manufacturing method") according to this embodiment will be described in detail with reference to FIGS. 1-8. This manufacturing method is a method for manufacturing a glass panel unit 10 such as the one shown in FIG. 2. In the following description of this embodiment, the direction D1 is a direction parallel to the thickness of a first glass pane 200, the direction D2 is a direction perpendicular to the direction D1, and the direction D3 is a direction perpendicular to both the direction D1 and the direction D2. Alternatively, these directions D1, D2, D3 may also be simply regarded as first, second, and third directions, respectively.

The manufacturing method includes preparatory steps and a removing step.

Figure 7:
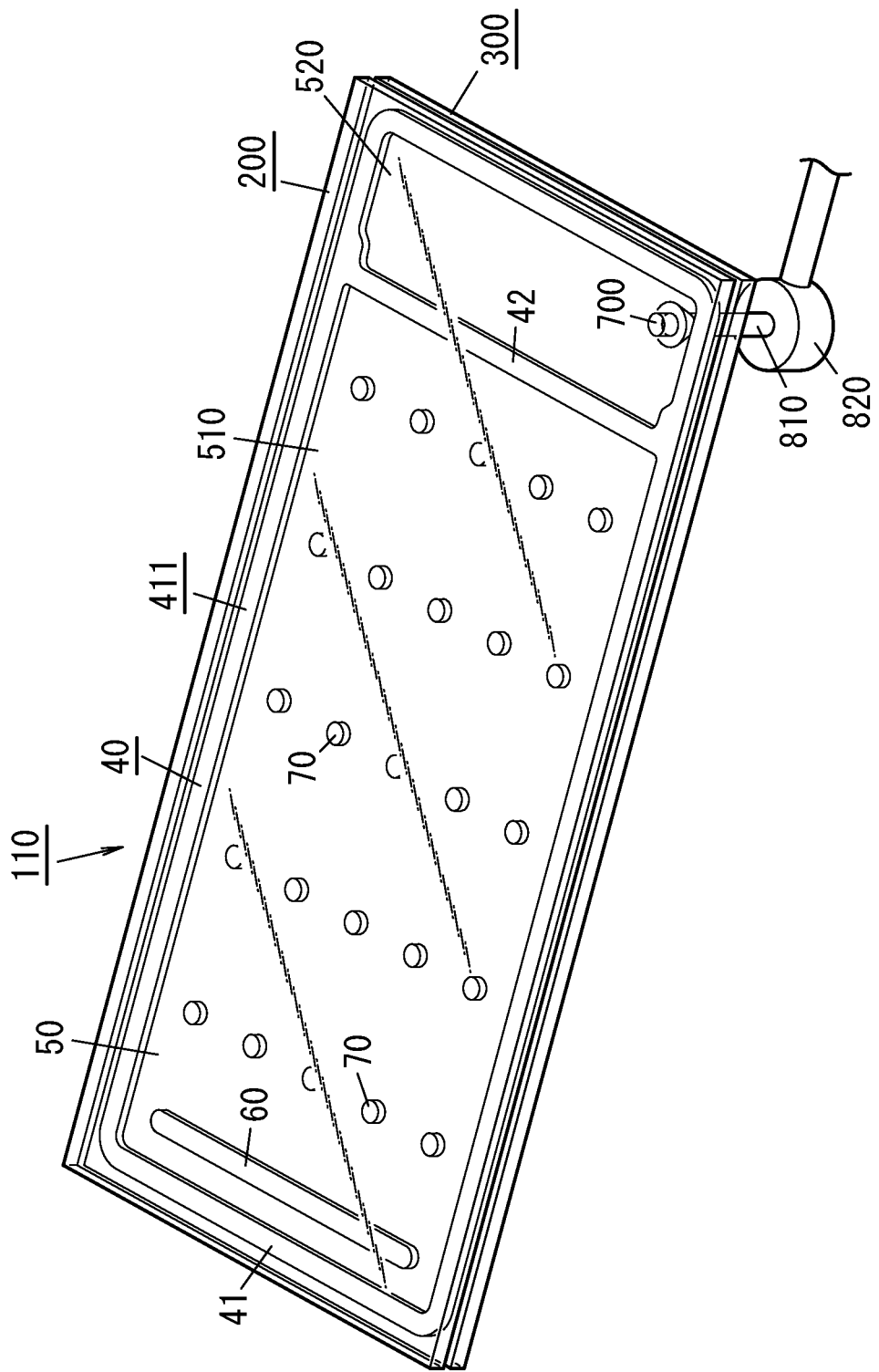
FIG. 7 illustrates yet another step of the method for manufacturing the glass panel unit according to the first embodiment.

The preparatory steps are the steps of providing a work in progress 110 shown in FIG. 7. The work in progress 110 is formed out of the assembly 100 shown in FIGS. 1A and 1B. That is to say, the work in progress 110 is an intermediate product obtained while the glass panel unit 10 (see FIG. 2) is being manufactured. The assembly 100 is an intermediate product obtained while the work in progress 110 is being formed.

The preparatory steps include a working step, an assembling step (see FIGS. 3-5), a bonding step (first melting step; see FIG. 6), a gas exhausting step (see FIG. 6), and a sealing step (second melting step; see FIGS. 6 and 7).

The working step is the step of preparing a composite getter paste. The composite getter paste contains at least a particle of a zeolite, a particle of a cerium compound, and a solvent (such as water). The gas adsorbent 60 is a dried product of the composite getter paste. This allows, even if the cerium compound releases oxygen little after the second melting step, the zeolite to adsorb the oxygen. This may reduce the quantity of oxygen included in an evacuated space (i.e., the vacuum space 50 to be described later) formed by exhausting gases from the internal space 500. The cerium compound exhibits high adsorptivity to carbon dioxide included in the evacuated space, and therefore, may reduce the quantity of carbon dioxide included in the evacuated space. Reducing the quantity of carbon dioxide included in the evacuated space in this manner may prevent adsorption sites of the zeolite with the ability to adsorb nitrogen and methane gases from being filled with the carbon dioxide. This allows the zeolite to sufficiently adsorb nitrogen and methane gases that are difficult for the cerium compound to adsorb. Therefore, the presence of the zeolite and the cerium compound in the evacuated space enables reducing not only the quantity of carbon dioxide but also the quantities of nitrogen and hydrocarbon such as methane, compared to a situation where either only the zeolite or only the cerium compound is present there, thus reducing the residual gases remaining in the evacuated space.

Note that although the melting point and other properties of hot glues (including a first hot glue and a second hot glue) to be described later are not specified in particular in this embodiment, the effect to be produced by mixing a cerium oxide particle and a copper-ion-exchanged zeolite particle becomes significant when the hot glues have a melting point equal to or lower than 400° C. and becomes even more significant when the hot glues have a melting point equal to or lower than 350° C. Alternatively, the effect becomes particularly significant when the gas exhausting step is performed at a temperature equal to or lower than 350° C. This is because if the temperature exceeds 350° C., then the gas adsorbed into the copper-ion-exchanged zeolite may be desorbed relatively easily during the heat treatment in the gas exhausting step, for example. That is to say, even under the condition that the hot glues have a melting point equal to or lower than 350° C. or the condition that the gas exhausting step is performed at a temperature equal to or lower than 350° C., the residual gases remaining in the evacuated space may also be reduced.

As used herein, the "cerium oxide particle" refers to a particle including a cerium oxide as the cerium compound and the "copper-ion-exchanged zeolite particle" refers to a particle including a copper-ion-exchanged zeolite as the zeolite.

The working step includes a heating step, a composite getter material making step, and a mixing step. Note that even if the heating step is omitted from the working step, the same effect will also be produced by mixing the zeolite particle with the cerium compound particle. Thus, the heating step does not have to be performed on either the zeolite particle or the cerium compound particle.

The heating step is the step of heating either the zeolite particle or the cerium compound particle or both the zeolite particle and the cerium compound particle. If the zeolite particle and the cerium compound particle are both heated, the zeolite particle and the cerium compound particle may be heated separately from each other or a mixture of the zeolite particle and the cerium compound particle may be heated. On the other hand, if either only the zeolite particle or only the cerium compound particle is heated, then the other component does not have to be heated. Specifically, only the zeolite particle may be heated with the cerium compound particle not heated. Alternatively, only the cerium compound particle may be heated with the zeolite particle not heated. The temperature of the heating step is suitably higher than the temperature of the gas exhausting step (i.e., the exhaust temperature Te to be described later), more suitably higher than the temperature of the first melting step (i.e., the first melting temperature Tm1 to be described later), and particularly suitably higher than the temperature of the second melting step (i.e., the second melting temperature Tm2 to be described later). This enables, before the assembly 100 is fabricated, desorbing a gas component that either the zeolite particle or the cerium compound particle has adsorbed or both the zeolite particle and the cerium compound particle have adsorbed. In particular, heating the cerium compound particle enables desorbing oxygen from the cerium compound particle. This may reduce the quantity of oxygen released from the cerium compound into the internal space 500. In addition, the gas adsorptivity of the cerium compound particle may be improved in some cases.

Furthermore, heating only the zeolite particle or both the zeolite particle and the cerium compound particle in the heating step allows the oxygen that has been adsorbed to each of the zeolite particle and the cerium compound particle to be desorbed through the heating step. This may reduce the quantity of oxygen to desorb from the bonding step and on, and therefore, the gas exhausting step may be performed at a lower temperature. As a result, the first melting step and the second melting step may also be performed at lower temperatures. This may cut down the manufacturing cost of the glass panel unit 10 eventually.

A zeolite is a porous component having a plurality of zeolite structures. Thus, the zeolite particle has a plurality of micropores, into which gases are adsorbed. Examples of those gases to be adsorbed into the zeolite particle include water vapor, carbon dioxide, oxygen, nitrogen, and hydrocarbons such as methane. Among other things, the zeolite may adsorb, in the evacuated space, gases such as nitrogen and hydrocarbon (in particular, nitrogen) which are difficult for a cerium compound to adsorb. Each of the zeolite structures has a composition expressed by the following general Formula (1):

where Me is a cation having a valence of x and present in a micropore, m is a silica/alumina ratio and is an integer equal to or greater than 2, and n is an integer equal to or greater than 0. In the composition expressed by this Formula (1), a monovalent negative charge is produced at each Al atom. Thus, if Me is a cation having a valence of two or more, then a positive charge is produced in a micropore of the zeolite particle. On the other hand, if Me is a monovalent cation, then the inside of the micropore becomes electrically neutral.

In the zeolite structure, Me may be a monovalent cation, or a cation having a valence of two or more, or a combination of a monovalent cation and a cation having a valence of two or more. Examples of the monovalent cation include: alkali metal ions such as $Li^+$, $Na^+$, and $K^+$; protons; and an ammonium ion ($NH^+$) and $Ag^+$. Examples of the cations having a valence of two or more include: alkali earth metal ions such as $Ca^+$, $Mg^+$, and $Ba^+$; and transition metal ions such as $Cu^{2+}$, $Au^+$, $Fe^{2+}$, $Zn^{2+}$, and $Ni^{2+}$.

Examples of the zeolite structures include a type A zeolite structure, a type X zeolite structure, a type Y zeolite structure, and a ZSM-5 structure. The zeolite may have any arbitrary zeolite structure other than these structures.

In the general Formula (1), water ($H_2O$) is included as crystallization water in the zeolite. Such water may be included, for example, in the micropores of the zeolite particle. Heating the zeolite allows not only this crystallization water but also gas components such as oxygen that have been adsorbed before heating to be desorbed from the zeolite. This may improve the gas adsorptivity of the zeolite. Note that if the crystallization water desorbs completely, then n in the general Formula (1) becomes equal to zero.

The zeolite obtained through the heating step is suitably a zeolite from which oxygen has desorbed and to which at least one component (hereinafter sometimes referred to as an "adsorbed component") selected from the group consisting of nitrogen, carbon monoxide, and water has been adsorbed. That is to say, the adsorption capacity of the zeolite particle obtained through the heating step is suitably saturated with the adsorbed component. In that case, causing the adsorbed component to desorb from the zeolite during heating in the gas exhausting step, for example, allows the zeolite to recover its gas adsorptivity. Note that if the zeolite particle that has gone through the heating step is mixed with water, nitrogen or carbon monoxide adsorbed, if any, to the zeolite would be partially replaced with the water.

The zeolite suitably contains a copper-ion-exchanged zeolite. The copper-ion-exchanged zeolite is a component expressed by the general Formula (1) in which Me is a copper ion. In this case, the copper-ion-exchanged zeolite is a component in which a copper ion is carried by the zeolite structure. Thus, the "copper-ion-exchanged zeolite" does not specify the component before the copper ion is carried by the zeolite structure. Also, the crystal structure of the zeolite is more suitably an MFI type such as ZMS-5, a type Y, a USY type, a mordenite type, a ferrierite type, or a type L. Among other things, a copper-ion-exchanged ZSM-5 type zeolite (Cu-ZSM5) is preferred because Cu-ZSM5 is able to adsorb nitrogen, methane, and other gases thoroughly under a low pressure even at room temperature. Note that the silica/alumina ratio of the zeolite is suitably represented by a molar ratio of 5 or more. The silica/alumina ratio of the ZSM-5 type is suitably represented by a molar ratio falling within the range from 10 to 45, and more suitably represented by a molar ratio falling within the range from 20 to 40. However, this is only an example and should not be construed as limiting.

The cerium compound is a compound containing cerium and has the property of adsorbing at least carbon dioxide in the evacuated space. Thus, even if the zeolite particle in the evacuated space does not have the capability of adsorbing carbon dioxide sufficiently, the carbon dioxide may be adsorbed into the cerium compound particle. The cerium compound contains at least one type of compound selected from the group consisting of cerium oxides such as cerium oxide (IV) ($CeO_2$) and cerium oxide (III) ($Ce_2O_3$), cerium hydroxides, and cerium carbonates. Among other things, the cerium compound particle suitably contains cerium oxide (IV). Optionally, the cerium compound particle may include a metal such as Cu or Fe and a rare-earth element such as Sc or Y. Alternatively, the cerium compound particle may also include a rare-earth element such as La, Nd, or Gd. Still alternatively, the cerium compound particle may also carry a noble metal such as Au, Pt, or Pd. Furthermore, the cerium compound (in particular, in the case of a cerium oxide) particle suitably has a micropore size distribution with a peak of 1 nm to 10 nm.

If the cerium compound is a cerium oxide, then the cerium oxide particle suitably exhibits an oxygen release curve having a temperature at which an oxygen release rate reaches a maximum point when subjected to a temperature-programmed desorption gas analysis at a temperature increase rate of 30° C./min. The oxygen release curve suitably either has the maximum point equal to or lower than 200° C. or has the maximum point equal to or higher than 250° C. and an oxygen release starting temperature equal to or higher than 250° C.

If the cerium compound particle is reduced by heating to release oxygen, then the oxygen will be adsorbed into adsorption sites of the zeolite, thus often causing a decline in the gas adsorption performance of the zeolite. Among other things, Cu-ZSM5 comes to have strong gas adsorptivity through reduction of a copper oxide, and therefore, is difficult to acquire sufficient adsorption capability in an environment where Cu-ZSM5 is given oxygen by the surrounding environment. In addition, if the cerium oxide is ready to be reduced, then the remaining cerium will react with silica in the zeolite, thus changing the structure of the zeolite and possibly causing a decline in the adsorption capability of the zeolite. In the cerium compound, the higher the oxygen release starting temperature is, the higher the oxygen desorption energy thereof becomes (i.e., the less likely oxygen desorbs from the cerium compound), which curbs a decline in the gas adsorption performance of the zeolite.

Thus, in this embodiment, the cerium oxide particle suitably exhibits an oxygen release curve having a temperature at which an oxygen release rate reaches a maximum point when subjected to a temperature-programmed desorption gas analysis at a temperature increase rate of 30° C./min. This oxygen release curve suitably has a maximum point equal to or lower than 200° C. Alternatively, the oxygen release curve suitably has a maximum point equal to or higher than 250° C. and the maximum point suitably has an oxygen release starting temperature equal to or higher than 250° C. This reduces the chances of oxygen desorbing from the cerium compound particle, thus curbing a decline in the gas adsorption performance of the zeolite particle. That is to say, if the cerium compound particle has an oxygen release curve having a peak at a temperature equal to or higher than 250° C., a cerium oxide particle, from which oxygen starts to be released at a temperature equal to or higher than 250° C., is suitably used.

In this embodiment, the temperature at which $O_2$ starts to desorb from the cerium compound is suitably equal to or higher than a process temperature. As used herein, the "process temperature" refers to an exhaust temperature Te for use in the gas exhausting step to be described later and may be 250° C., for example. In addition, the temperature at which $O_2$ starts to desorb from the cerium compound is more suitably equal to or higher than a melting temperature of the seal. The melting temperature of the seal is a second softening point of the second sealing material to be described later and may be 265° C., for example. Furthermore, the temperature at which $O_2$ starts to desorb from the cerium compound is suitably equal to or higher than 300° C., more suitably equal to or higher than 500° C., and particularly suitably equal to or higher than 550° C.

Note that the temperature at which $O_2$ starts to desorb from the cerium compound varies according to the micropore size distribution of the cerium compound particle, the metal carried by the cerium compound, the concentration of the additive, and other parameters. Also, depending on the carried substance, oxygen may be released from the carried substance itself. Thus, the type of the cerium compound needs to be determined with these factors taken into consideration.

Furthermore, the temperature-programmed desorption gas analysis is a mass spectrometry which uses a device with the ability to monitor, on a temperature basis, a gas produced by vacuum heating and/or temperature increase and is also called a "thermal desorption spectrometry (TDS)."

The composite getter material making step is the step of obtaining a composite getter material based on the zeolite particle and the cerium compound particle that either have been subjected to a heating step or have not been heated yet. The composite getter material making step includes mixing the zeolite particle and the cerium compound particle. In this embodiment, the composite getter material contains a first getter material including the zeolite particle and a second getter material including the cerium compound particle. Optionally, the composite getter material may further contain an additional getter material other than the first getter material and the second getter material. The composite getter material includes a sintered compact of a powder as a composite of the first getter material and the second getter material. Alternatively, a sintered compact of a powder of a single getter material may also be used.

The mean particle size of the zeolite particle and the mean particle size of the cerium compound particle suitably fall within the range from 0.001 μm to 30 μm. However, this range is only an example and should not be construed as limiting. Nevertheless, if the mean particle size of the zeolite particle and the mean particle size of the cerium compound particle fall within this range, then the zeolite particle and the cerium compound particle may be mixed together easily, and excellent gas adsorption performance may be achieved as well. In particular, the mean particle size of the zeolite particle and the mean particle size of the cerium compound particle each suitably fall within the range from 0.3 μm to 2 μm.

The content of the cerium compound included in the composite getter material is suitably equal to or less than 50% by mass with respect to the mass of the composite getter material. This may reduce the desorption of oxygen from the cerium compound, thus reducing the chances of the oxygen remaining in the internal space 500 (vacuum space 50) after the second melting step. The content of the cerium compound particle in the composite getter material is suitably smaller than the content of the zeolite particle. In other words, the content of the zeolite particle is suitably larger than the content of the cerium compound particle. The higher the content of the zeolite particle is, the more likely nitrogen and hydrocarbon, which are difficult to be adsorbed into the cerium compound particle, are adsorbed into the zeolite particle (i.e., the less likely the nitrogen and hydrocarbon remain in the evacuated space). In addition, the oxygen that has desorbed from the cerium compound particle from the second melting step and on reduces the chances of the adsorption capacity of the zeolite particle being saturated. The content of the cerium compound particle is more suitably equal to or less than 40% by mass, even more suitably equal to or less than 20% by mass, and particularly suitably equal to or less than 15% by mass. The lower limit of the content of the cerium compound particle is not limited to any particular value. The content of the cerium compound particle may be, for example, greater than 0% by mass, is suitably equal to or higher than 0.5% by mass, more suitably equal to or higher than 1% by mass, and particularly suitably equal to or higher than 2% by mass.

Note that if the heating step is performed with the zeolite particle and the cerium compound particle mixed together during the heating step, then the getter material making step and the heating step may be performed in parallel. After the getter material making step has been performed, the mixing step is performed.

In this embodiment, the zeolite particle and the cerium oxide particle do not have to be carried by each other in the composite getter material, considering its purpose. Thus, the zeolite particle and the cerium oxide particle each suitably have a mean particle size at least equal to 10 nm. This value is preferred to prevent particles from diffusing inside the micropores of the zeolite particle or the cerium oxide particle to cause a decline in the performance of the zeolite particle and the cerium oxide particle. In addition, the mean particle sizes of the zeolite particle and the cerium oxide particle are more suitably equal to or greater than 20 nm and even more suitably equal to or greater than 50 nm. This reduces the chances of a cerium oxide fine particle being deposited on the zeolite particle or a zeolite fine particle being deposited on the cerium oxide particle, thus allowing keeping a large surface area. For example, the composite getter material is suitably a mixture of a Cu-ZSM5 powder with a mean particle size of 50 nm or more and a cerium oxide powder with a mean particle size of 20 nm or more. Note that the mean particle size may be herein regarded as a sphere-equivalent diameter observed by microscopy using a TEM or an SEM, for example.

The mixing step is the step of obtaining a getter paste by mixing the composite getter material and a solvent together. When water is used as the solvent, the water is present in the getter paste to cover the composite getter material. This reduces the chances of the composite getter material in the getter paste state being exposed to the air. That is to say, this reduces the chances of the composite getter material adsorbing the air (in particular, oxygen in the air) and other gases. This facilitates preserving the getter paste and saves the trouble involved with manufacturing of the glass panel unit 10. The content of water in the getter paste may be selected arbitrarily. Water may be used as the solvent. Alternatively, a solution including water as a main component may also be used as the solvent. For example, the solvent may be water containing, as impurities, an organic substance, calcium, sodium, and other components. Still alternatively, the solvent may also be water including 50% by mass or less of an organic solvent such as ethanol. Yet alternatively, the solvent may also be an organic solvent such as ethanol, butyl carbitol acetate, or terpineol or a mixture thereof. Optionally, a general organic binder such as polycarbonate or poly (isobutyl methacrylate) may be added thereto. Using an organic solvent or organic binder with high viscosity contributes to achieving an advantage of improving the application performance with the sedimentation of solid content reduced. Furthermore, in the case of a paste in which a copper-ion-exchanged zeolite particle and a cerium oxide particle were mixed together with water, slight deterioration of its performance was observed when the paste was preserved for a long time. This should be because reaction would be produced a little between the cerium oxide and the copper-ion-exchanged zeolite in the water solvent. Thus, depending on the condition (e.g., when the paste needs to be preserved for a long time), the organic solvent is sometimes more advantageous than the water solvent. In addition, the cerium compound particle also adsorbs carbon dioxide to be released when the organic solvent or the organic binder is decomposed. Thus, the effect will be produced more significantly by mixing the cerium compound particle, the zeolite particle, and the solvent together. Nevertheless, to reduce the chances of the solvent affecting the adsorption capability of the zeolite particle adversely, pure water, ultrapure water, ion exchanged water, distilled water, or any other appropriate type of water is preferably used, if possible, on the supposition that the water is applied earlier than usual to a certain degree. After the mixing step has been performed, an assembling step is performed.

The assembling step is the step of preparing the assembly 100.

Figure 1B:
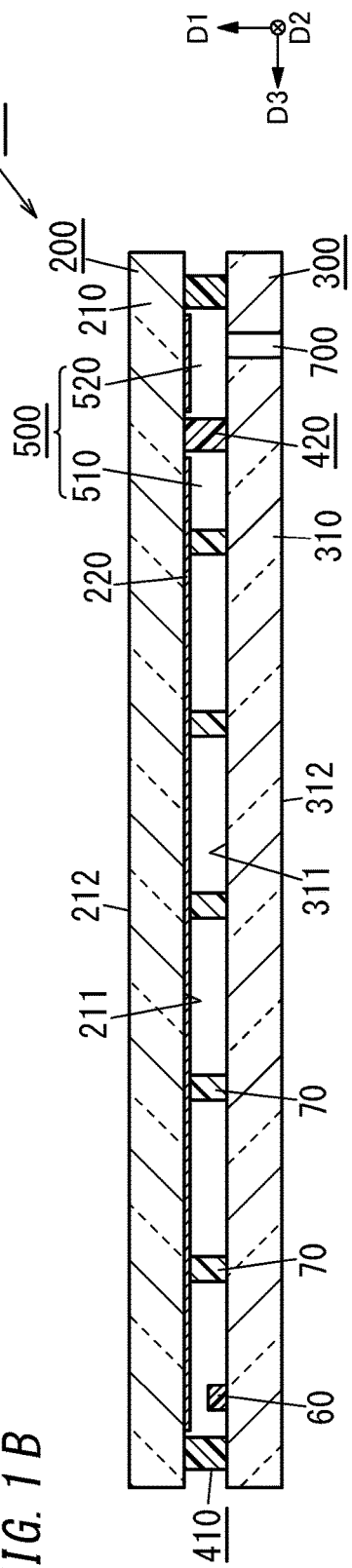
FIG. 1B is a cross-sectional view taken along the plane A-A in FIG. 1A.

As shown in FIGS. 1A and 1B, the assembly 100 includes the first glass pane 200, the second glass pane 300, the peripheral wall 410, and a partition 420. The assembly 100 further has the internal space 500 surrounded with the first and second glass panes 200, 300 and the peripheral wall 410. The assembly 100 further includes the gas adsorbent 60 and a plurality of pillars (spacers) 70 in the internal space 500. The assembly 100 further has the exhaust port 700.

The first glass pane (first glass substrate) 200 is a member that forms the basis of a first glass pane 20 to be described later and is made of the same material as the first glass pane 20. The second glass pane (second glass substrate) 300 is a member that forms the basis of a second glass pane 30 to be described later and is made of the same material as the second glass pane 30. The first and second glass panes 200, 300 have the same planar shape. In this embodiment, the first glass pane 200 has dimensions that are large enough to form at least one first glass pane 20 to be described later, and the second glass pane 300 has dimensions that are large enough to form at least one second glass pane 30 to be described later.

The first and second glass panes 200, 300 each have a polygonal flat plate shape (e.g., a rectangular shape in this embodiment).

The first glass pane 200 includes a body 210 and a low-emissivity film 220.

The low-emissivity film 220 is provided in the internal space 500 and covers the body 210. The low-emissivity film 220 is in contact with the body 210. The low-emissivity film 220 is also called an "infrared reflective film" and has light-transmitting properties but reflects an infrared ray. Thus, the low-emissivity film 220 may improve the thermal insulation properties of the glass panel unit 10. The low-emissivity film 220 may be a thin metallic film, for example. The low-emissivity film 220 may contain silver, for example. The low-emissivity film 220 may be a Low-E film, for example.

The first glass pane 200 includes the body 210 as described above. The body 210 has a first surface 211 and a second surface 212. The first surface 211 is a flat surface and covered with the low-emissivity film 220. The second surface 212 is a flat surface parallel to the first surface 211 and is located opposite from the internal space 500 in the direction D1. The body 210 defines the main shape of the first glass pane 200, and therefore, has a rectangular flat plate shape. Examples of materials for the body 210 include soda lime glass, high strain point glass, chemically tempered glass, alkali-free glass, quartz glass, Neoceram, and thermally tempered glass.

The second glass pane 300 includes a body 310. The body 310 has a first surface 311 and a second surface 312. The first surface 311 is a flat surface facing the low-emissivity film 220. The second surface 312 is a flat surface parallel to the first surface 311 and is located opposite from the internal space 500 in the direction D1. The body 310 defines the main shape of the second glass pane 300, and therefore, has a rectangular flat plate shape. The body 310 has the same shape as the body 210. In this embodiment, the second glass pane 300 consists of the body 310 alone. Optionally, the second glass pane 300 may include not only the body 310 but also a low-emissivity film corresponding to the low-emissivity film 220. If the second glass pane 300 includes a low-emissivity film, then the low-emissivity film covers, and is in contact with, the body 310 in the internal space 500. Examples of materials for the body 310 include soda lime glass, high strain point glass, chemically tempered glass, alkali-free glass, quartz glass, Neoceram, and thermally tempered glass.

The peripheral wall 410 contains a first sealing material (i.e., a first hot glue). The peripheral wall 410 is disposed between the first glass pane 200 and the second glass pane 300. The peripheral wall 410 has a frame shape as shown in FIG. 1A. Particularly, the peripheral wall 410 has a rectangular frame shape. The peripheral wall 410 is formed along the respective outer peripheries of the first and second glass panes 200, 300. Thus, in the assembly 100, the internal space 500 is created to be surrounded with the peripheral wall 410, the first glass pane 200, and the second glass pane 300.

The first hot glue may include a glass frit, for example. The glass frit may be a low-melting glass frit, for example. Examples of the low-melting glass frits include a bismuth-based glass frit, a lead-based glass frit, and a vanadium-based glass frit. The first hot glue does not have to be a glass frit but may also be a low-melting metal or a hot-melt adhesive, for example. Optionally, the first hot glue may further contain either an organic binder or an organic solvent or both an organic binder and an organic solvent. In that case, even if a gas derived from the organic binder and/or the organic solvent is emitted into the vacuum space 50 after the sealing step (second melting step), the gas will be adsorbed into the gas adsorbent 60, thus reducing the chances of the gas remaining in the vacuum space 50.

The organic binder may include a resin, for example. Examples of the resin include poly (isobutyl methacrylate), ethyl cellulose, aliphatic polycarbonate, acrylic resin, and butyral resin. The organic binder does not have to be one of these resins but may include any arbitrary component as well. In any case, the resin constituting the organic binder is suitably a resin which has a low molecular weight and which may be easily decomposed.

Examples of the organic solvent include esters such as butyl carbitol acetate and ethyl carbitol acetate. However, the organic solvent does not have to be one of these components but may also include at least one solvent selected from the group consisting of a solvent such as a terpene-based solvent for use in general screen printing and a solvent for use in dispense application.

If the peripheral wall 410 further contains a resin, even a gas derived from the resin and emitted into the internal space 500 after the assembling step will also be exhausted in the gas exhausting step. In addition, even if the gas derived from the resin remains as residual gas in the vacuum space 50 after the gas exhausting step, the residual gas may also be adsorbed into the gas adsorbent 60.

The partition 420 is placed in the internal space 500. The partition 420 partitions the internal space 500 into a first space 510 and a second space (ventilation space) 520. Thus, the first space 510 is a space from which a gas is exhausted in the gas exhausting step. The second space 520 is a space for use to exhaust a gas from the first space 510. The partition 420 is provided closer to a first end (i.e., the right end in FIG. 1A) along the length (i.e., the rightward/leftward direction in FIG. 1A) of the second glass pane 300 than to the center of the second glass pane 300 such that the first space 510 has a larger area than the second space 520. The partition 420 is provided along the width (i.e., the upward/downward direction in FIG. 1A) of the second glass pane 300. Nevertheless, neither longitudinal end of the partition 420 is in contact with the peripheral wall 410. In this embodiment, the width of the second glass pane 300 is parallel to the direction D2 and the length of the second glass pane 300 is parallel to the direction D3.

The partition 420 includes a body portion (partition body portion) 421 that forms its body and blocking portions 422. The blocking portions 422 include a first blocking portion 4221 and a second blocking portion 4222. The body portion 421 extends linearly in the direction D2. The direction D2 may be aligned with, for example, the width of the second glass pane 300. Also, in the direction D2, both ends of the body portion 421 are out of contact with the peripheral wall 410. The first blocking portion 4221 is formed to extend from one of the two ends of the body portion 421 toward the second space 520 and the second blocking portion 4222 is formed to extend from the other end of the body portion 421 toward the second space 520. The one end of the body portion 421 may be a first end (i.e., the upper end in FIG. 1A) and the other end (i.e., the lower end in FIG. 1A) may be a second end.

The partition 420 contains a second sealing material (second hot glue). The second hot glue may be a glass frit, for example. The glass frit may be a low-melting glass frit, for example. Examples of the low-melting glass frits include a bismuth-based glass frit, a lead-based glass frit, and a vanadium-based glass frit. The second hot glue does not have to be a glass frit but may also be a low-melting metal or a hot-melt adhesive, for example. In this embodiment, the same type of glue is used as the first and second hot glues. That is to say, the first and second sealing materials are the same material.

The air passages 600 allow the first space 510 and the second space 520 to communicate with each other in the internal space 500 as shown in FIG. 1A. The air passages 600 include a first air passage 610 and a second air passage 620. The first air passage 610 is a gap between the first end (i.e., the upper end in FIG. 1A) of the partition 420 and the peripheral wall 410. The second air passage 620 is a gap between the second end (i.e., the lower end in FIG. 1A) of the partition 420 and the peripheral wall 410.

The exhaust port 700 is a hole that allows the second space 520 to communicate with the external environment. The exhaust port 700 is used to exhaust a gas from the first space 510 through the second space 520 and the air passages 600 (namely, the first air passage 610 and the second air passage 620). Thus, the air passages 600, the second space 520, and the exhaust port 700 together form an exhaust path for exhausting a gas from the first space 510. The exhaust port 700 is provided through the second glass pane 300 to allow the second space 520 to communicate with the external environment. Specifically, the exhaust port 700 is provided at a corner portion of the second glass pane 300.

The gas adsorbent 60 and the plurality of spacers 70 are arranged in the first space 510. In particular, the gas adsorbent 60 is formed along the width of the second glass pane 300 so as to be adjacent to a second end along the length (i.e., the left end in FIG. 1A) of the second glass pane 300. That is to say, the gas adsorbent 60 is placed at an end of the first space 510 (vacuum space 50). This makes the gas adsorbent 60 less conspicuous. In addition, the gas adsorbent 60 is located distant from the partition 420 and the air passage 600. This reduces the chances of the gas adsorbent 60 interfering with exhausting a gas from the first space 510.

The assembling step is the step of forming the first glass pane 200, the second glass pane 300, the peripheral wall 410, the partition 420, the internal space 500, the air passages 600, the exhaust port 700, the gas adsorbent 60, and the plurality of spacers 70 to obtain the assembly 100. The assembling step includes the following first to sixth steps. Optionally, the order in which the second to fifth steps are performed may be changed as appropriate.

The first step is the step of forming the first glass pane 200 and the second glass pane 300 (i.e., a substrate forming step). For example, the first step includes making the first glass pane 200 and the second glass pane 300. If necessary, the first step may further include cleaning the first glass pane 200 and the second glass pane 300.

The second step is the step of forming the exhaust port 700. The second step includes providing the exhaust port 700 through the second glass pane 300. If necessary, the second step includes cleaning the second glass pane 300.

Figure 3:
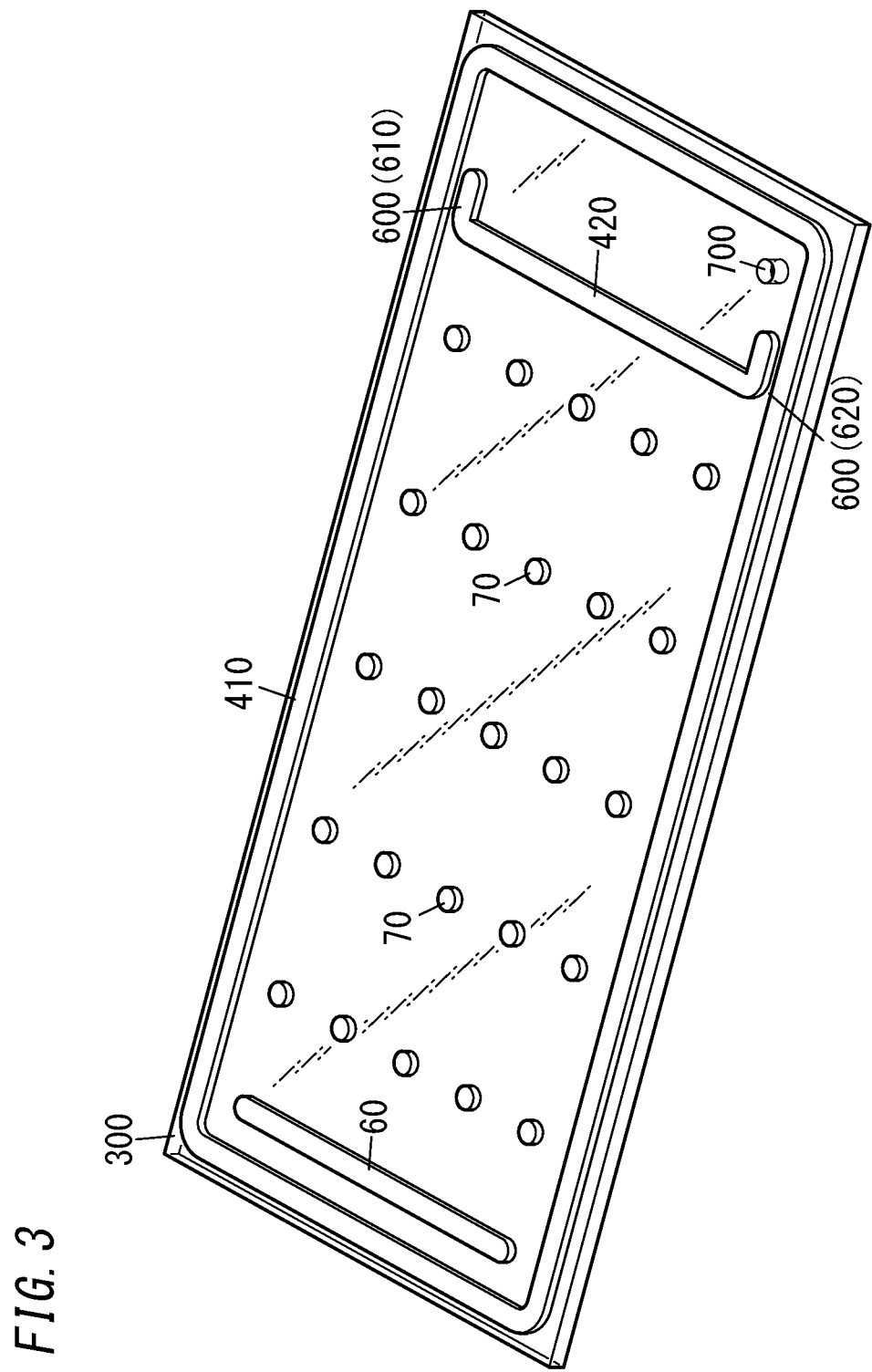
FIG. 3 illustrates a step of a method for manufacturing a glass panel unit according to the first embodiment.

The third step is the step of forming the spacers 70 (spacer forming step) (see FIG. 3). The third step includes forming a plurality of spacers 70 in advance and placing, using a chip mounter or any other tool, the plurality of spacers 70 at predetermined positions on the second glass pane 300. The plurality of spacers 70 will be used to maintain a predetermined gap distance between the first and second glass panes 200, 300 when the assembly 100 turns into a work in progress 110. Examples of constituent materials for such spacers 70 include metals, glass, and resins. The spacers 70 may contain one or a plurality of materials selected from these materials.

In the third step according to this embodiment, the spacers 70 are formed in advance and placed on the second glass pane 300 as described above. Alternatively, the plurality of spacers 70 may also be formed on the second glass pane 300 by a known thin film forming technique. Still alternatively, if the spacers 70 include a resin, the plurality of spacers 70 may also be formed by a combination of photolithography and etching techniques instead of the forming method described above. In that case, the plurality of spacers 70 may be made of a photocurable material, for example.

Note that the dimensions, number, spacing, and arrangement pattern of the spacers 70 may be selected appropriately. Each of the spacers 70 has the shape of a circular column, of which the height is approximately equal to the predetermined gap distance. For example, the spacers 70 may have a diameter of 1 mm and a height of 100 µm. Optionally, the spacers 70 may also have any other desired shape such as a rectangular columnar or spherical shape.

The fourth step is the step of forming the gas adsorbent 60 (gas adsorbent forming step) (see FIG. 3). The fourth step includes forming the gas adsorbent 60 by applying, using a dispenser, for example, the getter paste, prepared in the working step, onto the second glass pane 300 and then drying the getter paste thus applied. That is to say, the fourth step includes a drying step of drying the getter paste. Drying the getter paste allows the composite getter material to recover its gas adsorptivity. In addition, applying the getter paste enables reducing the size of the gas adsorbent 60. This allows the gas adsorbent 60 to be disposed even in a narrow first space 510.

The fifth step is the step of arranging the peripheral wall 410 and the partition 420 (sealing material arrangement step) (see FIG. 3). The fifth step includes forming the peripheral wall 410 by applying, using a dispenser, for example, a first sealing material onto the second glass pane 300 and then drying the first sealing material. The fifth step also includes forming the partition 420 by applying, using a dispenser, for example, a second sealing material onto the second glass pane 300 and then drying the second sealing material.

By performing these first to fifth steps, the second glass pane 300 such as the one shown in FIG. 3 is obtained. On this second glass pane 300, the peripheral wall 410, the partition 420, the air passages 600, the exhaust port 700, the gas adsorbent 60, and the plurality of spacers 70 have been formed.

Figure 4:
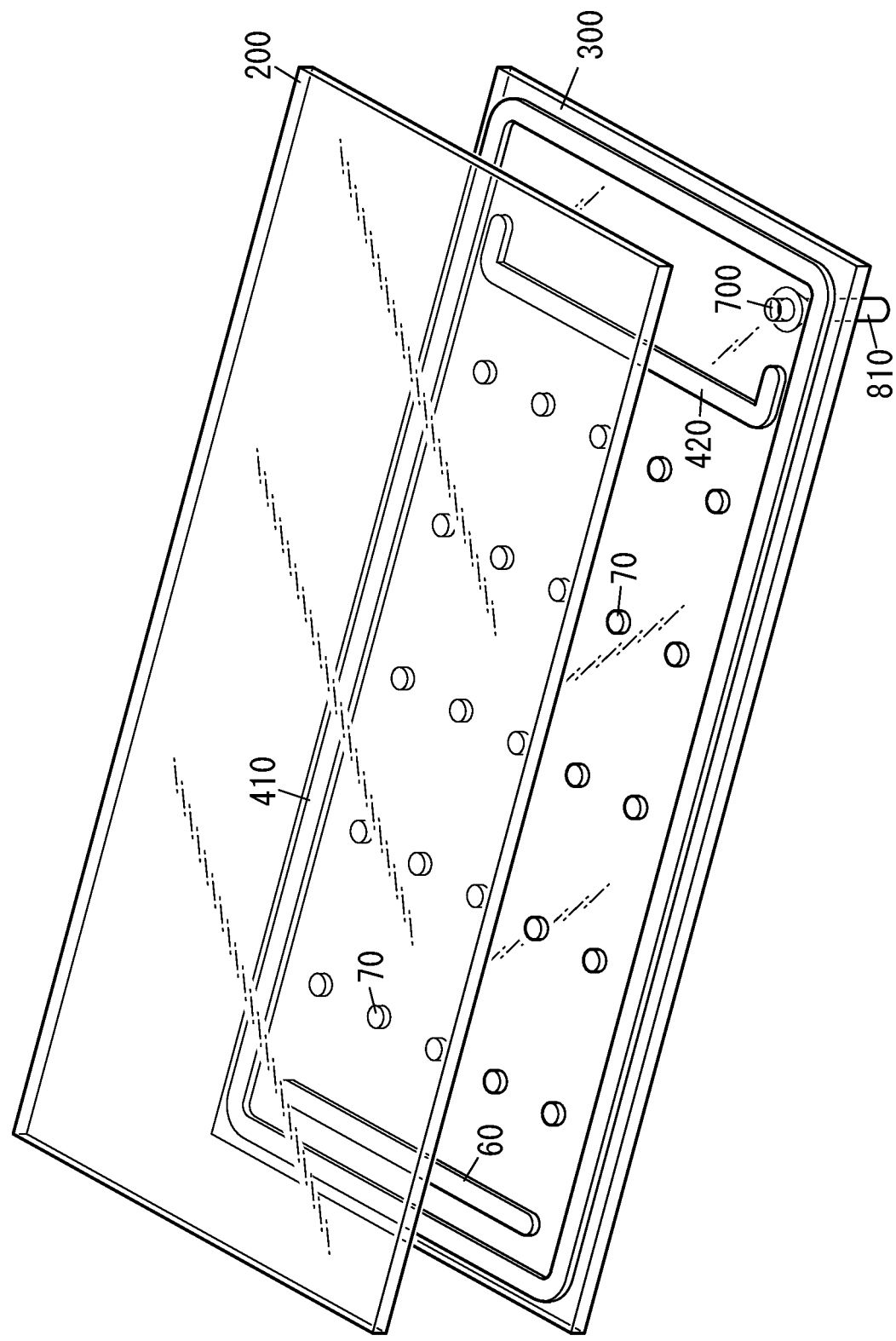
FIG. 4 illustrates another step of the method for manufacturing the glass panel unit according to the first embodiment.

The sixth step is the step of arranging the first glass pane 200 and the second glass pane 300 (arrangement step). In the sixth step, the first glass pane 200 and the second glass pane 300 are arranged to be parallel to each other and face each other as shown in FIG. 4.

The assembly 100 shown in FIG. 5 is obtained by performing this assembling step.

After the assembling step has been performed, a first melting step (bonding step), a gas exhausting step, and a second melting step (sealing step) are carried out as shown in FIG. 6.

The first melting step is the step of melting the peripheral wall 410 once to hermetically bond the first glass pane 200 and the second glass pane 300 together with the peripheral wall 410. Specifically, the first glass pane 200 and the second glass pane 300 are loaded into a melting furnace and heated at a first melting temperature Tm1 for a predetermined period of time (first melting time) tm1 (see FIG. 6). In this embodiment, the first sealing material and the second sealing material are the same material as described above, and therefore, the softening point of the first sealing material (first softening point) is the same as the softening point of the second sealing material (second softening point). Thus, the first melting temperature Tm1 is set at a temperature equal to or higher than the first and second softening points. Even if the first melting temperature Tm1 is equal to or higher than the first and second softening points, the partition 420 does not close the air passages 600 in the first melting step because the gas exhausting step is started after the first melting step (see FIG. 6). That is to say, in the first melting step, the air passages 600 are still available. In the first melting step, if the first and second softening points are 265° C., the first melting temperature Tm1 may be set at 285° C., for example. The first melting time tm1 may be 15 minutes, for example.

In this embodiment, the implementation in which the first softening point is the same as the second softening point covers not only an implementation in which the first softening point is exactly the same as the second softening point but also an implementation in which the first softening point is approximately equal to the second softening point.

Heating the peripheral wall 410 at the first melting temperature Tm1 allows the peripheral wall 410 to be softened while reducing the deformation of the partition 420. This facilitates hermetically bonding the first glass pane 200 and the second glass pane 300 with the peripheral wall 410.

The gas exhausting step is the step of exhausting a gas from the first space 510 through the air passages 600, the second space 520, and the exhaust port 700 to turn the first space 510 into a vacuum space 50. The gas may be exhausted using a vacuum pump, for example. The vacuum pump may be connected to the assembly 100 via an exhaust pipe 810 and a sealing head 820 as shown in FIG. 5. The exhaust pipe 810 may be bonded to the second glass pane 300 such that the inside of the exhaust pipe 810 and the exhaust port 700 communicate with each other, for example. Then, the sealing head 820 is attached to the exhaust pipe 810, thereby connecting a suction port of the vacuum pump to the exhaust port 700. The first melting step, the gas exhausting step, and the second melting step are performed with the assembly 100 kept loaded in the melting furnace. Therefore, the exhaust pipe 810 is bonded to the second glass pane 300 at least before the first melting step.

The gas exhausting step includes exhausting a gas from the first space 510 through the air passages 600, the second space 520, and the exhaust port 700 at a temperature equal to or higher than an exhaust temperature Te for a predetermined period of time (exhaust time) to or more before the second melting step is started (see FIG. 6). The exhaust temperature Te is set at a temperature lower than the second softening point (e.g., 265° C.) of the second sealing material. The exhaust temperature Te may be 250° C., for example. This prevents the partition 420 from being deformed even in this gas exhausting step. During this gas exhausting step, at least water in the gas adsorbent 60 is vaporized and released into the first space 510. Then, the water is exhausted from the first space 510 through the air passages 600, the second space 520, and the exhaust port 700. Thus, exhausting the water released from the gas adsorbent 60 allows the composite getter material to further recover its gas adsorptivity. The exhaust time te is set to create a vacuum space 50 with a predetermined degree of vacuum (e.g., a degree of vacuum of 0.1 Pa or less). The exhaust time te may be set at 120 minutes, for example.

The second melting step is the step of closing at least the air passages 600 by deforming the partition 420 to form a boundary wall 42 and thereby obtain a work in progress 110. That is to say, the second melting step includes closing the air passages 600 by deforming the partition 420. In other words, the first space 510 is closed by the partition 420 deformed so that the first space 510 and the second space 520 are separated from each other. In this manner, a frame member 40 surrounding the vacuum space 50 is formed (see FIG. 7). In this embodiment, the partition 420 is deformed such that both longitudinal ends of the partition 420 (namely, the first and second blocking portions 4221, 4222) come into contact with, and are integrated with, the peripheral wall 410. As a result, a boundary wall 42 is formed which hermetically separates the internal space 500 into the first space 510 (vacuum space 50) and the second space 520 as shown in FIG. 7. More specifically, melting the partition 420 once at a predetermined temperature (second melting temperature) Tm2 equal to or higher than the second softening point of the second sealing material causes the partition 420 to be deformed. Specifically, the first glass pane 200 and the second glass pane 300 are heated in the melting furnace at the second melting temperature Tm2 for a predetermined period of time (second melting time) tm2 (see FIG. 6). The second melting temperature Tm2 and the second melting time tm2 are set such that the partition 420 is softened to close the air passages 600. The lower limit of the second melting temperature Tm2 is the second softening point (e.g., 265° C.). The second melting temperature Tm2 may be set at 290° C., for example. Also, the second melting time tm2 may be 30 minutes, for example. In this embodiment, the sealing step is the second melting step. In short, the sealing step is the step of spatially separating the vacuum space 50 from the other space. The space other than the vacuum space 50 corresponds to the second space 520 in this embodiment.

In this embodiment, the gas exhausting step is started after the first melting step and ends when the second melting step ends as shown in FIG. 6. Thus, during the second melting step, the gas is exhausted from the first space 510 through the air passages 600, the second space 520, and the exhaust port 700. This creates a pressure difference between the inside and outside of the assembly 100. This pressure difference causes the first and second glass panes 200, 300 to approach each other. Thus, the second melting step includes forming the boundary wall 42 that closes the air passages 600 by deforming the partition 420 at the second melting temperature Tm2 while exhausting a gas from the first space 510 through the air passages 600, the second space 520, and the exhaust port 700.

Also, in the second melting step shown in FIG. 6, after the second melting time tm2 has passed, the temperature inside the melting furnace is lowered to room temperature at a constant rate. Then, the sealing head 820 is removed to finish the second melting step and the gas exhausting step.

By performing these preparatory steps, the work in progress 110 shown in FIG. 7 is obtained. As shown in FIG. 7, the work in progress 110 includes the first glass pane 200, the second glass pane 300, the peripheral wall 41, and the boundary wall 42. In addition, the work in progress 110 also has the vacuum space 50 and the second space 520. The work in progress 110 further includes, in the vacuum space 50, the gas adsorbent 60 and the plurality of pillars (spacers) 70. The work in progress 110 further has the exhaust port 700.

The first and second glass panes 200, 300 each have a rectangular flat plate shape. The first and second glass panes 200, 300 have the same planar shape.

The boundary wall 42 (spatially) separates the vacuum space 50 from the second space 520. In other words, the second space 520 of the work in progress 110 (spatially) communicates with the external environment through the exhaust port 700, and therefore, the boundary wall 42 separates the vacuum space 50 from the external environment. The boundary wall 42 and the peripheral wall 410 together form the frame member 40 surrounding the vacuum space 50. The frame member 40 not only surrounds the vacuum space 50 entirely but also hermetically bonds the first and second glass panes 200, 300 together.

The gas adsorbent 60 is placed in the vacuum space 50. Specifically, the gas adsorbent 60 has an elongate flat-plate shape and is provided on the second glass pane 300. The gas adsorbent 60 is used to adsorb unnecessary gases (such as a residual gas). The unnecessary gases may be the gas emitted from the hot glues (namely, the first and second hot glues) forming the frame member 40 when the hot glues are heated.

The plurality of spacers 70 are placed in the vacuum space 50. The plurality of spacers 70 is used to maintain a desired gap distance between the first and second glass panes 200, 300.

The vacuum space 50 is created by exhausting the gases from the first space 510 through the second space 520 and the exhaust port 700 as described above. In other words, the vacuum space 50 is the first space 510, of which the degree of vacuum is a predetermined value or less. The predetermined value may be 0.1 Pa, for example. The vacuum space 50 is perfectly closed hermetically by the first glass pane 200, the second glass pane 300, and the frame member 40, and therefore, is separated from the second space 520 and the exhaust port 700.

Figure 8:
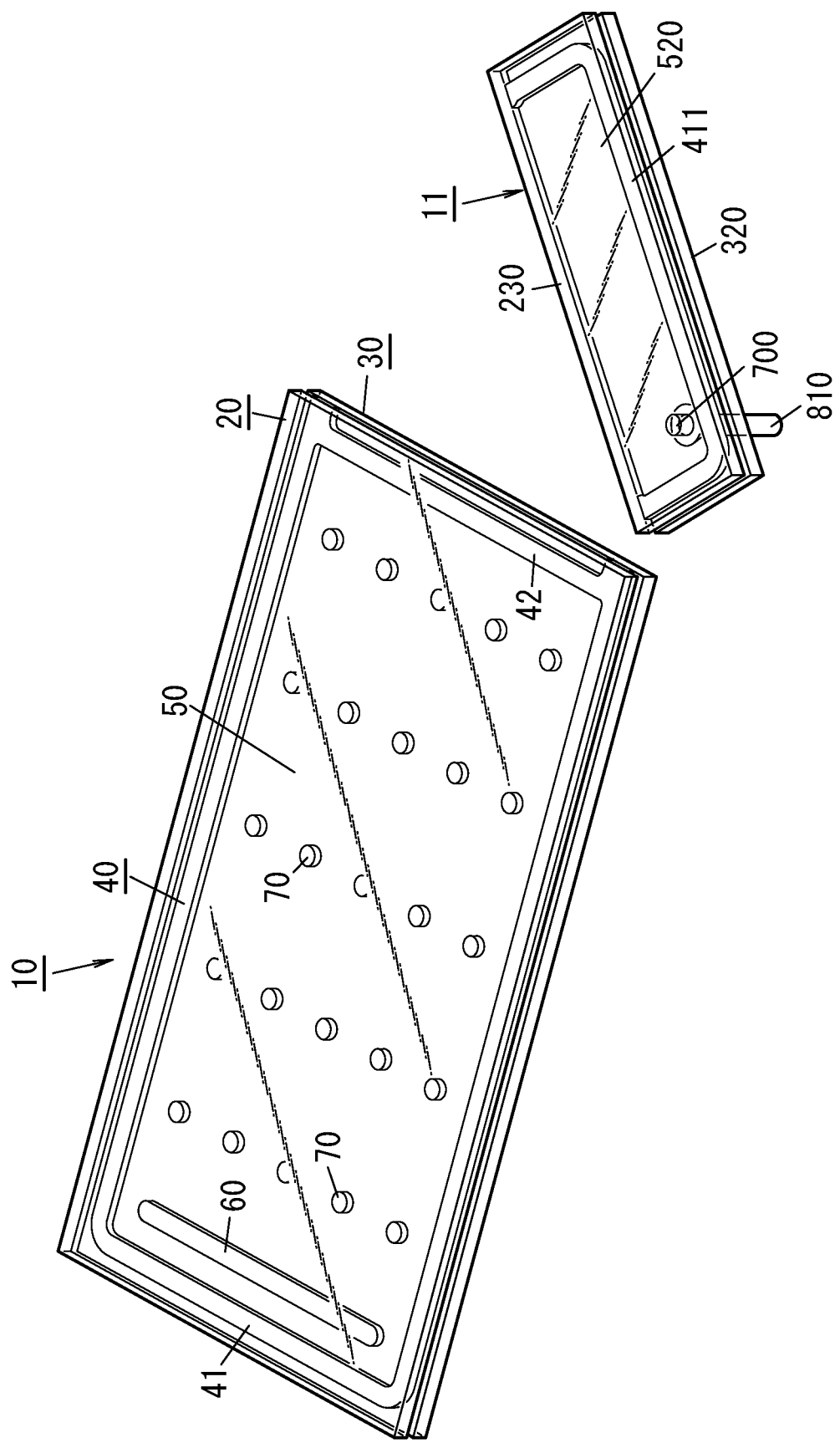
FIG. 8 illustrates yet another step of the method for manufacturing the glass panel unit according to the first embodiment.

The removing step is performed after the preparatory steps have been performed. The removing step is the step of removing a portion 11 having the second space 520 from the work in progress 110 to obtain the glass panel unit 10 as a part having the vacuum space 50 as shown in FIG. 8.

The glass panel unit 10 includes the first glass pane 20 and the second glass pane 30. The first glass pane 20 is a part, corresponding to the first space 510 (i.e., the vacuum space 50), of the first glass pane 200. The second glass pane 30 is a part, corresponding to the first space 510 (i.e., the vacuum space 50), of the second glass pane 300.

On the other hand, the unnecessary portion 11 includes a part 230, corresponding to the second space 520, of the first glass pane 200 and a part 320, corresponding to the second space 520, of the second glass pane 300. Note that the unnecessary portion 11 is suitably as small as possible, considering the manufacturing cost of the glass panel unit 10.

Specifically, in the removing step, the work in progress 110 unloaded from the melting furnace is cut off along the boundary wall 42 to be divided into a part (glass panel unit) 10 having the vacuum space 50 and a part (unnecessary portion) 11 having the second space 520. Note that the shape of the portion where the work in progress 110 is cut off (i.e., cutting line) is determined by the shape of the glass panel unit 10. Since the glass panel unit 10 has a rectangular shape, the cutting line has a linear shape aligned with the length of the boundary wall 42.

Figure 2:
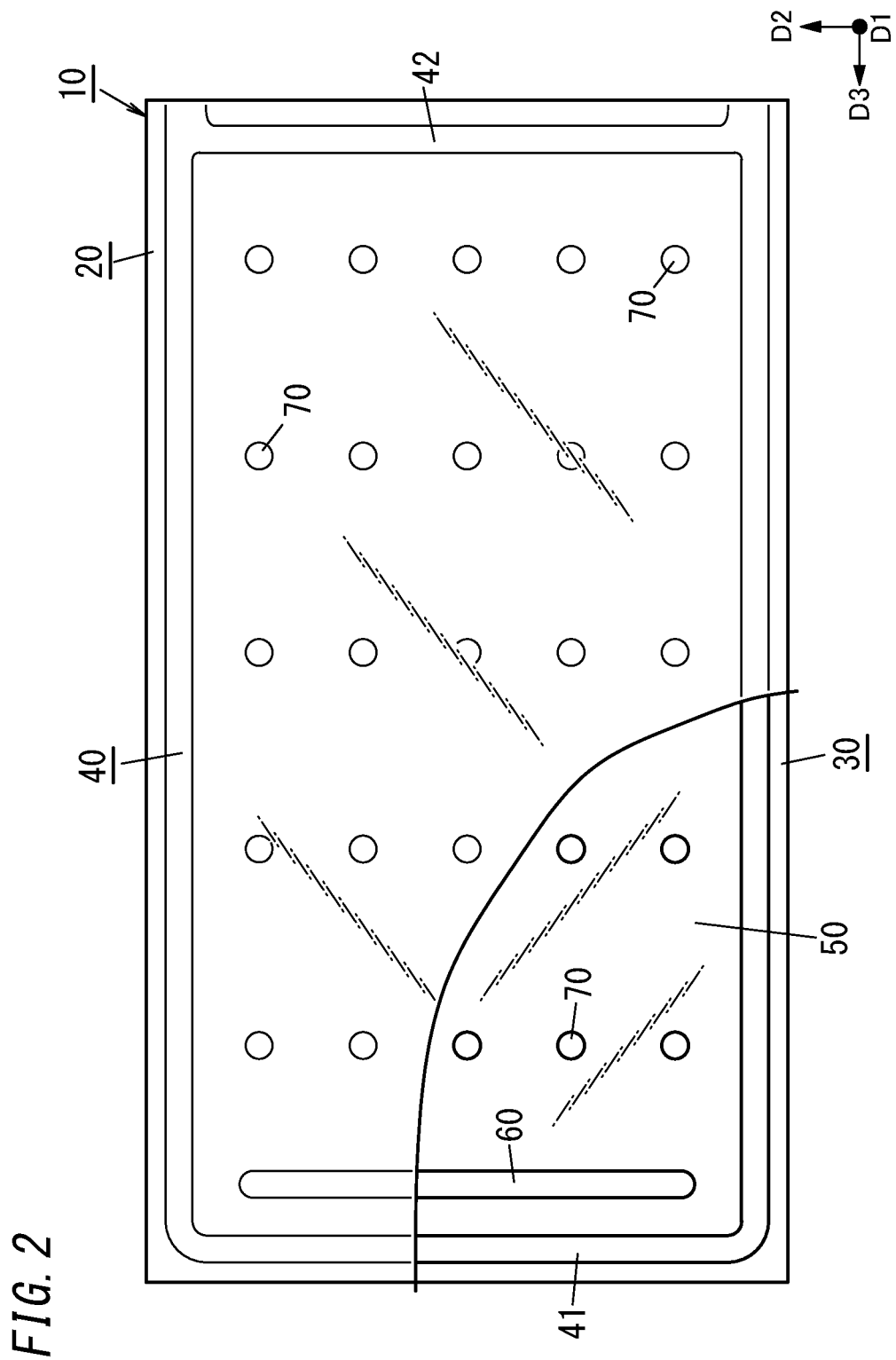
FIG. 2 is a plan view illustrating the glass panel unit.

The glass panel unit 10 shown in FIG. 2 is obtained through the preparatory steps and removing step described above.

FIG. 2 illustrates a glass panel unit (i.e., a glass panel unit as a final product) 10 according to this embodiment. The glass panel unit 10 includes the first glass pane 20, the second glass pane 30, and the frame member 40. In addition, the glass panel unit 10 further has the vacuum space 50 surrounded with the first and second glass panes 20, 30 and the frame member 40. The glass panel unit 10 further includes, within the vacuum space 50, the gas adsorbent 60 and the plurality of pillars (spacers) 70. In the glass panel unit 10, the exhaust port 700 is provided through neither of the first and second glass panes 20, 30.

The first and second glass panes 20, 30 may each have a rectangular flat plate shape. The first and second glass panes 20, 30 have the same planar shape.

The first glass pane 20 according to this embodiment is obtained by removing the unnecessary part 230 from the first glass pane 200 through the removing step. Thus, the first glass pane 20 has the same configuration as the first glass pane 200. That is to say, the first glass pane 20 includes a body that forms the main shape of the first glass pane 20 and the low-emissivity film 220. The body is covered with the low-emissivity film 220 in the vacuum space 50. The first glass pane 20 has a rectangular flat plate shape.

The second glass pane 30 according to this embodiment is obtained by removing the unnecessary part 320 from the second glass pane 300 through the removing step. Thus, the second glass pane 30 has the same configuration as the second glass pane 300. That is to say, the second glass pane 30 includes a body that forms the main shape of the second glass pane 30. In this embodiment, the second glass pane 30 consists of the body alone. Optionally, the second glass pane 30 may include not only the body but also a low-emissivity film corresponding to the low-emissivity film 220. If the second glass pane 30 includes a low-emissivity film, then the low-emissivity film covers, and is in contact with, the body of the second glass pane 30 in the vacuum space 50.

The frame member 40 is provided between the first glass pane 20 and the second glass pane 30 to hermetically bond the first glass pane 20 and the second glass pane 30 together. Thus, the vacuum space 50 is surrounded with the first glass pane 20, the second glass pane 30, and the frame member 40. The frame member 40 has a polygonal (e.g., quadrangular in this embodiment) frame shape corresponding to that of the first and second glass panes 20, 30. The frame member 40 is formed along the respective outer peripheries of the first and second glass panes 20, 30.

The plurality of spacers 70 are placed in the vacuum space 50. The plurality of spacers 70 is used to maintain a desired gap distance between the first and second glass panes 20, 30.

The gas adsorbent 60 includes the composite getter material. That is to say, the gas adsorbent 60 contains both a zeolite particle as a first getter material and a cerium compound particle as a second getter material. In this case, the gas adsorbent 60 is made of a mixture (powder) including the zeolite particle and the cerium compound particle.

Second Embodiment

Next, a method for manufacturing a glass panel unit 10A (hereinafter simply referred to as a "manufacturing method") according to a second embodiment will be described in detail with reference to FIGS. 9A-14. In the following description, any constituent element of this second embodiment, having the same function as a counterpart of the first embodiment described above, will be designated by the same reference numeral as that counterpart's, and description thereof will be omitted herein. In the following description of this embodiment, the direction D1 is a direction parallel to the thickness of the first glass pane 200, the direction D2 is a direction perpendicular to the direction D1, and the direction D3 is a direction perpendicular to both the direction D1 and the direction D2.

Figure 9A:
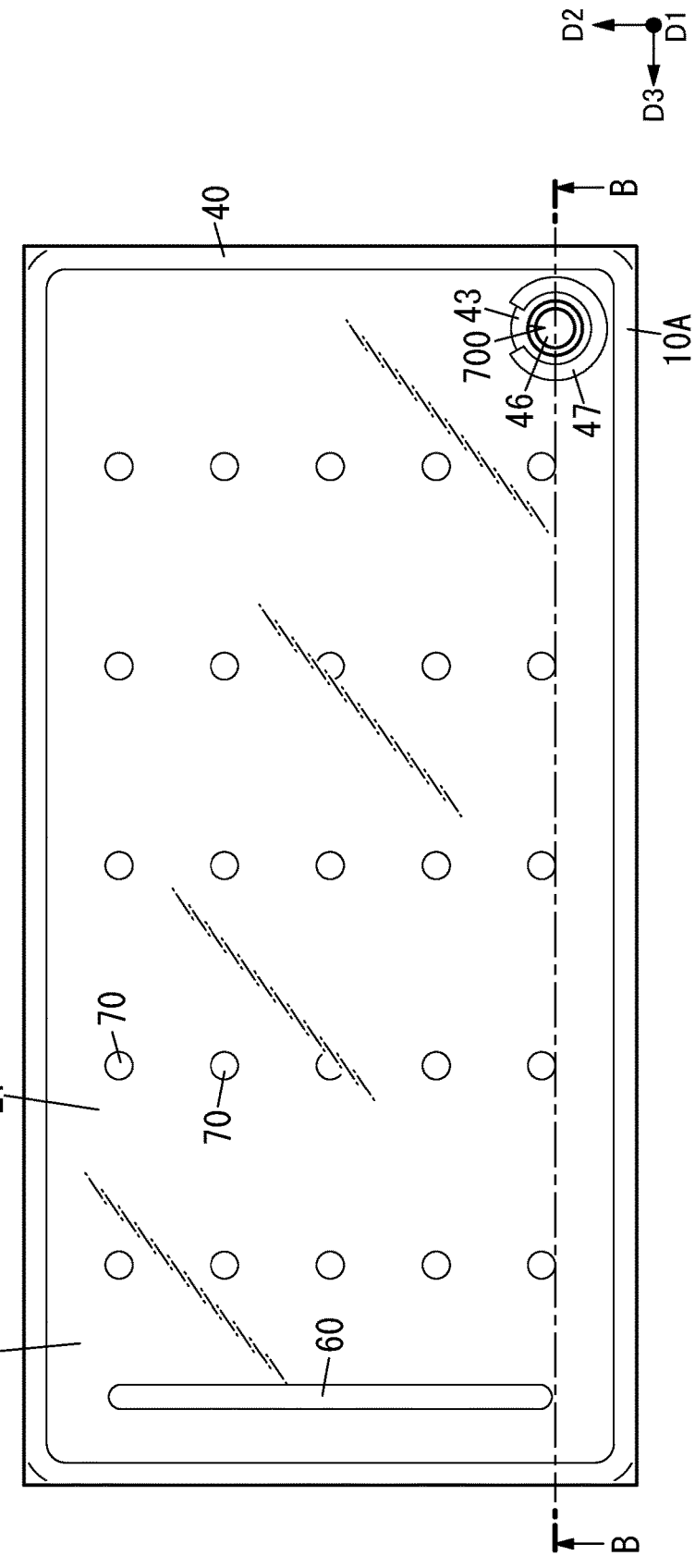
FIG. 9A is a plan view illustrating a glass panel unit according to a second embodiment.
Figure 9B:
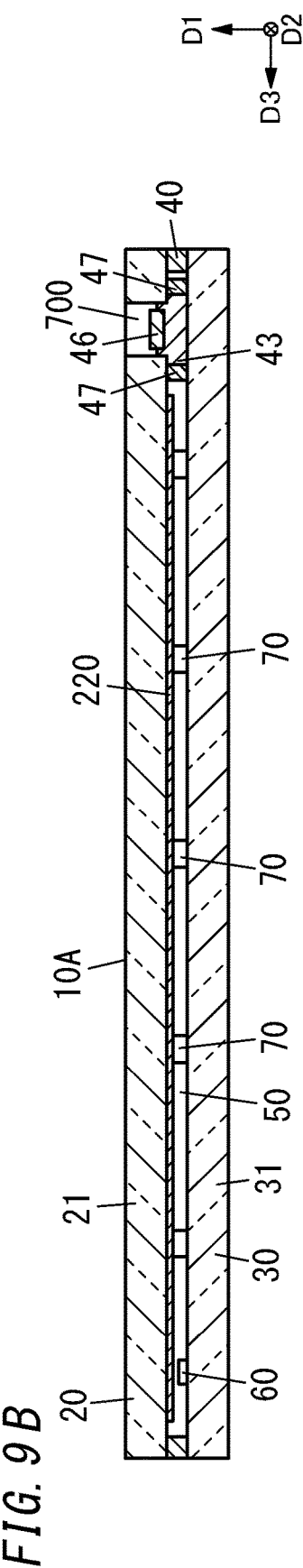
FIG. 9B is a cross-sectional view taken along the plane B-B in FIG. 9A.

The manufacturing method according to this embodiment is a method for manufacturing a glass panel unit 10A such as the one shown in FIGS. 9A and 9B.

The glass panel unit 10A includes a first glass pane 20, a second glass pane 30, a frame member 40, a port sealing material 43, and a gas adsorbent 60. The glass panel unit 10A further includes a vacuum space 50 surrounded with the first and second glass panes 20, 30 and the frame member 40. The glass panel unit 10A further includes, in the vacuum space 50, a plurality of pillars (spacers) 70 and a dam member 47.

The first and second glass panes 20, 30 each have a rectangular flat plate shape. The first and second glass panes 20, 30 have the same planar shape.

The first glass pane 20 includes a body 21, a low-emissivity film 220, and an exhaust port 700. The low-emissivity film 220 is provided in the vacuum space 50 to cover the body 21. The exhaust port 700 is sealed with the port sealing material 43. The low-emissivity film 220 is in contact with the body 21. The body 21 defines a main shape of the first glass pane 20, and therefore, has a rectangular flat plate shape. Examples of materials for the body 21 include soda lime glass, high strain point glass, chemically tempered glass, alkali-free glass, quartz glass, Neoceram, and thermally tempered glass. The body 21 has the same shape as the first glass pane 20.

The second glass pane 30 includes a body 31. The body 31 defines the main shape of the second glass pane 30, and therefore, has a rectangular flat plate shape. In this embodiment, the second glass pane 30 consists of the body 31 alone. Optionally, the second glass pane 30 may include not only the body 31 but also a low-emissivity film corresponding to the low-emissivity film 220. If the second glass pane 30 includes a low-emissivity film, then the low-emissivity film covers, and is in contact with, the body 31 in the vacuum space 50. Examples of materials for the body 31 include soda lime glass, high strain point glass, chemically tempered glass, alkali-free glass, quartz glass, Neoceram, and thermally tempered glass.

The dam member 47 may be formed in the shape of an incomplete ring (e.g., a C-ring) as shown in FIG. 9A. The dam member 47 is arranged along the peripheral edge of the exhaust port 700 in plan view. This allows the dam member 47 to dam the port sealing material 43 up within a space inside the dam member 47 itself. Thus, the port sealing material 43 may seal the exhaust port 700 up.

Figure 11:
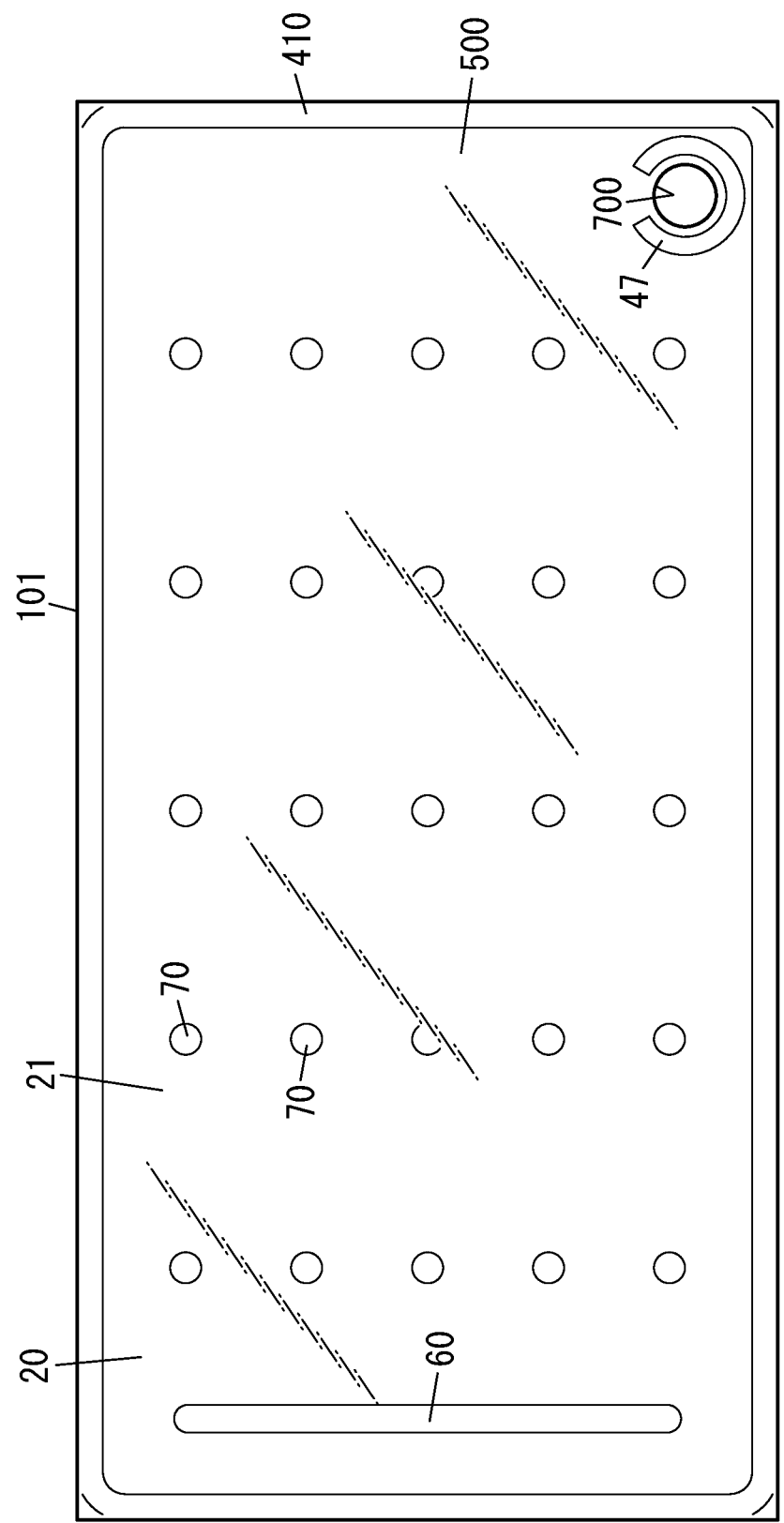
FIG. 11 is a plan view illustrating an assembly as an intermediate product of the glass panel unit according to the second embodiment.
Figure 12:
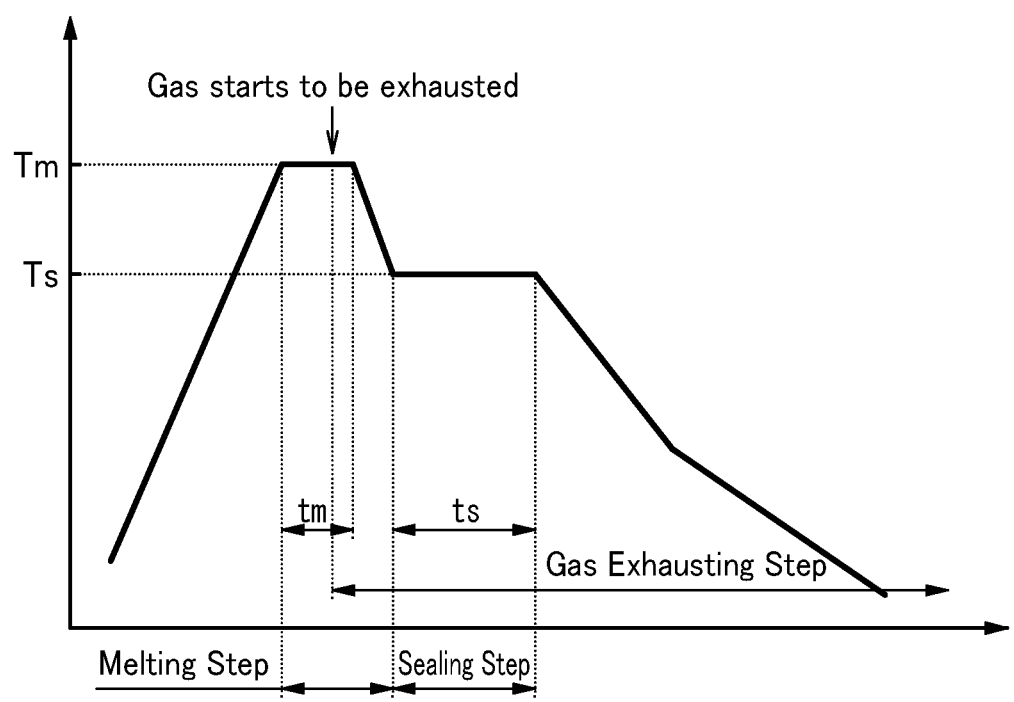
FIG. 12 shows how to perform respective steps of the method for manufacturing the glass panel unit according to the second embodiment.
Figure 13:
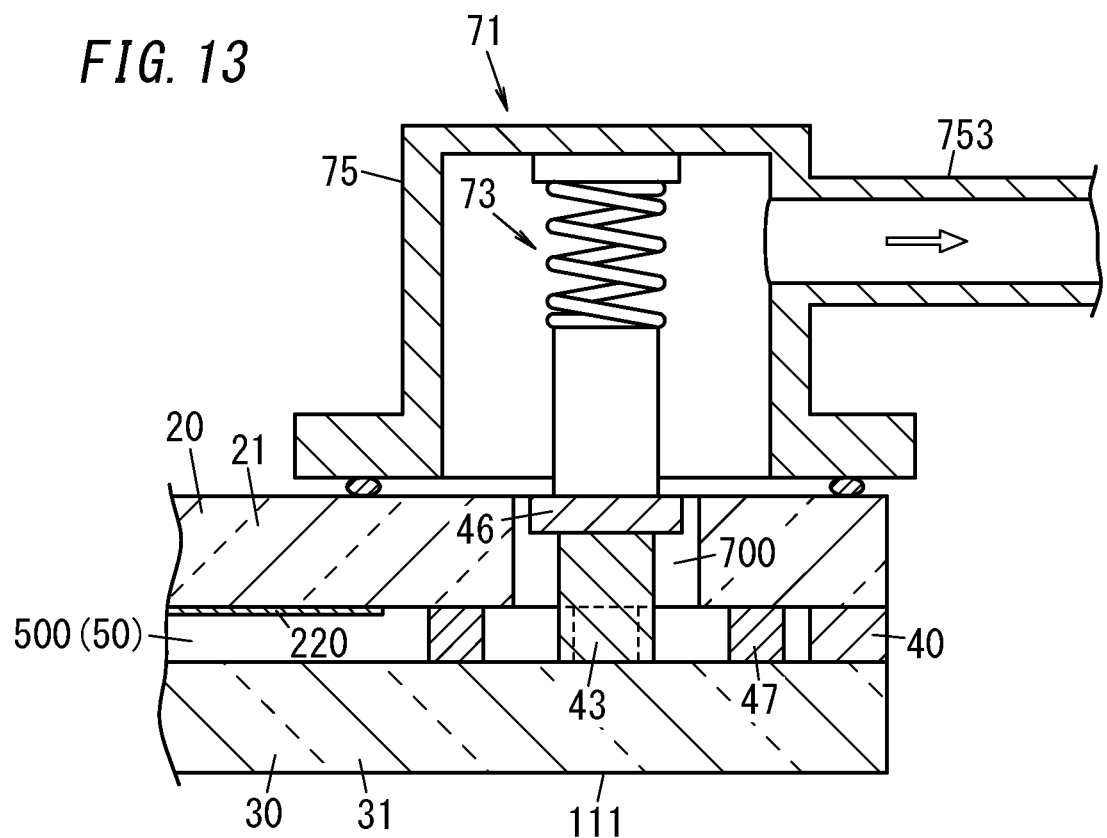
FIG. 13 illustrates another step of the method for manufacturing the glass panel unit according to the second embodiment.
Figure 14:
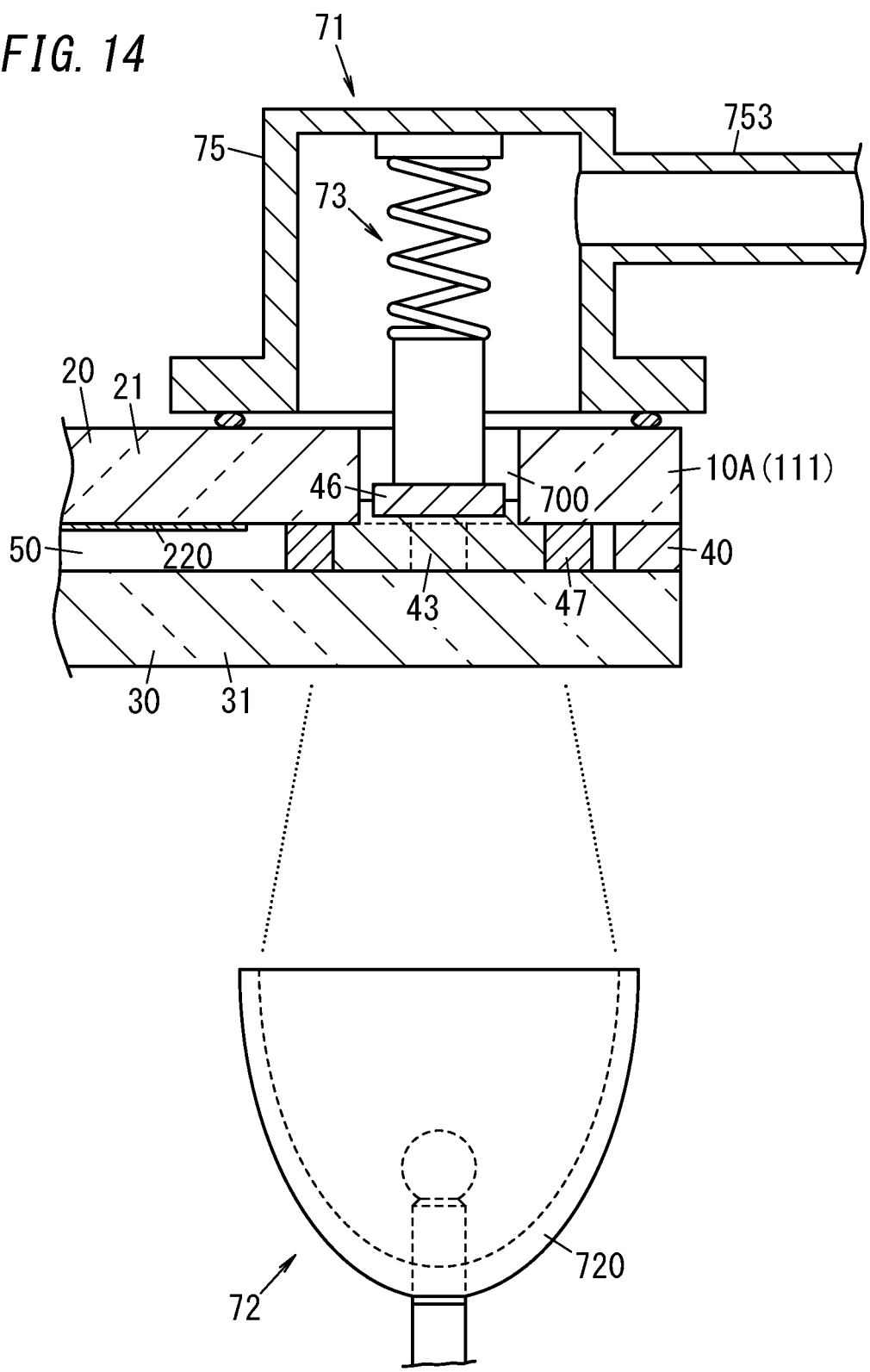
FIG. 14 illustrates still another step of the method for manufacturing the glass panel unit according to the second embodiment.

According to this embodiment, the glass panel unit 10A described above is obtained by performing a working step, an assembling step (see FIGS. 10 and 11), a bonding step (melting step; see FIG. 12), a gas exhausting step (see FIGS. 12 and 13), and a sealing step (see FIGS. 12 and 14). Nevertheless, the manufacturing method according to this embodiment does not include the removing step of the first embodiment.

The working step is the step of preparing a getter paste as in the first embodiment. The working step includes a heating step, a composite getter material making step, and a mixing step. The temperature of the heating step is suitably higher than the temperature of the sealing step (i.e., the sealing temperature Ts to be described later) and is more suitably higher than the temperature of the melting step (i.e., the melting temperature Tm to be described later). Optionally, the heating step may be omitted.

Figure 10:
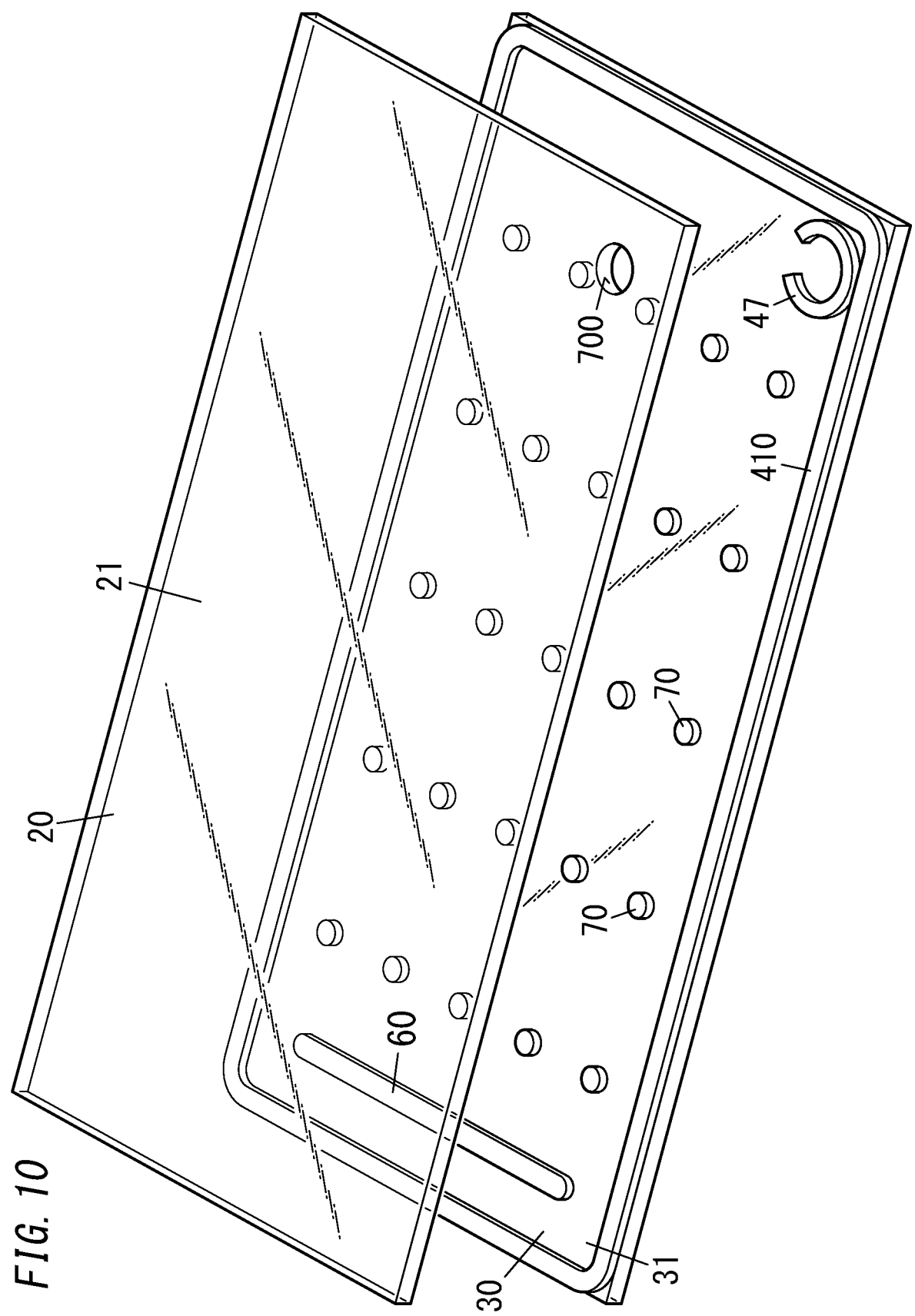
FIG. 10 illustrates a step of a method for manufacturing a glass panel unit according to the second embodiment.

The assembling step is the step of preparing an assembly 101 such as the one shown in FIG. 11. The assembly 101 includes the first and second glass panes 20, 30 and a peripheral wall 410 as shown in FIGS. 10 and 11. The assembly 101 further has an internal space 500 surrounded with the first and second glass panes 20, 30 and the peripheral wall 410. The assembly 101 further includes, in the internal space 500, the gas adsorbent 60, the plurality of pillars (spacers) 70, and the dam member 47. The assembly 101 further has the exhaust port 700. In the assembly 101, no gases have been exhausted from the internal space 500 yet, the peripheral wall 410 and the dam member 47 have not been melted and cured yet, and the exhaust port 700 has not been sealed yet.

The dam member 47 includes a sealing material (hot glue). The dam member 47 is provided on the second glass pane 30 and inside the internal space 500. The dam member 47 has the shape of an incomplete ring (such as a C-ring) arranged along the outer periphery of the exhaust port 700. The dam member 47 is spaced apart from, but provided rather close to, the peripheral wall 410. That is to say, the dam member 47 is provided at an end of the internal space 500. The dam member 47 includes the same sealing material as the peripheral wall 410. Providing this dam member 47 achieves the advantage of stabilizing the shape of the port sealing material 43 that has been pushed in the sealing step. However, the dam member 47 may be omitted.

The assembling step is the step of forming the first glass pane 20, the second glass pane 30, the gas adsorbent 60, the peripheral wall 410, the dam member 47, the internal space 500, the exhaust port 700, and the plurality of spacers 70 to obtain the assembly 101. The assembling step includes the following first through sixth steps. Optionally, the order in which the fourth and fifth steps are performed may be changed as appropriate.

The first step is the step of forming the first glass pane 20 and the second glass pane 30 (glass pane forming step). The first step may include forming the first glass pane 20 and the second glass pane 30 in a plate shape, for example. Optionally, the first step may include cleaning the first glass pane 20 and the second glass pane 30 as appropriate.

The second step is the step of providing the exhaust port 700. The second step may include providing the exhaust port 700 through the first glass pane 20. Optionally, the second step may include cleaning the first glass pane 20 as appropriate.

The third step is the step of forming the spacers 70 (spacer forming step). The third step includes providing a plurality of spacers 70 in advance and placing, using a chip mounter, for example, the plurality of spacers 70 at predetermined positions on the second glass pane 30. Optionally, the plurality of spacers 70 may be formed by photolithography and etching techniques. In that case, the plurality of spacers 70 may be made of a photocurable material, for example. Still alternatively, the plurality of spacers 70 may also be formed by a known thin film forming technique. Yet alternatively, the plurality of spacers 70 may also be formed by subjecting a resin film to punching or laser machining.

The fourth step is the step of arranging the peripheral wall 410 and the dam member 47 (sealing material arranging step). The fourth step includes forming the peripheral wall 410 by forming a frame-shaped sealing material by applying, using a dispenser, for example, a sealing material onto the second glass pane 30 along the outer periphery thereof and then drying the frame-shaped sealing material (see FIG. 10). In addition, the fourth step also includes forming the dam member 47 by forming an incomplete-ring-shaped sealing material by applying, using a dispenser, for example, a sealing material onto the second glass pane 30 at a position close to, but spaced from, the peripheral wall 410 and then drying the incomplete-ring-shaped sealing material (see FIG. 10). Optionally, the fourth step may also include prebaking the frame-shaped sealing material and the incomplete-ring-shaped sealing material while drying these sealing materials. For example, the second glass pane 30 on which the frame-shaped sealing material and the incomplete-ring-shaped sealing material have been formed may be heated at 480° C. for 20 minutes, for example. In that case, the first glass pane 20 may be heated along with the second glass pane 30. That is to say, the first glass pane 20 may be heated under the same condition (at 480° C. for 20 minutes) as the second glass pane 30. This reduces the difference in the degree of warpage between the first glass pane 20 and the second glass pane 30.

The fifth step is the step of forming the gas adsorbent 60 (gas adsorbent forming step). The fifth step includes applying, using a dispenser, for example, the getter paste prepared in the working step onto the second glass pane 30 and then drying the getter paste thus applied, thereby forming the gas adsorbent 60. That is to say, the fifth step includes a drying step of drying the getter paste.

The second glass pane 30, on which the peripheral wall 410, the dam member 47, the gas adsorbent 60, and the plurality of spacers 70 have been formed, is obtained by performing the first through fifth steps. According to this embodiment, it is not until the first through fifth steps have been finished that the sixth step is performed.

The sixth step is the step of arranging the first glass pane 20 and the second glass pane 30 (arrangement step). The sixth step includes arranging the first glass pane 20 and the second glass pane 30 such that the first glass pane 20 and the second glass pane 30 are parallel to each other and face each other as shown in FIG. 10.

The assembly 101 such as the one shown in FIG. 11 is obtained through the assembling step described above. After the assembling step has been performed, a melting step (bonding step), a gas exhausting step, and a sealing step are performed as shown in FIG. 12.

The melting step is the step of melting the peripheral wall 410 at a first predetermined temperature (melting temperature) Tm to hermetically bond the first glass pane 20 and the second glass pane 30 together with the peripheral wall 410 thus melted. Specifically, the assembly 101 is loaded into a baking furnace. Thereafter, the assembly 101 is heated at the melting temperature Tm for a first predetermined period of time (melting time) tm (see FIG. 12). Meanwhile, the melting step also includes melting the dam member 47 to hermetically bond the first glass pane 20 and the second glass pane 30 together with the dam member 47 thus melted. The melting temperature Tm is set at a temperature equal to or higher than the softening point of the sealing material. The melting temperature Tm is suitably equal to or lower than 500° C., more suitably equal to or lower than 350° C., and even more suitably equal to or lower than 300° C. Also, if at least one of the first glass pane 20 or the second glass pane 30 includes reinforced glass, the melting temperature Tm is suitably set at a temperature equal to or lower than 300° C. The sealing material may have a softening point of 265° C., for example. Note that the melting time tm may be selected arbitrarily according to the dimensions of the first glass pane 20 and the second glass pane 30 and the dimensions of the peripheral wall 410, for example.

Also, in this embodiment, the temperature in the baking furnace is lowered to perform the sealing step after the melting step. This causes the peripheral wall 410 to be cured and turn into the frame member 40 and also causes the dam member 47 to be cured. In this manner, a work in progress 111 is obtained.

The gas exhausting step is the step of exhausting gases from the internal space 500 through the exhaust port 700 to turn the internal space 500 into a vacuum space 50. The gases may be exhausted using a vacuum pump, for example. The vacuum pump may be connected to the work in progress 111 via an evacuation mechanism 71 as shown in FIG. 13. The evacuation mechanism 71 includes an exhaust head 75, a connector 753, and a pressing mechanism 73. The connector 753 connects the exhaust head 75 to the vacuum pump. The exhaust head 75 is pressed against the work in progress 111 such that the inside of the exhaust head 75 communicates with the internal space 500 through the exhaust port 700. Specifically, the exhaust head 75 is pressed hermetically against a portion, surrounding the opening of the exhaust port 700, of the first glass pane 20. Suctioning the air in the exhaust head 75 through the connector 753 (as indicated by the open arrow in FIG. 13) causes the gases to be exhausted from the internal space 500 through the exhaust port 700. The pressing mechanism 73 is provided inside the exhaust head 75. The pressing mechanism 73 is configured to push the port sealing material 43, inserted into the exhaust port 700, toward the second glass pane 30 while having the vacuum space 50 maintained by the evacuation mechanism 71. During the gas exhausting step, the port sealing material 43 and a plate 46, each of which has a diameter smaller than the inside diameter of the exhaust port 700, are inserted into the exhaust port 700 (see FIG. 13). The plate 46 is interposed between the port sealing material 43 and the pressing mechanism 73. In this state, the port sealing material 43 and the plate 46 are pushed elastically by the pressing mechanism 73 toward the second glass pane 30.

The port sealing material 43 is a solid sealing material made of a glass frit, for example. In this embodiment, the port sealing material 43 may have a block shape, for example. Alternatively, the port sealing material 43 may also have the shape of a cylinder with a vertical through hole. Optionally, the port sealing material 43 may contain not only the glass frit but also an organic binder similar to the one contained in the peripheral wall 410. In that case, even if a gas is released from the port sealing material 43 and other members into the vacuum space 50 after the sealing step, the gas is adsorbed into the gas adsorbent 60, thus reducing the chances of the gas remaining in the vacuum space 50.

In this embodiment, the gas exhausting step is started in the middle of the melting step as shown in FIG. 12. This allows the gases to be exhausted from the internal space 500 through the exhaust port 700 even during the melting step. This makes a difference in pressure between the inside and outside of the assembly 101 in the melting step. This pressure difference causes the first glass pane 20 and the second glass pane 30 to move toward, and approach, each other. This allows, even if the first and second glass panes 20, 30 have some warpage, the first and second glass panes 20, 30 to be hermetically bonded together more easily with the peripheral wall 410. In addition, starting the gas exhausting step in the middle of the melting step allows unnecessary gases, for example, released from the peripheral wall 410 and the dam member 47 during the melting step to be exhausted as well. This reduces the chances of those unnecessary gases, derived from the peripheral wall 410 and the dam member 47, remaining in the vacuum space 50 shown in FIG. 9B.

The sealing step is the step of locally heating, and thereby melting, the port sealing material 43 inserted into the exhaust port 700 to seal the exhaust port 700 with the port sealing material 43 thus melted. Even during the sealing step, the gas exhausting step is also carried on continuously as shown in FIG. 12. In addition, during the sealing step, the temperature is maintained at a second predetermined temperature (sealing temperature) Ts equal to or lower than the temperature in the melting step (the melting temperature) Tm. Specifically, the temperature in the sealing step is maintained at a sealing temperature Ts lower than the melting temperature Tm. The sealing step includes locally heating, and thereby melting, only the port sealing material 43 at a temperature higher than the sealing temperature Ts. The sealing temperature Ts may be 250° C., for example. In addition, in the sealing step, the port sealing material 43 is locally heated for a second predetermined period of time (sealing time) ts. The sealing time ts may be selected arbitrarily according to the size of the port sealing material 43. In short, the sealing step according to this embodiment is the step of spatially separating the vacuum space 50 from the space other than the vacuum space 50. In this embodiment, the space other than the vacuum space 50 corresponds to a space outside of the work in progress 111.

In this embodiment, the sealing step is performed using a heating mechanism 72 as shown in FIG. 14. The heating mechanism 72 is disposed opposite from the exhaust head 75 with respect to the work in progress 111. The heating mechanism 72 is configured to contactlessly heat the port sealing material 43 inserted into the exhaust port 700. In this case, the port sealing material 43 is locally heated by the heating mechanism 72, and therefore, the temperature of the work in progress 111 is maintained at the sealing temperature Ts.

The heating mechanism 72 includes an irradiator 720. The irradiator 720 is configured to heat the port sealing material 43 by irradiating the port sealing material 43 with an infrared ray (near-infrared ray) through the second glass pane 30.

Operating both the heating mechanism 72 and the pressing mechanism 73 during the sealing step allows the exhaust port 700 to be sealed with the port sealing material 43 with the vacuum space 50 maintained. In that case, the port sealing material 43 may be melted and the port sealing material 43 thus melted may be dammed up in the space inside the dam member 47. Thereafter, the port sealing material 43 thus melted is cured to seal the exhaust port 700.

That is to say, in the sealing step, the port sealing material 43 is not only heated and melted by the heating mechanism 72 but also pressed toward the second glass pane 30 by the biasing force applied by the pressing mechanism 73 via the plate 46. The port sealing material 43 is deformed to the point of coming into contact with the inner peripheral surface of the dam member 47 inside the vacuum space 50. The cutout portion of the dam member 47 is sealed up with the port sealing material 43 thus deformed.

Sealing the exhaust port 700 allows the vacuum space 50 to be maintained even after the exhaust head 75 has been removed. Before the exhaust head 75 is removed, the port sealing material 43 that has been melted is cured by heat removal. After the exhaust port 700 has been sealed up with the port sealing material 43, the gas exhausting step is stopped. This allows the glass panel unit 10A shown in FIGS. 9A and 9B to be obtained.

<Use of Composite Getter Material>

In the foregoing description, the composite getter material is supposed to be used in each of the glass panel units 10, 10A according to the first and second embodiments. However, this is only an example and should not be construed as limiting. Alternatively, the composite getter material according to the present disclosure may also be used in MEMS devices and electronic devices such as a display. Naturally, a getter paste containing the composite getter material may also be used in MEMS devices and electronic devices such as a display.

Third Embodiment

A method for manufacturing a glass panel unit 10 according to a third embodiment is different from that of the first embodiment in the getter paste making step of the working step and the configuration of the gas adsorbent. In the following description, any constituent element of this third embodiment, having the same function as a counterpart of the first embodiment described above, will be designated on the drawings by the same reference numeral as that counterpart's, and description thereof will be sometimes omitted herein.

In this embodiment, the getter paste making step includes separately obtaining a zeolite particle as a first getter material and a cerium compound particle as a second getter material without mixing the zeolite particle and the cerium compound particle with each other. That is to say, in the first embodiment, the composite getter material making step is the step of making a composite getter containing both the zeolite particle and the cerium compound particle. The manufacturing method according to this embodiment includes a getter paste making step of separately forming a first getter paste containing the zeolite particle and a second getter paste containing the cerium compound particle. That is to say, the first getter paste does not contain the second getter material (cerium compound particle). The second getter paste does not contain the first getter material (zeolite particle).

Figure 15:
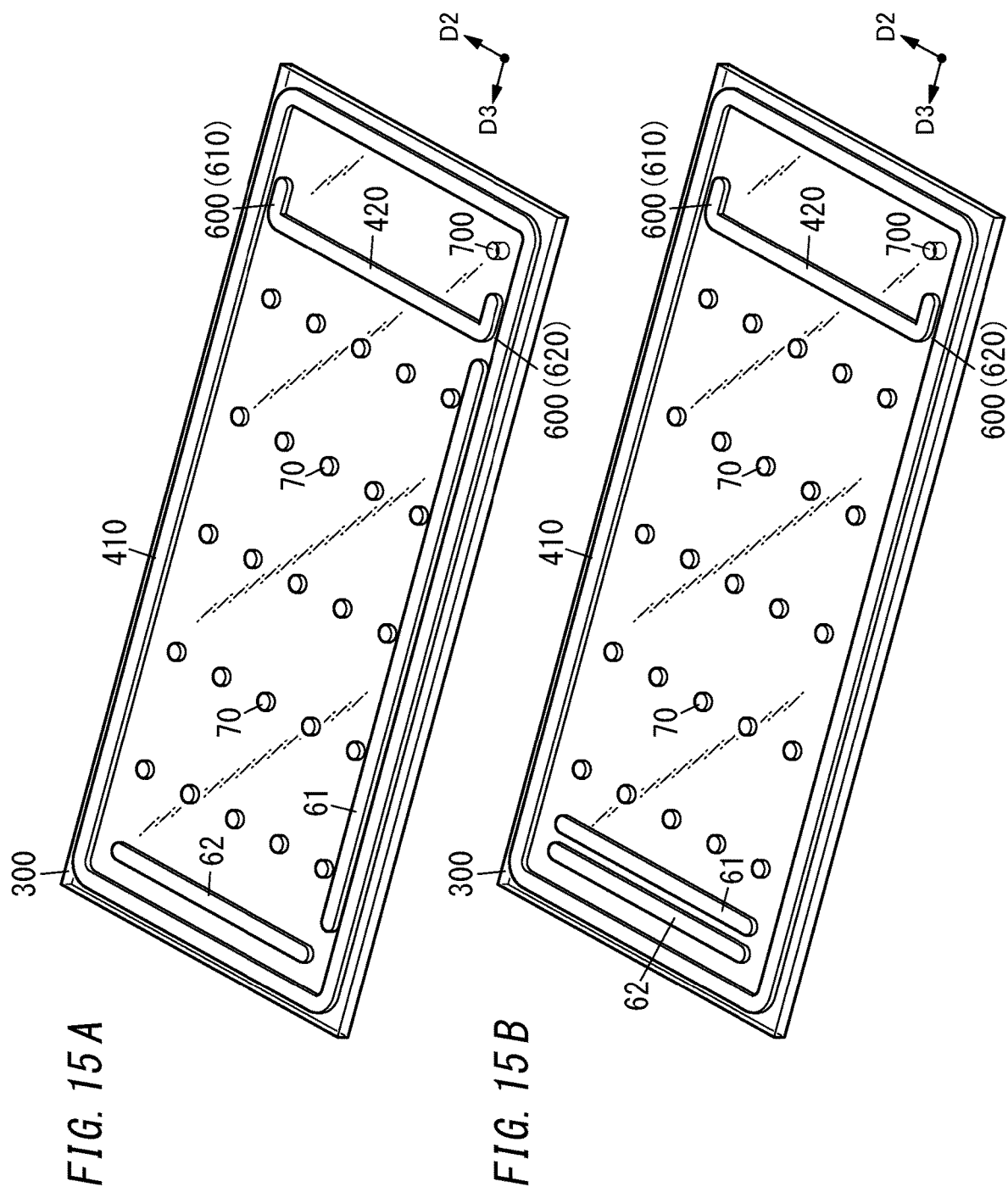
FIG. 15A illustrates an assembly as an intermediate product of a glass panel unit according to a third embodiment.
FIG. 15B illustrates an assembly as another intermediate product of the glass panel unit according to the third embodiment.

In addition, in this embodiment, the gas adsorbent 60 according to the first embodiment is replaced with a first gas adsorbent 61 and a second gas adsorbent 62 as shown in FIGS. 15A and 15B. The first gas adsorbent 61 contains the first getter material. That is to say, the first gas adsorbent 61 contains the zeolite particle. The second gas adsorbent 62 includes the second getter material. That is to say, the second gas adsorbent 62 contains the cerium compound particle.

In FIG. 15A, the second gas adsorbent 62 is provided adjacent to a second end along the length of the second glass pane 300 (i.e., adjacent to the left end in FIG. 15A) to extend along the width of the second glass pane 300 (i.e., in the direction D2). On the other hand, the first gas adsorbent 61 is provided adjacent to one end along the width of the second glass pane 300 to extend along the length of the second glass pane 300 (i.e., in the direction D3). If the first and second glass panes 200, 300 are rectangles, each of which has a longer dimension in the direction D3 than in the direction D2, the first gas adsorbent 61 is formed to be longer than the second gas adsorbent 62. This allows more zeolite to be provided in the internal space 500 than the cerium compound.

On the other hand, in FIG. 15B, both the first gas adsorbent 61 and the second gas adsorbent 62 are provided adjacent to a second end along the length of the second glass pane 300 (i.e., adjacent to the left end in FIG. 15B) to extend along the width of the second glass pane 300 (i.e., in the direction D2). That is to say, the first gas adsorbent 61 and the second gas adsorbent 62 are arranged parallel to each other. This may improve the design of the glass panel unit 10. Note that the first gas adsorbent 61 and the second gas adsorbent 62 do not have to be the ones shown in FIG. 15A or 15B but may also have any other shape or be arranged at any other positions.

In this embodiment, the glass panel unit 10 is manufactured in the same way as in the first embodiment except the mixing step and the fourth step of the assembling step.

In this embodiment, a getter paste is obtained by mixing a getter material and a solvent in the mixing step. In this case, a first getter paste in which the first getter material and a solvent are mixed and a second getter paste in which the second getter material and a solvent are mixed are obtained. The solvent of the first getter paste and the solvent of the second getter paste may be of the same type or two different types, whichever is appropriate.

In this embodiment, the first gas adsorbent 61 and the second gas adsorbent 62 are formed through the fourth step of the assembling step as in the first embodiment. In this case, the first getter paste and the second getter paste are each applied onto the second glass pane 300 using a dispenser, for example. Then, the getter pastes thus applied are dried to form the first gas adsorbent 61 and the second gas adsorbent 62 separately.

Forming the first gas adsorbent 61 containing the zeolite and the second gas adsorbent 62 containing the cerium compound separately as in this embodiment, instead of forming the gas adsorbent 60 containing the zeolite and the cerium compound as in the first embodiment, reduces the chances of the zeolite (in particular, Cu-ZSM5) being affected by the oxygen desorbed from the cerium compound (in particular, $CeO_2$). This may allow the first gas adsorbent 61 to have high adsorption capability.

Fourth Embodiment

A method for manufacturing a glass panel unit 10 according to a fourth embodiment is different from that of the first embodiment in the getter material making step of a working step and the configuration of the gas adsorbent. In the following description, any constituent element of this fourth embodiment, having the same function as a counterpart of the first embodiment described above, will be designated on the drawings by the same reference numeral as that counterpart's, and description thereof will be sometimes omitted herein.

In this embodiment, the getter paste making step includes obtaining a first getter paste containing a particle of a copper-ion-exchanged zeolite as the first getter material and a second getter paste containing a particle of a cerium compound as the second getter material. That is to say, in the first embodiment, the composite getter material contains both the zeolite particle and the cerium compound particle. On the other hand, in this embodiment, the first getter paste containing the copper-ion-exchanged zeolite particle and the second getter paste containing the cerium compound are formed separately. That is to say, the first getter paste does not contain the second getter material (cerium compound particle). The second getter paste does not contain the first getter material (copper-ion-exchanged zeolite particle).

Figure 16:
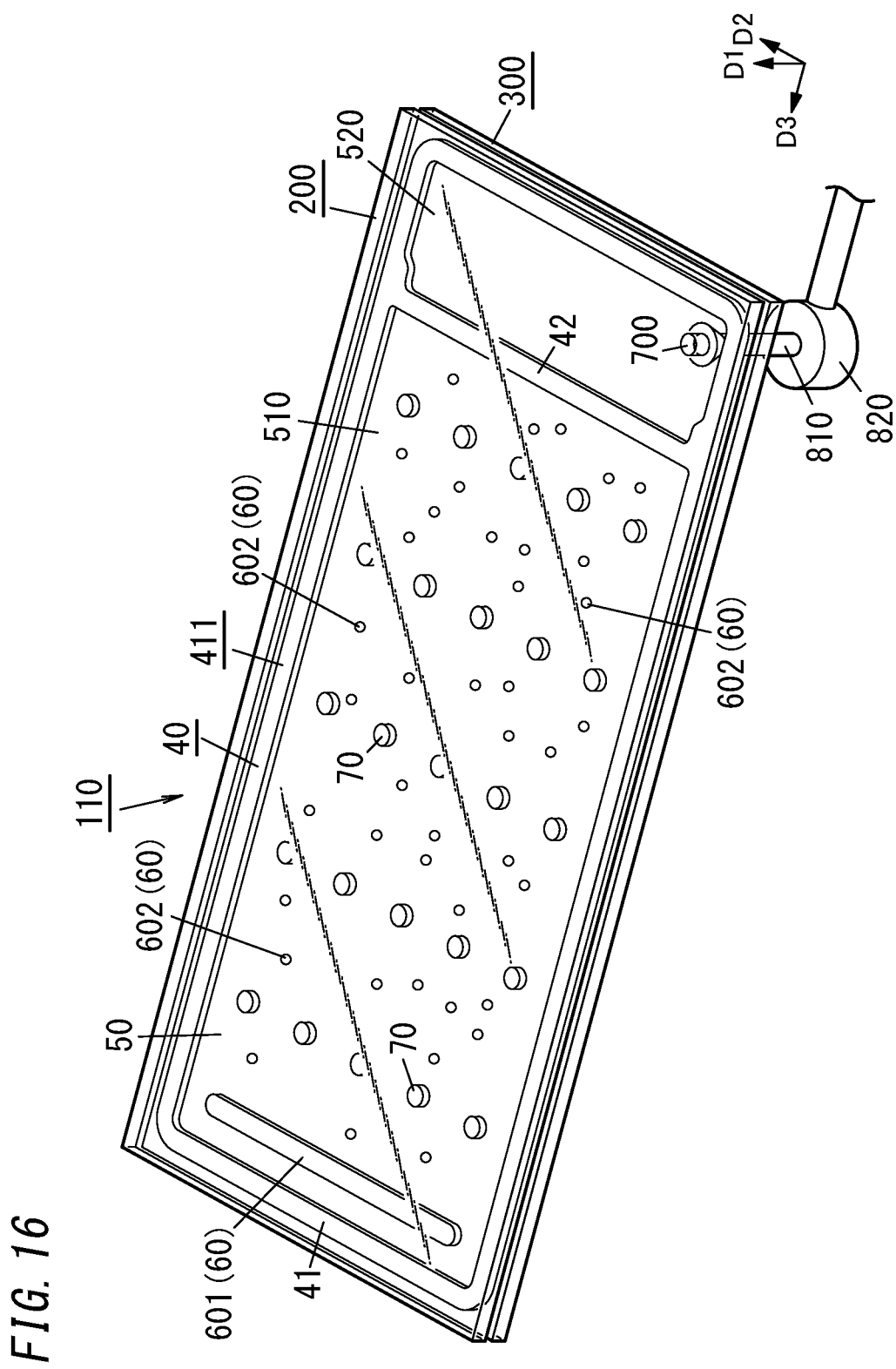
FIG. 16 illustrates a step of a method for manufacturing a glass panel unit according to a fourth embodiment.

In addition, in this embodiment, a first gas adsorbent 601 and a second gas adsorbent 602 are provided as the gas adsorbent 60 of the first embodiment as shown in FIG. 16. The first gas adsorbent 601 contains the first getter material. That is to say, the first gas adsorbent 601 contains the copper-ion-exchanged zeolite particle. The second gas adsorbent 602 contains the second getter material. That is to say, the second gas adsorbent 602 contains the cerium compound particle.

As can be seen, in this embodiment, the gas adsorbent 60 includes at least two types of getter materials (namely, the first getter material and the second getter material). The two types of getter materials contain a copper-ion-exchanged zeolite particle and a cerium compound particle, respectively. That is to say, the first getter material contains the copper-ion-exchanged zeolite particle. The second getter material contains the cerium compound particle. The first gas adsorbent 601 and the second gas adsorbent 602 are arranged separately from each other in the vacuum space 50. Thus, the first gas adsorbent 601 and the second gas adsorbent 602 are arranged at two different positions.

In this case, the state where the first gas adsorbent 601 and the second gas adsorbent 602 are arranged at two different positions may also refer to a situation where the respective surfaces of the first gas adsorbent 601 and the second gas adsorbent 602 are in contact with each other. In that case, the respective surfaces of the first gas adsorbent 601 and the second gas adsorbent 602 may be in contact with each other either entirely or only partially. For example, if the first gas adsorbent 601 and the second gas adsorbent 602 are arranged to be laid one on top of the other, then the first gas adsorbent 601 and the second gas adsorbent 602 are located at two different vertical positions (different positions in the direction D1) with respect to the first glass pane 200 and the second glass pane 300. Thus, in that case, the copper-ion-exchanged zeolite particle and the cerium compound particle are in contact with each other only on the boundary between the first gas adsorbent 601 and the second gas adsorbent 602. Therefore, the first gas adsorbent 601 and the second gas adsorbent 602 with such an arrangement may also be regarded as being arranged at two different positions.

Furthermore, the first gas adsorbent 601 and the second gas adsorbent 602 may also be arranged to be spaced apart from each other. As used herein, the state where the first gas adsorbent 601 and the second gas adsorbent 602 are arranged to be spaced apart from each other refers to a situation where the first gas adsorbent 601 and the second gas adsorbent 602 are arranged out of contact with each other. For example, even if one gas adsorbent selected from the group consisting of the first gas adsorbent 601 and the second gas adsorbent 602 is disposed on the first glass pane 200, the other gas adsorbent 601, 602 is disposed on the second glass pane 300, and the first gas adsorbent 601 and the second gas adsorbent 602 look overlapping with each other when viewed perpendicularly to either the first glass pane 200 or the second glass pane 300 (i.e., when viewed in the direction D1 shown in FIG. 16), the first gas adsorbent 601 and the second gas adsorbent 602 are also arranged at two different vertical positions (different positions in the direction D1) with respect to the first glass pane 200 and the second glass pane 300, and therefore, may be regarded as being arranged to be spaced apart from each other.

Nevertheless, the copper-ion-exchanged zeolite particle and the cerium compound particle are suitably arranged such that their contact area is as small as possible to reduce the effect of the oxygen desorbed from the cerium compound particle.

In FIG. 16, the first gas adsorbent 601 is provided adjacent to a second end along the length of the second glass pane 300 (i.e., adjacent to the left end in FIG. 16) to extend along the width of the second glass pane 300 (i.e., in the direction D2). On the other hand, a plurality of second gas adsorbents 602 are arranged as dots. That is to say, a plurality of dotted second gas adsorbents 602 are arranged over the entire surface (i.e., the surface facing the first space 510) of the second glass pane 300. Each of the plurality of second gas adsorbents 602 is formed to have a smaller size than any of the spacers 70. In addition, the plurality of second gas adsorbents 602 are arranged to be spaced from the spacers 70 and the first gas adsorbent 601. That is to say, each of the plurality of second gas adsorbents 602 is disposed either between adjacent spacers 70 or between one of the spacers 70 and the first gas adsorbent 601.

In this embodiment, the glass panel unit 10 is manufactured in the same way as in the first embodiment except the mixing step and the fourth step of the assembling step.

In this embodiment, the first gas adsorbent 601 is made of a first getter paste. The first getter paste is obtained by mixing a getter material and a solvent through the mixing step as in the first embodiment. In this case, the first getter material and the solvent are mixed together. On the other hand, the second gas adsorbent 602 is configured as a powder including the getter material. That is to say, the second gas adsorbent 602 is configured as a powder including a plurality of cerium compound particles. The second gas adsorbent 602 may be configured as a cerium oxide powder, for example. Examples of the cerium oxide powder include a cerium oxide nano-powder (a commercially available product with model number 50-1400 as well as the one used in eighteenth and nineteenth manufacturing examples to be described later) manufactured by Strem Chemicals, Inc. This cerium oxide powder is a collection of nanoparticles (with a particle size of 1-100 nm) as cerium oxide compound particles. Using such a nano-powder of cerium oxide particles as the second gas adsorbent 602 in this manner makes the second gas adsorbent 602 scattered less visible, thus reducing the chances of affecting the transparency of the glass panel unit 10. In addition, the second gas adsorbent 602 configured as such a nano-powder provides a larger (increased) surface area, compared to the second gas adsorbent 602 configured as a gross bulk. This contributes to increasing the adsorption capability of the second gas adsorbent 602 even if the nano-powder has no carrier substances.

In addition, in this embodiment, the first gas adsorbent 601 and the second gas adsorbent 602 are formed through the fourth step of the assembling step as in the first embodiment. In this case, the second gas adsorbent 602 is formed by scattering a nano-powder of the cerium oxide particles over the entire surface of the second glass pane 300. On the other hand, the first gas adsorbent 601 is formed by applying, using a dispenser, for example, the first getter paste onto the second glass pane 300 and then drying the first getter paste thus applied.

In the first, second, and third embodiments described above, the gas adsorbent 60 is formed around the outer periphery on the second glass pane 300, and therefore, the amount of the getter paste to be applied is so limited that it is sometimes difficult to form the gas adsorbent 60 of a large size. On the other hand, according to this embodiment, if the second gas adsorbent 602 is made of only the nano-powder of the cerium oxide particles, then the second gas adsorbent 602 may also be formed even in a narrow space by scattering the nano-powder of the cerium oxide particles over the entire second glass pane 300. This allows the space to be made use of efficiently.

In addition, zeolite particles change their color when adsorbing a gas. Thus, the degree of vacuum inside the glass panel unit 10 (i.e., in the vacuum space 50 thereof) may be checked more easily by the discoloration of the first gas adsorbent 601 including the zeolite particle. On the other hand, when the gas adsorbent 60 is formed by mixing the zeolite particle and the cerium oxide particles, it becomes difficult to check the change in the color of the gas adsorbent 60. In this embodiment, the copper-ion-exchanged zeolite particle and the cerium compound particles are arranged separately, thus enabling checking not only the change in the color of the copper-ion-exchanged zeolite particle but also the degree of vacuum in the vacuum space 50.

In addition, according to this embodiment, the first gas adsorbent 601 containing the zeolite particle and the second gas adsorbent 602 containing the cerium compound particles are formed separately from each other. This reduces the chances of the zeolite (in particular, Cu-ZSM5) particle being affected by the oxygen desorbed from the cerium compound (in particular, $CeO_2$) particles. Thus, high adsorption capability may be achieved by the first gas adsorbent 601.

EXAMPLES

The present disclosure will be described more specifically by way of illustrative examples.

<Analysis of Cerium Oxide (IV)>

Figure 17:
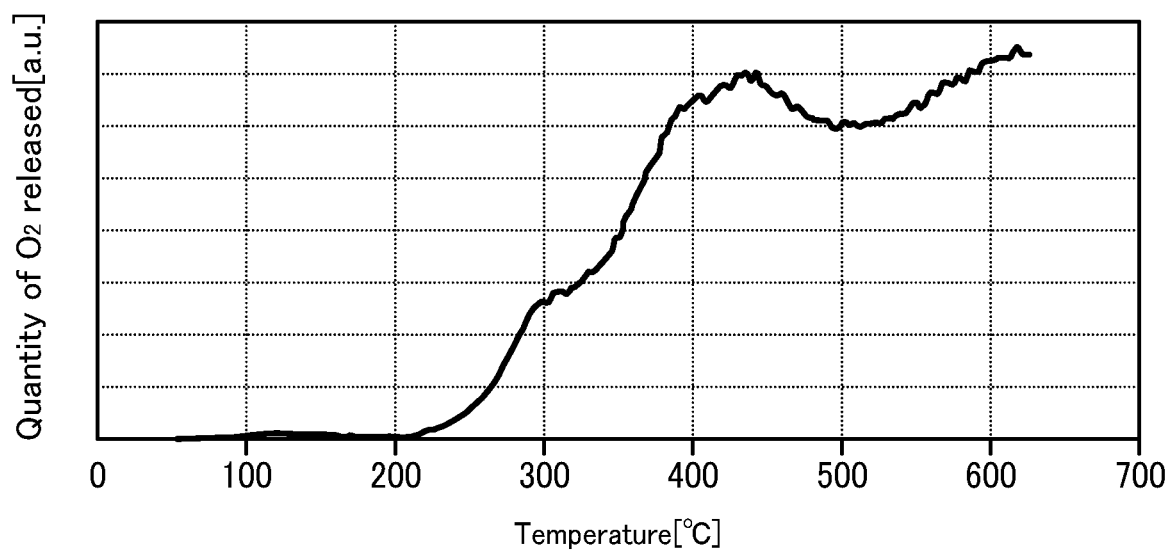
FIG. 17 is a graph showing how the intensity (detection intensity) corresponding to the quantity of oxygen desorbed from a cerium oxide (IV) powder when the cerium oxide (IV) powder is heated changes with the temperature.

A powder of cerium oxide (IV) that had not been heated yet was loaded in a chamber. After that, gases were exhausted from the chamber to create a vacuum space there. Subsequently, the temperature in the chamber was increased at a temperature increase rate of 30° C./min and oxygen desorbed from the cerium oxide (IV) powder was quantified by temperature-programmed desorption gas analysis at each temperature. The results are shown as an oxygen release curve in FIG. 17. Note that the "intensity" indicated by the ordinate in FIG. 17 is a common logarithm of the oxygen detection intensity (oxygen ion current value). The results shown in FIG. 17 reveal that a lot of oxygen desorbed from the cerium oxide (IV) powder at temperatures equal to or higher than of 200° C.

Manufacturing Example A

Manufacturing Example A of the present disclosure will be described as the following first to sixth manufacturing examples.

First to Sixth Manufacturing Examples

Each manufacturing example was implemented using the following members:
 First glass pane (dimensions of the glass pane: width×length×thickness=300 mm×300 mm×3 mm; a low-E glass emissivity=0.04);
 Second glass pane (dimensions of the glass pane: width×length×thickness=300 mm×300 mm×3 mm);
 Spacers (dimensions: diameter×height=0.5 mm×0.1 mm; made of a resin); and
 Glass frit: vanadium-based glass frit (having a softening point of 265° C.).

First Manufacturing Example

First, a cerium oxide (IV) powder (2 parts by mass) and a copper-ion-exchanged zeolite (Cu-ZSM5) powder (98 parts by mass) were mixed together to make a composite getter material. Then, 100 parts by mass of the composite getter material and 400 parts by mass of water were uniformly mixed together to make a getter paste. Next, the getter paste was applied with a spatula onto one surface of the second glass pane having an exhaust port so that the composite getter material would amount to 50 mg. After having been applied, the getter paste on the second glass pane was dried to form a gas adsorbent. After the gas adsorbent had been formed, a peripheral wall of a sealing material, a partition of the sealing material, air passages, and a plurality of spacers were further formed on one surface of the second glass pane. When the peripheral wall and the partition were formed, 88 parts by mass of the glass frit, 2 parts by mass of an organic binder, and 10 parts by mass of an organic solvent were mixed together to make the sealing material, which was applied onto the second glass pane and then dried. When the sealing material was made, aliphatic polycarbonate was used as an organic binder and ethyl carbitol acetate was used as an organic solvent. Also, when the spacers were formed, the plurality of spacers were placed with a chip mounter onto the second glass pane such that adjacent spacers had an interval of 20 mm between themselves.

Next, the first glass pane was arranged to face the second glass pane. Thus, an assembly in which an internal space was formed between the first glass pane and the second glass pane was obtained.

Subsequently, a vacuum pump was connected to the exhaust port via an exhaust pipe and a sealing head and then the assembly was loaded into a melting furnace. After having been loaded, the assembly was heated at 285° C. (first melting temperature) for 15 minutes to melt the peripheral wall once. When the peripheral wall was melted, the air passages were not closed yet.

After the peripheral wall had been melted, the temperature in the melting furnace was lowered to 250° C. as the exhaust temperature. Then, the vacuum pump was activated to exhaust a gas from the internal space at 250° C. for 120 minutes.

Thereafter, with the vacuum pump kept running, the temperature in the melting furnace was increased to 290° C. as the second melting temperature, at which the assembly was heated for 15 minutes. This heating caused the partition to be deformed to form a boundary wall closing the air passages.

After the boundary wall had been formed, the temperature in the melting furnace was lowered to room temperature. Thereafter, the vacuum pump was stopped to remove the sealing head. After the sealing head had been removed, an unnecessary portion was cut off to obtain a glass panel unit.

Second Manufacturing Example

A glass panel unit was manufactured in the same way as in the first manufacturing example except that a cerium oxide (IV) powder (10 parts by mass) and a copper-ion-exchanged zeolite (Cu-ZSM5) powder (90 parts by mass) were used.

Third Manufacturing Example

A glass panel unit was manufactured in the same way as in the first manufacturing example except that a cerium oxide (IV) powder (20 parts by mass) and a copper-ion-exchanged zeolite (Cu-ZSM5) powder (80 parts by mass) were used.

Fourth Manufacturing Example

A glass panel unit was manufactured in the same way as in the first manufacturing example except that a cerium oxide (IV) powder (50 parts by mass) and a product obtained by subjecting a copper-ion-exchanged zeolite (Cu-ZSM5) powder (50 parts by mass) to heat treatment as in a second preparation example were used.

Fifth Manufacturing Example

A glass panel unit was manufactured in the same way as in the first manufacturing example except that the content of the cerium oxide (IV) powder was set at 100 parts by mass and no copper-ion-exchanged zeolite (Cu-ZSM5) powder was used.

Sixth Manufacturing Example

A glass panel unit was manufactured in the same way as in the first manufacturing example except that the content of the copper-ion-exchanged zeolite (Cu-ZSM5) powder was set at 100 parts by mass and no cerium oxide (IV) powder was used.

{Evaluation}

<Thermal Conductance>

The thermal conductance of the glass panel unit according to each of the manufacturing examples described above was evaluated in the following procedure. With a high-temperature part and a low-temperature part of a measuring system separated by the glass panel unit, a first thermometer was put on an external surface of the first glass pane and a second thermometer and a sensor were put on an external surface of the second glass pane. After these members were arranged in this manner, the flux of the heat transferred from the heating unit to the cooling unit via the glass panel unit was detected by the sensor. In addition, the surface temperature of the first glass pane was measured by the first thermometer and the surface temperature of the second glass pane was measured by the second thermometer.

The thermal conductance of the glass panel unit was calculated by substituting the heat flux, the surface temperature of the first glass pane, and the surface temperature of the second glass pane thus measured into the following Expression (1):

$$Q=C(T1-T2) \quad (1)$$

where Q indicates the heat flux ($W/m^2$), T1 indicates the surface temperature (K) of the first glass pane, T2 indicates the surface temperature (K) of the second glass pane, and C indicates the thermal conductance ($W/m^2K$).

Figure 18A:
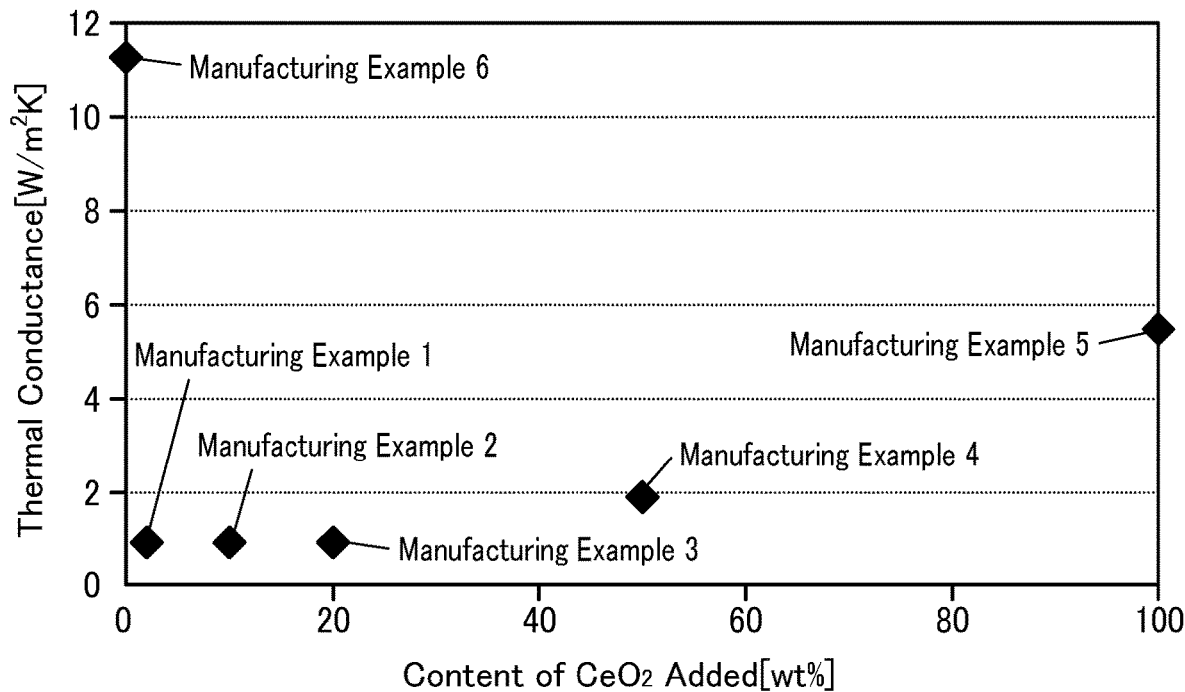
FIG. 18A plots data points showing relationships between the content of cerium oxide (IV) added to a composite getter material when a copper-ion-exchanged zeolite powder was used and the thermal conductance of the glass panel unit.

FIG. 18A shows the relationship between the thermal conductance values of the respective manufacturing examples and the content of cerium oxide (IV) ($CeO_2$) added. As can be seen from the results shown in FIG. 18A, the thermal conductance values of the first to fourth manufacturing examples tended to be lower than the thermal conductance values of the fifth and sixth manufacturing examples. The present inventors believed that these tendencies showed that in the vacuum space, $CeO_2$ would have adsorbed carbon dioxide and the copper-ion-exchanged zeolite would have adsorbed not only oxygen desorbed from $CeO_2$ but also gases such as nitrogen and methane gases as well. Thus, the present inventors presumed that using the copper-ion-exchanged zeolite and $CeO_2$ in combination should reduce the chances of gases remaining in the vacuum space.

In addition, the results shown in FIG. 18A revealed that the thermal conductance tended to be lowered by adding $CeO_2$ and that the smaller the content of $CeO_2$ added was, the lower the thermal conductance tended to be. The present inventors presumed that these tendencies showed that the percentage of oxygen desorbed from $CeO_2$ could be reduced and the chances of gases remaining in the vacuum space could be further reduced.

Next, a situation where the copper-ion-exchanged zeolite was replaced with a hydrogen-ion-exchanged zeolite (HZSM-5) will be described. As used herein, the hydrogen-ion-exchanged zeolite refers to a hydrogen-ion-exchanged ZSM-5 type zeolite. Thus, the hydrogen-ion-exchanged zeolite is a component in which a hydrogen ion is carried by a zeolite structure.

Figure 18B:
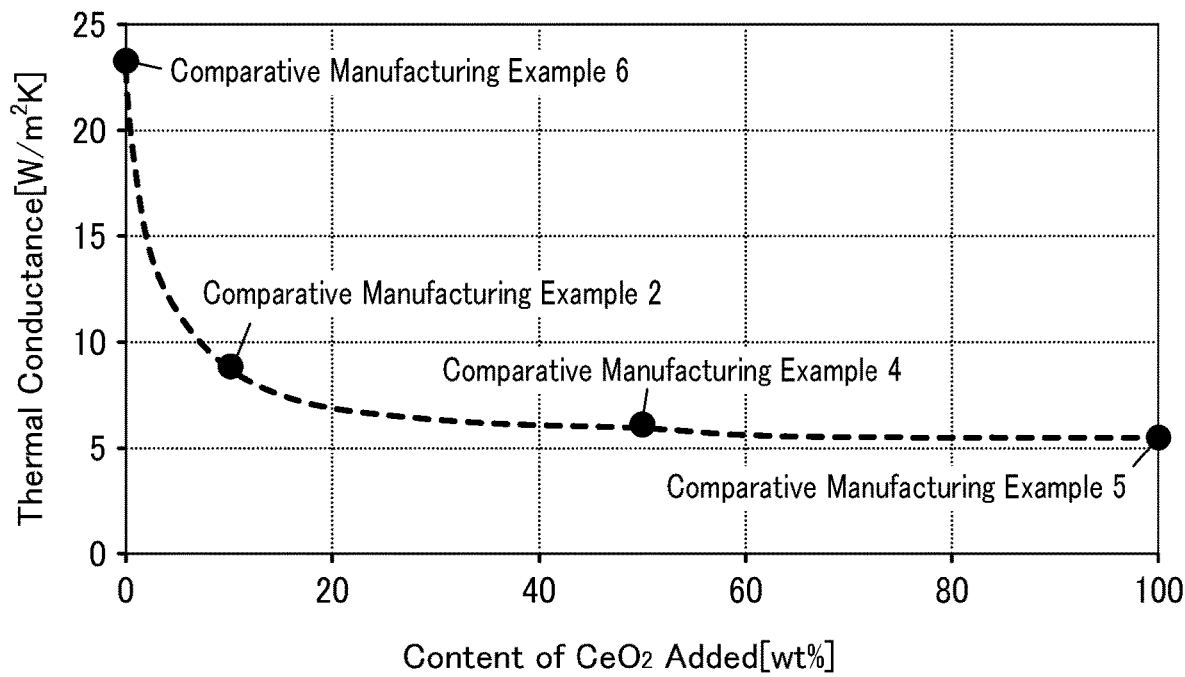
FIG. 18B plots data points showing relationships between the content of cerium oxide (IV) added to the composite getter material when a hydrogen-ion-exchanged zeolite powder was used and the thermal conductance of the glass panel unit.

FIG. 18B, as well as FIG. 18A, is a graph showing the relationship between the content of $CeO_2$ added to the composite getter material and the thermal conductance of the glass panel unit. In the glass panel unit, from which the results shown in FIG. 18B were obtained, the composite getter material was made by using a hydrogen-ion-exchanged zeolite instead of the copper-ion-exchanged zeolite.

In a second comparative manufacturing example to be compared with the second manufacturing example, a glass panel unit was manufactured in the same way as in the first manufacturing example except that a cerium oxide (IV) powder (10 parts by mass) and a hydrogen-ion-exchanged zeolite (HZSM-5) powder (90 parts by mass) were used.

In a fourth comparative manufacturing example to be compared with the fourth manufacturing example, a glass panel unit was manufactured in the same way as in the first manufacturing example except that a cerium oxide (IV) powder (50 parts by mass) and a hydrogen-ion-exchanged zeolite (HZSM-5) powder (50 parts by mass) were used.

In a fifth comparative manufacturing example, a glass panel unit was manufactured in the same way as in the first manufacturing example except that the content of the cerium oxide (IV) powder was set at 100 parts by mass and no hydrogen-ion-exchanged zeolite (HZSM-5) powder was used as in the fifth manufacturing example.

In a sixth comparative manufacturing example to be compared with the sixth manufacturing example, a glass panel unit was manufactured in the same way as in the first manufacturing example except that the content of the hydrogen-ion-exchanged zeolite (HZSM-5) powder was set at 100 parts by mass and no cerium oxide (IV) powder was used.

Comparing FIGS. 18A and 18B with each other, it can be seen that in FIG. 18A, a local minimum value of the thermal conductance appears in the vicinity of the content of $CeO_2$ added as represented by the data plotted with respect to the first to fourth manufacturing examples. It can also be seen that in FIG. 18B on the other hand, no local minimum value of the thermal conductance appears in the vicinity of the content of $CeO_2$ added as represented by the data plotted with respect to the second and fourth comparative manufacturing examples.

That is to say, the getter material that uses the copper-ion-exchanged zeolite and $CeO_2$ in combination by mixing them together has a distinct advantage over the getter material that uses the hydrogen-ion-exchanged zeolite and $CeO_2$ in combination by mixing them together. Specifically, even though the getter material including the copper-ion-exchanged zeolite and $CeO_2$ has a smaller content of $CeO_2$ added than the getter material including the hydrogen-ion-exchanged zeolite and $CeO_2$, the getter material including the copper-ion-exchanged zeolite and $CeO_2$ allows a glass panel unit with a low thermal conductance to be obtained.

Manufacturing Example B

Manufacturing Example B was implemented in the same way as in Manufacturing Example A except that the treatment to be described for the following first and second preparation examples was conducted before the cerium oxide (IV) powder and the copper-ion-exchanged zeolite powder were mixed together.

First Preparation Example

First, 0.2 g of copper-ion-exchanged zeolite powder (that had not been heated yet) was loaded in a chamber. After the powder had been loaded into the chamber, the copper-ion-exchanged zeolite powder was heated at 500° C. for 4 hours while a vacuum space was created by exhausting gases from the chamber. This caused a component that the copper-ion-exchanged zeolite powder that had not been heated yet had adsorbed to desorb. Thereafter, the chamber was cooled to room temperature. After the chamber had been cooled, a nitrogen gas was caused to flow into the chamber to turn the pressure in the chamber into the atmospheric pressure. In this manner, a heat-treated product of the copper-ion-exchanged zeolite powder was obtained.

Second Preparation Example

First, 0.1 g of cerium oxide (IV) powder (that had not been heated yet) was loaded in a chamber. After the powder had been loaded into the chamber, the cerium oxide (IV) powder was heated at 500° C. for 2 hours while a vacuum space was created there by exhausting gases from the chamber. This caused oxygen to desorb from the cerium oxide (IV) powder. Thereafter, the chamber was cooled to room temperature. After the chamber had been cooled, a carbon dioxide gas was caused to flow into the chamber to turn the pressure in the chamber into the atmospheric pressure. In this manner, a heat-treated product of the cerium oxide (IV) powder was obtained.

As can be seen, subjecting either the zeolite powder or the cerium oxide (IV) powder to the heat treatment in advance improved the adsorption capability of the composite getter material and reduced the percentage of oxygen desorbed from the cerium oxide powder, which allowed a composite getter material having even higher adsorption performance to be obtained.

Manufacturing Example C

In seventh to thirteenth manufacturing examples, the total content of the cerium oxide (IV) powder and the copper-ion-exchanged zeolite powder (corresponding to the "content of the getter material" in Manufacturing Example A) was changed into 20 mg. In addition, in the tenth to thirteenth manufacturing examples, the cerium oxide (IV) powder and the copper-ion-exchanged zeolite powder were not mixed together before being applied but placed at mutually different separate positions in the same vacuum space. In the other respects, Manufacturing Example C was implemented in the same way as in Manufacturing Example A.

Seventh Manufacturing Example

A glass panel unit was manufactured in the same way as in the first manufacturing example except that a cerium oxide (IV) powder (10 parts by mass) and a copper-ion-exchanged zeolite (Cu-ZSM5) powder (90 parts by mass) were used and the total content thereof was set at 20 mg.

Eighth Manufacturing Example

A glass panel unit was manufactured in the same way as in the seventh manufacturing example except that a cerium oxide (IV) powder (15 parts by mass) and a copper-ion-exchanged zeolite (Cu-ZSM5) powder (85 parts by mass) were used.

Ninth Manufacturing Example

A glass panel unit was manufactured in the same way as in the seventh manufacturing example except that a cerium oxide (IV) powder (25 parts by mass) and a copper-ion-exchanged zeolite (Cu-ZSM5) powder (75 parts by mass) were used.

Tenth Manufacturing Example

A cerium oxide (IV) powder (10 parts by mass) and a copper-ion-exchanged zeolite (Cu-ZSM5) powder (90 parts by mass) were used and the total content thereof was set at 20 mg. Two types of getter pastes were prepared by mixing the cerium oxide (IV) powder with water (40 parts by mass) and by mixing the copper-ion-exchanged zeolite powder with water (360 parts by mass). A glass panel unit was manufactured in the same way as in the first manufacturing example except that these getter pastes were applied onto mutually different positions in the same vacuum space.

Eleventh Manufacturing Example

A glass panel unit was manufactured in the same way as in the tenth manufacturing example except that a cerium oxide (IV) powder (15 parts by mass) and a copper-ion-exchanged zeolite (Cu-ZSM5) powder (85 parts by mass) were used.

Twelfth Manufacturing Example

A glass panel unit was manufactured in the same way as in the tenth manufacturing example except that a cerium oxide (IV) powder (25 parts by mass) and a copper-ion-exchanged zeolite (Cu-ZSM5) powder (75 parts by mass) were used.

Thirteenth Manufacturing Example

A glass panel unit was manufactured in the same way as in the tenth manufacturing example except that a cerium oxide (IV) powder (50 parts by mass) and a copper-ion-exchanged zeolite (Cu-ZSM5) powder (50 parts by mass) were used.

{Evaluation}

<Thermal Conductance>

Figure 19:
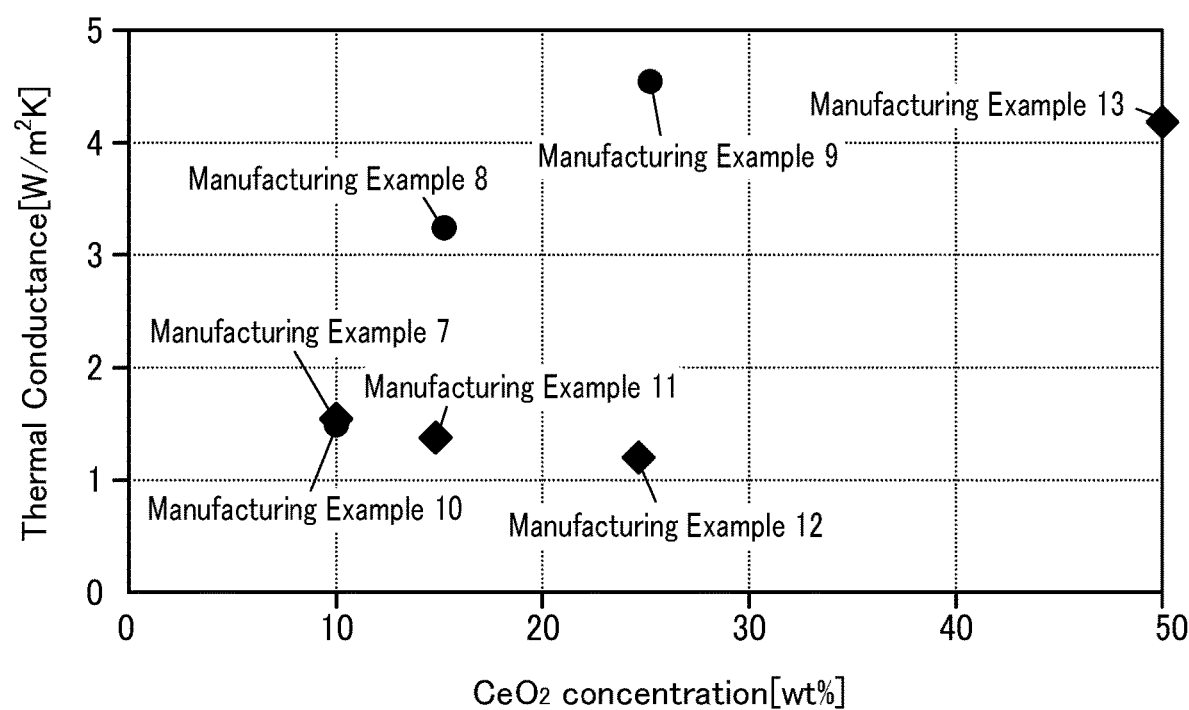
FIG. 19 plots data points showing relationships between the concentration of cerium oxide (IV) in the composite getter material and the thermal conductance of the glass panel unit.

The thermal conductance was measured by the same method as in Manufacturing Example A. The results are shown in FIG. 19.

Look at the results of the seventh, eighth, and ninth manufacturing examples, and it can be seen that when the concentration of the cerium oxide falls within the range from 10 wt % to 25 wt %, as the concentration rises, the thermal conductance increases. On the other hand, look at the results of tenth, eleventh, and twelfth manufacturing examples, and it can be seen that when the concentration of the cerium oxide falls within the range from 10 wt % to 25 wt %, as the concentration rises, the thermal conductance decreases. This is presumably because the effect of the oxygen desorbed from $CeO_2$ on Cu-ZSM5 was reduced.

Meanwhile, if the concentration of the cerium oxide is 50 wt % as in the thirteenth manufacturing example, the thermal conductance increases even though the cerium oxide and the copper-ion-exchanged zeolite are applied separately from each other. This is probably because although the cerium oxide and the copper-ion-exchanged zeolite are applied separately from each other, the cerium oxide and the copper-ion-exchanged zeolite are present in the same vacuum space, and therefore, Cu-ZSM5 should be affected by the oxygen desorbed from $CeO_2$. In addition, this is presumably because increasing the $CeO_2$ concentration would eventually cause a decrease in the content of Cu-ZSM5 with the ability to adsorb nitrogen and methane, which are usually difficult to adsorb.

Using 20 mg of Cu-ZSM5 by itself makes the thermal conductance value approximately 20 W/m²K. Thus, it can be seen that a significant advantage would also be achieved by adding $CeO_2$ even in the case of using $CeO_2$ and Cu-ZSM5 in mixture. When $CeO_2$ and Cu-ZSM5 are applied separately from each other, Cu-ZSM5 is not likely to be affected by the oxygen desorbed from $CeO_2$, which is a significant advantage. Meanwhile, in that case, it would take a long time to perform the application process and would make the gas adsorbent so conspicuous as to mar the appearance of the glass panel unit, which are non-negligible disadvantages. Thus, either the application in mixture or separate application should be chosen as appropriate with the manufacturing process and properties of the product taken into consideration.

Manufacturing Example D

Manufacturing Example D was implemented in the same way as in the eighth manufacturing example except that a cerium oxide (IV) powder having a different reduction temperature was used and the content of the cerium oxide powder mixed was different. Note that in the fourteenth and fifteenth manufacturing examples, a metal-carrying cerium oxide (IV) powder was used. In the sixteenth and seventeenth manufacturing examples, a cerium oxide (IV) powder, of which the concentration of the metal carried thereon was lower than in the fourteenth and fifteenth manufacturing examples, was used. In the eighteenth and nineteenth manufacturing examples, a cerium oxide (IV) powder carrying no metal thereon was used.

Fourteenth Manufacturing Example

A glass panel unit was manufactured in the same way as in the seventh manufacturing example except that a cerium oxide (IV) powder (15 parts by mass) having a reduction temperature of 200° C. was used.

Fifteenth Manufacturing Example

A glass panel unit was manufactured in the same way as in the fourteenth manufacturing example except that a cerium oxide (IV) powder (50 parts by mass) having a reduction temperature of 200° C. and a copper-ion-exchanged zeolite (Cu-ZSM5) powder (85 parts by mass) were used and the total content thereof was set at 27 mg.

Sixteenth Manufacturing Example

A glass panel unit was manufactured in the same way as in the fourteenth manufacturing example except that a cerium oxide (IV) powder (15 parts by mass) having a reduction temperature of 550° C. was used.

Seventeenth Manufacturing Example

A glass panel unit was manufactured in the same way as in the fifteenth manufacturing example except that a cerium oxide (IV) powder (50 parts by mass) having a reduction temperature of 550° C. was used.

Eighteenth Manufacturing Example

A glass panel unit was manufactured in the same way as in the fourteenth manufacturing example except that a cerium oxide (IV) powder (15 parts by mass) having a reduction temperature higher than 650° C. was used.

Nineteenth Manufacturing Example

A glass panel unit was manufactured in the same way as in the fifteenth manufacturing example except that a cerium oxide (IV) powder (50 parts by mass) having a reduction temperature higher than 650° C. was used.
{Evaluation}
<Reduction Temperature>

The reduction temperature was determined by locating a rising point of oxygen release by temperature-programmed desorption gas analysis. Under an ultrahigh vacuum, measurement was carried out until the temperature of the sample reached 650° C. at a temperature increase rate of 30° C./min. The temperature of the sample was measured by sandwiching the sample with a carbon sheet having a diameter of 1 cm, heating the sample with an infrared ray from under the sample, and bringing a thermocouple into contact with the carbon sheet from over the carbon sheet. The results of measurement are shown as an oxygen release curve in FIG. 20. As an apparatus for measuring the quantity of $O_2$ released, a temperature-programmed desorption gas analyzer TDS 1200II manufactured by ESCO, Ltd. was used. In the graph shown in FIG. 20, the ordinate indicates the $O_2$ ion current value at each point in time as the quantity of $O_2$ released per unit time. Note that the maximum value as the ordinate is $8E^{-10}$ [A].
<Cerium Oxide Content Increase Test>

Figure 21:
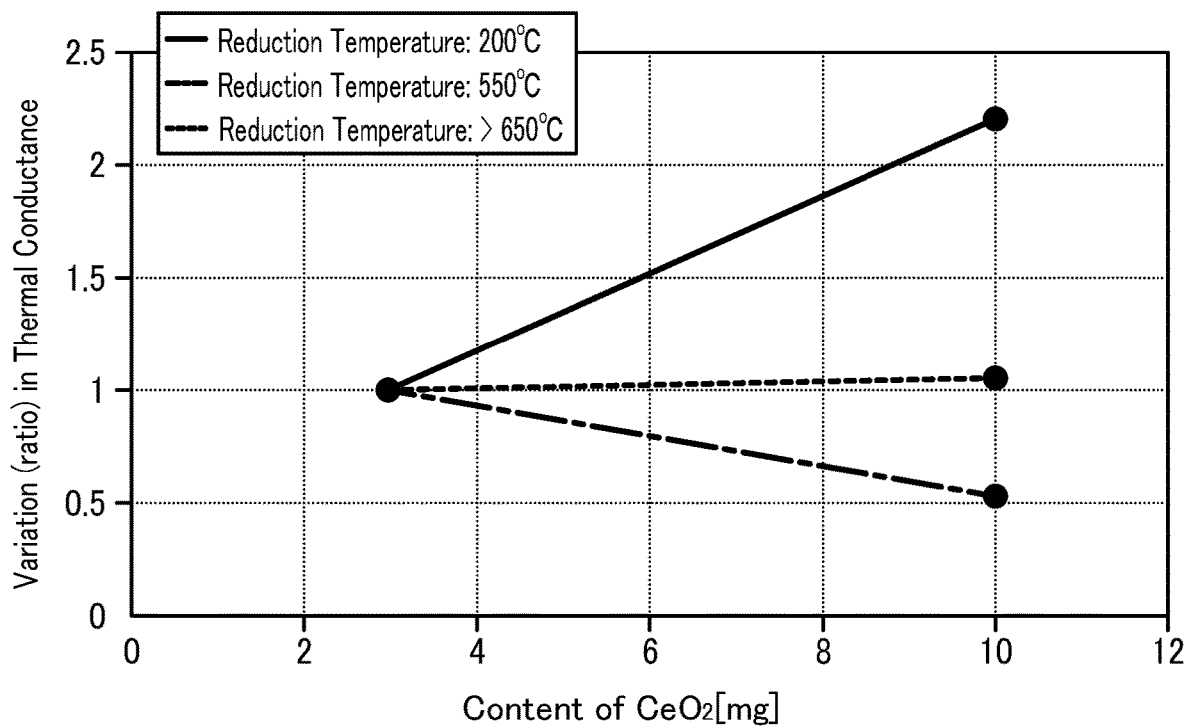
FIG. 21 plots data points showing relationships between the content of cerium oxide (IV) in a getter material and the thermal conductance of the glass panel unit.

The thermal conductance was measured by the same method as Manufacturing Example A with respect to each manufacturing example. FIG. 21 shows thermal conductance ratios in a situation where the thermal conductance when 15 parts by mass of a cerium oxide powder is used is supposed to be the unity.

In the case of a cerium oxide powder having a reduction temperature of 200° C., the thermal conductance rises as the cerium oxide content is increased. In the case of a cerium oxide powder having a reduction temperature of 550° C., the thermal conductance remains almost unchanged but slightly increases as the cerium oxide content is increased. On the other hand, in the case of the cerium oxide powder having a reduction temperature higher than 650° C., the thermal conductance value decreases. This has something to do with the fact that copper oxide of Cu-ZSM5 starts to release oxygen at a temperature of about 250° C. and nitrogen, methane, and other gases which are usually difficult to adsorb are adsorbed into copper ion sites that have been reduced.

In the cerium oxide powders according to the fourteenth and fifteenth manufacturing examples in which reduction starts at 200° C., oxygen starts to be released at 200° C., thus significantly interfering with the reduction of the copper oxide of Cu-ZSM5. In the case of the cerium oxide powder to be reduced at 550° C., almost no oxygen is released at 250° C. by itself but releases oxygen a little due to the reduction function of Cu-ZSM5, thus slightly interfering with the reduction of the copper oxide of Cu-ZSM5. In the case of cerium oxide not to be reduced even at a temperature higher than 650° C., the energy that causes desorption of oxygen is so high that the cerium oxide is not reduced and does not affect Cu-ZSM5 adversely even when mixed with Cu-ZSM5. Thus, increasing the cerium oxide content allows the quantity of $CO_2$ adsorbed to be simply increased, thus preventing Cu-ZSM5 adsorption sites from being filled with $CO_2$ and thereby enabling keeping the quantities of nitrogen and methane gases adsorbed high. That is why to avoid affecting Cu-ZSM5 adversely, the reduction temperature is preferably equal to or higher than 250° C. and particularly suitably equal to or higher than 550° C.

Figure 20:
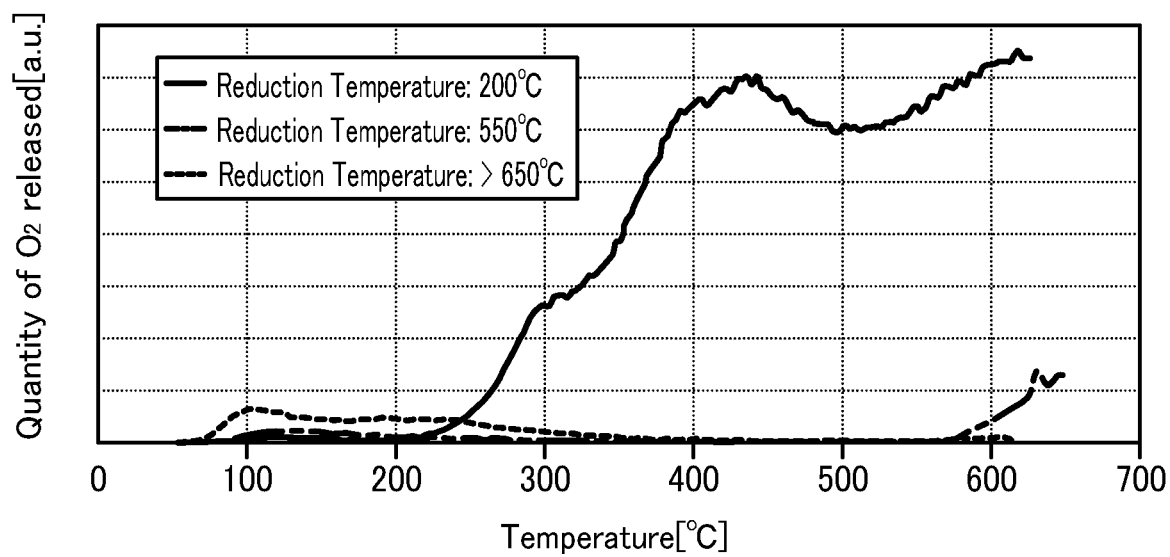
FIG. 20 is a graph showing how the release rate of oxygen desorbed from the cerium oxide (IV) changed with the temperature when a cerium oxide (IV) powder was heated.

Note that in FIG. 20, the oxygen release starting temperature (i.e., a temperature at which reduction starts) is the temperature at a rising point (where the gradient goes positive) of the oxygen release curve. Meanwhile, a peak (maximum point) at a temperature equal to or lower than 200° C. would be attributed to the release of a very small quantity of oxygen due to physical adsorption. Also, the oxygen release curve has a negative gradient at 250° C. (or at 300° C., 500° C., or 550° C.). Therefore, the oxygen release starting temperature is more preferably equal to or higher than 300° C., equal to or higher than 500° C., or equal to or higher than 550° C.

There are three chief reasons why a cerium oxide that does not affect Cu-ZSM5 adversely is useful.

Firstly, such a cerium oxide does not deteriorate the adsorption capability of Cu-ZSM5, thus increasing the chances of making the total adsorption capability high enough. For example, in the fifteenth manufacturing example in which a cerium oxide powder having a reduction temperature of 200° C. is used, the thermal conductance is 3.8 W/m²K. In the seventeenth manufacturing example in which a cerium oxide powder having a reduction temperature of 550° C. is used, the thermal conductance is 1.3 W/m²K. In the nineteenth manufacturing example in which a cerium oxide powder having a reduction temperature equal to or higher than 650° C. is used, the thermal conductance is 1.0 W/m²K.

Secondly, the precision condition of the cerium oxide concentration is relaxed. If the thermal conductance declines significantly due to a slight increase in cerium oxide concentration, the concentration should be adjusted precisely enough.

Thirdly, the $CO_2$ adsorption capability may be designed freely. For example, if vacuum insulated glass is irradiated with an ultraviolet ray, a lot of $CO_2$ may be released. If only the amount of the cerium oxide powder may be increased with this taken into consideration, the overall quantity of the gas adsorbent does not have to be increased so much. On the other hand, if the cerium oxide affects Cu-ZSM5 adversely, the concentration of the cerium oxide cannot be increased, and therefore, the cerium oxide and Cu-ZSM5 both need to be increased at the same ratio, thus sometimes causing an extra increase in the overall quantity of the gas adsorbent.

Adjustment of the reduction temperature of a cerium oxide powder may be affected by the type and content of an additive, the micropore size distribution, the particle size, and other factors. In general, when a metal or a rare-earth element, for example, is added or when the micropore size distribution is turned into a more finely distributed one, the silicon dioxide adsorption capability of the cerium oxide powder increases but its reduction temperature tends to decrease to the contrary. That is why the silicon dioxide adsorption capability is suitably adjusted appropriately such that the reduction temperature becomes equal to or higher than 250° C.

In addition, a cerium oxide powder having a reduction temperature equal to or lower than 250° C. or 550° C. is added to a very small amount (e.g., 10% or less, more preferably 5% or less) and another cerium oxide powder having a high reduction temperature is further added. This allows the silicon dioxide adsorption capability to be designed with a higher degree of freedom with the adverse effect on Cu-ZSM5 reduced. In that case, out of two types of cerium oxide powders having mutually different reduction temperatures, the proportion of a cerium oxide powder having the lower reduction temperature is preferably smaller than that of a cerium oxide powder having the higher reduction temperature.

(Variations)

Note that the first to fourth embodiments described above are only exemplary ones of various embodiments of the present disclosure and should not be construed as limiting. Rather, the first to fourth exemplary embodiments described above may be readily modified in various manners depending on a design choice or any other factor without departing from the scope of the present disclosure. Next, variations of the first to fourth embodiments will be enumerated one after another. In the following description, the first to fourth embodiments will be hereinafter referred to as a "basic example."

In the basic example described above, only the first glass pane 200, out of the first and second glass panes 200, 300, includes the low-emissivity film 220. In one variation, the second glass pane 300 may also include a low-emissivity film. That is to say, each of the first and second glass panes 200, 300 may include the low-emissivity film. Thus, each of the first and second glass panes 20, 30 may also include the low-emissivity film.

In the basic example described above, out of the first and second glass panes 200, 300, the first glass pane 200 includes the low-emissivity film 220 but the second glass pane 300 includes no low-emissivity films. In another variation, however, the second glass pane 300 may include a low-emissivity film and the first glass pane 200 may include no low-emissivity film 220. Thus, in a glass panel unit 10 according to a variation, the second glass pane 30 may include a low-emissivity film and the first glass pane 20 may include no low-emissivity film 220.

In the basic example described above, the gas exhausting step is started after the first melting step has ended. In a variation, if the temperature in the melting furnace is lower than the first softening point after the first melting time tm1 has passed, then the gas exhausting step may be started halfway through the first melting step.

In the basic example described above, the gas exhausting step ends when the second melting step ends. In a variation, the gas exhausting step may be started after the first melting step has ended and may end before the second melting step ends.

In the basic example described above, the glass panel unit 10 has a rectangular shape. Alternatively, in a variation, the glass panel unit 10 may also have a circular, polygonal, or any other desired shape. That is to say, the first glass pane 20 and the second glass pane 30 do not have to be rectangular but may also have a circular, polygonal, or any other desired shape.

The first and second glass panes 20, 30 do not have to have the same planar shape and the same planar dimensions. Also, the first glass pane 20 does not have to be as thick as the second glass pane 30, either. The same statement applies to the first and second glass panes 200, 300 as well.

The peripheral wall 410 does not have to have the same planar shape as the first and second glass panes 200, 300, either.

Optionally, the peripheral wall 410 may include other elements such as a core material.

Also, in the assembly 100, the peripheral wall 410 is just provided between the first and second glass panes 200, 300 and does not bond the first and second glass panes 200, 300 together. Optionally, however, in the assembly 100 stage, the peripheral wall 410 may bond the first and second glass panes 200, 300 together. In short, in the assembly 100, the peripheral wall 410 only needs to be provided between the first and second glass panes 200, 300 and does not have to bond the first and second glass panes 200, 300 together.

Furthermore, in the basic example described above, the partition 420 is out of contact with the peripheral wall 410. This allows air passages 610, 620 to be formed in the respective gaps between both ends of the partition 420 and the peripheral wall 410. However, this is only an example and should not be construed as limiting. Alternatively, only one of the two ends of the partition 420 may be coupled to the peripheral wall 410. In that case, a single air passage 600 may be formed between the partition 420 and the peripheral wall 410. Still alternatively, the partition 420 may even have both ends thereof coupled to the peripheral wall 410. In that case, the air passage 600 may be a through hole provided through the partition 420. Alternatively, the air passage 600 may also be a gap between the partition 420 and the first glass pane 200. Still alternatively, the partition 420 may be made up of two or more partitions arranged at intervals. In that case, the air passage 600 may be a gap left between the two or more partitions.

In the basic example described above, the air passages 600 include the two air passages 610, 620. Alternatively, only one air passage 600 may be provided or the air passages 600 may include three or more air passages. Furthermore, the air passages 600 may have any shape without limitation.

Furthermore, in the basic example described above, the internal space 500 is partitioned into the single first space 510 and the single second space 520. However, this is only an example and should not be construed as limiting. Alternatively, the internal space 500 may also be partitioned by the partition 420 into one or more first spaces 510 and one or more second spaces 520. If the internal space 500 has two or more first spaces 510, two or more glass panel units 10 may be obtained from a single work in progress 110.

In the basic example described above, the first space 510 is the vacuum space 50.

However, the vacuum space 50 may be replaced with an evacuated space. The evacuated space is the first space 510 in a pressure-reduced condition. As used herein, the "pressure-reduced condition" refers to a condition in which the pressure is lower than the atmospheric pressure.

In the basic example described above, the dam member 47 has a C-ring shape. However, the dam member 47 may also have an incomplete polygonal ring shape. Alternatively, the dam member may be omitted.

In the basic example described above, the vacuum space 50 is spatially separated from the external environment by either the boundary wall 42 or the port sealing material 43. In one variation, however, the vacuum space 50 may also be spatially separated from the external environment by a sealing portion formed by melting and cutting off an intermediate portion of the exhaust pipe connected to the exhaust port 700. That is to say, neither the boundary wall 42 nor the port sealing material 43 is an essential member for spatially separating the vacuum space 50 from the external environment.

Furthermore, the exhaust port 700 is not necessarily provided through either the first glass pane or the second glass pane. Alternatively, the exhaust port 700 may also be provided through the peripheral wall 410 between the first glass pane 200 and the second glass pane 300. In addition, when a gas is exhausted through the exhaust port 700, the exhaust pipe does not have to be connected thereto. Alternatively, the assembly 100 of the glass panel unit 10 yet to be sealed may be loaded into a vacuum chamber and the entire vacuum chamber may be evacuated to exhaust gases from inside the glass panel unit 10 through the gap of the peripheral wall 410 and thereby create the vacuum space 50. After that, the glass panel unit 10 may be sealed up by heating the peripheral wall 410.

(Recapitulation)

As can be seen from the foregoing description, the basic example and its variations described above may be specific implementations of the following aspects of the present disclosure.

A first aspect is a glass panel unit (10; 10A) including a first glass pane (20), a second glass pane (30), a frame member (40), a vacuum space (50), and a gas adsorbent (60). The second glass pane (30) faces the first glass pane (20). The frame member (40) hermetically bonds the first glass pane (20) and the second glass pane (30). The vacuum space (50) is surrounded with the first glass pane (20), the second glass pane (30), and the frame member (40). The gas adsorbent (60) is disposed in the vacuum space (50). The gas adsorbent (60) contains at least a particle of a zeolite and a particle of a cerium compound.

According to the first aspect, the gas adsorbent (60) contains a particle of a zeolite and a particle of a cerium compound, thus reducing the chances of a gas remaining in the vacuum space (50).

A second aspect is an implementation of the glass panel unit (10; 10A) according to the first aspect. In the second aspect, content of the cerium compound is 50% by mass or less with respect to an entire mass of a getter material included in the gas adsorbent (60).

The second aspect may reduce the quantity of oxygen desorbing from the cerium compound, thus reducing the chances of the oxygen remaining in the vacuum space (50) after a sealing step has been performed.

A third aspect is an implementation of the glass panel unit (10; 10A) according to the first or second aspect. In the third aspect, the gas adsorbent (60) contains the zeolite more than the cerium compound.

The third aspect reduces the quantity of oxygen desorbing from the cerium compound, thus reducing the chances of the oxygen remaining in the vacuum space (50) after the sealing step has been performed.

A fourth aspect is an implementation of the glass panel unit (10; 10A) according to any one of the first to third aspects. In the fourth aspect, the zeolite includes a copper-ion-exchanged zeolite.

The fourth aspect may reduce the chances of a gas remaining in the vacuum space (50).

A fifth aspect is an implementation of the glass panel unit (10; 10A) according to any one of the first to fourth aspects. In the fifth aspect, the cerium compound is a cerium oxide. The particle of the cerium compound exhibits an oxygen release curve having a temperature at which an oxygen release rate reaches a maximum point when subjected to a temperature-programmed desorption gas analysis at a temperature increase rate of 30° C./min. The oxygen release curve either has the maximum point equal to or lower than 200° C. or has the maximum point equal to or higher than 250° C. and an oxygen release starting temperature equal to or higher than 250° C.

The fifth aspect reduces, even if the gas adsorbent (60) contains the zeolite and the cerium compound, the chances of the gas adsorption performance of each of the zeolite and the cerium compound being affected.

A sixth aspect is an implementation of the glass panel unit (10; 10A) according to any one of the first to fifth aspects. In the sixth aspect, the gas adsorbent (60) contains a mixture of the particle of the zeolite and the particle of the cerium compound.

The sixth aspect may reduce the chances of a gas remaining in the vacuum space (50).

A seventh aspect is an implementation of the glass panel unit (10; 10A) according to any one of the first to fifth aspects. In the seventh aspect, the gas adsorbent (60) includes: a first gas adsorbent (61, 601) containing the particle of the zeolite; and a second gas adsorbent (62, 602) containing the particle of the cerium compound. The first gas adsorbent (61, 601) and the second gas adsorbent (62, 602) are separately arranged in the vacuum space (50).

According to the seventh aspect, the first gas adsorbent (61, 601) contains the zeolite and the second gas adsorbent (62, 602) contains the cerium compound, thus reducing the chances of a gas remaining in the vacuum space (50). In addition, the first gas adsorbent (61, 601) containing the zeolite and the second gas adsorbent (62, 602) containing the cerium compound are separately provided, thus reducing the chances of the zeolite and the cerium compound affecting their gas adsorption performance with each other. Furthermore, the arrangement positions of the first gas adsorbent (61, 601) and the second gas adsorbent (62, 602) may be determined more flexibly, thus increasing the degree of freedom in design.

An eighth aspect is an implementation of the glass panel unit (10; 10A) according to the seventh aspect. In the eighth aspect, the first gas adsorbent (61, 601) and the second gas adsorbent (62, 602) are arranged out of contact with each other.

The eighth aspect may reduce the chances of the zeolite and the cerium compound affecting their gas adsorption performance with each other.

A ninth aspect is an implementation of the glass panel unit (10; 10A) according to the seventh or eighth aspect. In the ninth aspect, one gas adsorbent selected from the group consisting of the first gas adsorbent (61, 601) and the second gas adsorbent (62, 602) is provided over an entire surface of at least one of the first glass pane (20) or the second glass pane (30). The other gas adsorbent selected from the group consisting of the first gas adsorbent (61, 601) and the second gas adsorbent (62, 602) is provided along an outer periphery of at least one of the first glass pane (20) or the second glass pane (30).

According to the ninth aspect, the arrangement positions of the first gas adsorbent (61, 601) and the second gas adsorbent (62, 602) may be determined more flexibly, thus increasing the degree of freedom in design.

A tenth aspect is an implementation of the glass panel unit (10) according to any one of the first to ninth aspects. In the tenth aspect, neither the first glass pane (20) nor the second glass pane (30) has any exhaust port (700).

According to the tenth aspect, the gas adsorbent (60) contains a zeolite and a cerium compound, thus reducing the chances of a gas remaining in the vacuum space (50). In addition, the tenth aspect may also curb a decline in appearance due to the presence of the exhaust port (700).

An eleventh aspect is a composite getter material containing a particle of a zeolite and a particle of a cerium compound.

The eleventh aspect may reduce, when the composite getter material is disposed in a vacuum space (50), the chances of a gas remaining in the vacuum space (50).

A twelfth aspect is an implementation of the composite getter material according to the eleventh aspect. In the twelfth aspect, content of the cerium compound is 50% by mass or less with respect to a mass of the composite getter material.

The twelfth aspect may reduce, when the composite getter material is disposed in the vacuum space (50), the quantity of oxygen desorbing from the cerium compound, thus reducing the chances of the oxygen remaining in the vacuum space (50).

A thirteenth aspect is a getter paste that is a mixture of the composite getter material according to the eleventh or twelfth aspect and a solvent.

According to the thirteenth aspect, in the getter paste, a solvent is present to cover a particle of the zeolite and a particle of the cerium compound, thus reducing the chances of the particle of the zeolite and the particle of the cerium compound being exposed to the air. This reduces the chances of the particle of the zeolite and the particle of the cerium compound adsorbing the air. Consequently, the getter paste may be preserved more easily. In addition, when the solvent is water, no organic components which are difficult to desorb will remain in the zeolite (in particular, a copper-ion-exchanged zeolite (Cu-ZSM5)), unlike a situation where an organic solvent such as alcohol or terpineol is used. This allows, even if the temperature is low in the gas exhausting step, the gas to be desorbed sufficiently from the zeolite, thus achieving excellent adsorption performance.

A fourteenth aspect is a method for manufacturing a glass panel unit (10; 10A) including a working step, an assembling step, a bonding step, and a gas exhausting step. The working step includes a composite getter material making step. The composite getter material making step includes obtaining a composite getter material containing a particle of a zeolite and a particle of a cerium compound. The assembling step includes preparing an assembly (100; 101). The assembly (100; 101) includes a first glass pane (200; 20), a second glass pane (300; 30), a peripheral wall (410) having a frame shape, an internal space (500), a gas adsorbent (60), and an exhaust port (700). The second glass pane (300; 30) faces the first glass pane (200; 20). The peripheral wall (410) is provided between the first glass pane (200; 20) and the second glass pane (300; 30). The internal space (500) is surrounded with the first glass pane (200; 20), the second glass pane (300; 30), and the peripheral wall (410). The gas adsorbent (60) is disposed in the internal space (500) and contains the composite getter material. The exhaust port (700) allows the internal space (500) to communicate with an external environment. The bonding step includes melting the peripheral wall (410) to hermetically bond the first glass pane (200; 20) and the second glass pane (300; 30). The gas exhausting step includes exhausting a gas from the internal space (500) through the exhaust port (700) to turn the internal space (500) into a vacuum space (50).

According to the fourteenth aspect, the gas adsorbent (60) contains a zeolite and a cerium compound, thus reducing the chances of a gas remaining in the vacuum space (50).

A fifteenth aspect is an implementation of the method for manufacturing a glass panel unit (10; 10A) according to the fourteenth aspect. In the fifteenth aspect, the working step further includes a mixing step of obtaining a getter paste by mixing the composite getter material and a solvent together.

According to the fifteenth aspect, a solvent is present to cover a particle of the zeolite and a particle of the cerium compound, thus reducing the chances of the particle of the zeolite and the particle of the cerium compound being exposed to the air. This reduces the chances of the getter material adsorbing the air. Consequently, the getter paste may be preserved more easily, thus saving the trouble involved with manufacturing of the glass panel unit (10; 10A).

A sixteenth aspect is a method for manufacturing a glass panel unit (10; 10A) including a working step, an assembling step, a bonding step, and a gas exhausting step. The working step includes a getter paste making step. The getter paste making step includes obtaining a first getter paste containing a particle of a zeolite and a second getter paste containing a particle of a cerium compound. The assembling step includes preparing an assembly (100; 101). The assembly (100; 101) includes a first glass pane (200; 20), a second glass pane (300; 30), a peripheral wall (410) having a frame shape, an internal space (500), the first gas adsorbent (61, 601), the second gas adsorbent (62, 602), and an exhaust port (700). The second glass pane (300; 30) faces the first glass pane (200; 20). The peripheral wall (410) is provided between the first glass pane (200; 20) and the second glass pane (300; 30). The internal space (500) is surrounded with the first glass pane (200; 20), the second glass pane (300; 30), and the peripheral wall (410). The first gas adsorbent (61, 601) is disposed in the internal space (500) and made of the first getter paste. The second gas adsorbent (62, 602) is disposed in the internal space (500) and made of the second getter paste. The exhaust port (700) allows the internal space (500) to communicate with an external environment. The bonding step includes melting the peripheral wall (410) to hermetically bond the first glass pane (200; 20) and the second glass pane (300; 30). The gas exhausting step includes exhausting a gas from the internal space (500) through the exhaust port (700) to turn the internal space (500) into a vacuum space (50).

According to the sixteenth aspect, the first gas adsorbent (61, 601) contains the zeolite and the second gas adsorbent (62, 602) contains the cerium compound, thus reducing the chances of a gas remaining in the vacuum space (50). In addition, the first gas adsorbent (61, 601) containing the zeolite and the second gas adsorbent (62, 602) containing the cerium compound are separately provided, thus reducing the chances of the zeolite and the cerium compound affecting their gas adsorption performance with each other. Furthermore, the arrangement positions of the first gas adsorbent (61, 601) and the second gas adsorbent (62, 602) may be determined more flexibly, thus increasing the degree of freedom in design.

A seventeenth aspect is an implementation of the method for manufacturing a glass panel unit (10; 10A) according to the fifteenth or sixteenth aspect. In the seventeenth aspect, the assembling step includes a drying step of obtaining each of the gas adsorbents (60; 61; 601; 62; 602) by drying an associated one of the getter pastes.

According to the seventeenth aspect, each of the gas adsorbents (60; 61; 601; 62; 602) may recover its gas adsorptivity by drying an associated one of the getter pastes.

An eighteenth aspect is an implementation of the method for manufacturing a glass panel unit (10; 10A) according to any one of the fourteenth to seventeenth aspects. In the eighteenth aspect, the peripheral wall (410) contains either an organic binder or an organic solvent or both the organic binder and the organic solvent.

According to the eighteenth aspect, even if a gas derived from an organic binder is released into the vacuum space (50) after the sealing step, the gas will be adsorbed into the gas adsorbent (60), thus reducing the chances of the gas remaining in the vacuum space (50).

In a nineteenth aspect, the getter paste is either applied around an outer periphery inside the glass panel with a dispenser or sprayed with a device such as a spray applicator.

The nineteenth aspect provides a glass panel, of which the appearance is improved by making the getter material much less conspicuous.

REFERENCE SIGNS LIST

10 Glass Panel Unit
10A Glass Panel Unit
100 Assembly
101 Assembly
20 First Glass Pane
200 First Glass Pane (First Glass Substrate)
30 Second Glass Pane
300 Second Glass Pane (Second Glass Substrate)
40 Frame Member
50 Vacuum Space
60 Gas Adsorbent
61 First Gas Adsorbent
62 Second Gas Adsorbent
410 Peripheral Wall
500 Internal Space
700 Exhaust Port

The invention claimed is:

1. A glass panel unit comprising:
a first glass pane;
a second glass pane facing the first glass pane;
a frame member hermetically bonding the first glass pane and the second glass pane;
a vacuum space surrounded with the first glass pane, the second glass pane, and the frame member; and
a gas adsorbent disposed in the vacuum space,
the gas adsorbent including: a first gas adsorbent containing a particle of a zeolite including a copper-ion-exchanged zeolite; and a second gas adsorbent containing a particle of a cerium compound, the first gas adsorbent containing no cerium compound; and the second gas adsorbent containing no copper-ion-exchanged zeolite, and
the first gas adsorbent and the second gas adsorbent being separately arranged in the vacuum space.

2. The glass panel unit of claim 1, wherein
the gas adsorbent contains the zeolite more than the cerium compound.

3. The glass panel unit of claim 1, wherein
the cerium compound is a cerium oxide,
the particle of the cerium compound exhibits an oxygen release curve having a temperature at which an oxygen release rate reaches a maximum point when subjected to a temperature-programmed desorption gas analysis at a temperature increase rate of 30° C./min, and
the oxygen release curve either
has the maximum point equal to or lower than 200° C., or
has the maximum point equal to or higher than 250° C. and an oxygen release starting temperature equal to or higher than 250° C.

4. The glass panel unit of claim 1, wherein
the first gas adsorbent and the second gas adsorbent are arranged out of contact with each other.

5. The glass panel unit of claim 1, wherein
one gas adsorbent selected from the group consisting of the first gas adsorbent and the second gas adsorbent is provided over an entire surface of at least one of the first glass pane or the second glass pane such that the one gas adsorbent is arranged in the form of an array to be spaced apart from each other and located on the at least one of the first glass pane or the second glass pane, and
the other gas adsorbent selected from the group consisting of the first gas adsorbent and the second gas adsorbent is provided along an outer periphery of at least one of the first glass pane or the second glass pane.

6. The glass panel unit of claim 1, wherein
neither the first glass pane nor the second glass pane has any exhaust port.

7. A method for manufacturing a glass panel unit, the method comprising a working step, an assembling step, a bonding step, and a gas exhausting step,
the working step including a getter paste making step, the getter paste making step including obtaining a first getter paste containing a particle of a zeolite and a second getter paste containing a particle of a cerium compound,
wherein the first getter paste contains no cerium compound; and
wherein the second getter paste contains no copper-ion-exchanged zeolite,
the assembling step including preparing an assembly,
the assembly comprising:
a first glass pane;
a second glass pane facing the first glass pane;
a peripheral wall having a frame shape and provided between the first glass pane and the second glass pane;
an internal space surrounded with the first glass pane, the second glass pane, and the peripheral wall;
a first gas adsorbent disposed in the internal space and made of the first getter paste;
a second gas adsorbent disposed in the internal space and made of the second getter paste;
wherein the first gas adsorbent and the second gas adsorbent are separately arranged in the internal space and;
an exhaust port allowing the internal space to communicate with an external environment,
the bonding step including melting the peripheral wall to hermetically bond the first glass pane and the second glass pane,
the gas exhausting step including exhausting a gas from the internal space through the exhaust port to turn the internal space into a vacuum space.

8. The method of claim 7, wherein
the assembling step includes a drying step of obtaining each of the gas adsorbents by drying an associated one of the getter pastes.

9. The method of claim 7, wherein
the peripheral wall contains either an organic binder or an organic solvent or both the organic binder and the organic solvent.

10. The method of claim 7, wherein
the first getter paste is obtained by mixing a first getter material and a solvent, are
the second getter paste is obtained by mixing a second getter material and a solvent.

* * * * *